United States Patent
Zhang et al.

(10) Patent No.: US 10,034,313 B2
(45) Date of Patent: Jul. 24, 2018

(54) EMERGENCY DATA TRANSMISSION OVER UNLICENSED RADIO FREQUENCY SPECTRUM BAND

(71) Applicant: QUALCOMM Incorporated, San Diego, CA (US)

(72) Inventors: Xiaoxia Zhang, San Diego, CA (US); Tao Luo, San Diego, CA (US); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/618,604

(22) Filed: Feb. 10, 2015

(65) Prior Publication Data

US 2015/0289293 A1    Oct. 8, 2015

Related U.S. Application Data

(60) Provisional application No. 61/975,522, filed on Apr. 4, 2014.

(51) Int. Cl.
*H04M 11/04*    (2006.01)
*H04W 76/00*    (2018.01)
(Continued)

(52) U.S. Cl.
CPC ........... *H04W 76/007* (2013.01); *H04L 12/18* (2013.01); *H04L 12/189* (2013.01);
(Continued)

(58) Field of Classification Search
CPC .... H04L 12/18; H04W 72/04; H04W 76/007; H04W 4/22; H04W 72/0426; H04W 74/002; H04W 74/08
(Continued)

(56) References Cited

U.S. PATENT DOCUMENTS

| | | | | |
|---|---|---|---|---|
| 7,937,068 B2 * | 5/2011 | Hogberg | ............ | H04L 41/5006 455/404.1 |
| 8,937,968 B1 * | 1/2015 | Venkatesh | ............ | H04W 16/04 370/431 |

(Continued)

FOREIGN PATENT DOCUMENTS

| | | |
|---|---|---|
| EP | 2426865 A2 | 3/2012 |
| WO | WO-2009136353 A1 | 11/2009 |

OTHER PUBLICATIONS

ISA/EPO, International Search Report and Written Opinion of the International Searching Authority, Int'l App. No. PCT/US2015/015443, Aug. 20, 2015, European Patent Office, Rijswijk, NL, 14 pgs.

(Continued)

*Primary Examiner* — Charles Shedrick
(74) *Attorney, Agent, or Firm* — Holland & Hart LLP

(57) ABSTRACT

Techniques are described for wireless communication. A first method includes determining that a first node associated with a first operator in a deployment of operators has emergency data to transmit over an unlicensed radio frequency spectrum band and transmitting, by the first node, a signal over the unlicensed radio frequency spectrum band. The signal may indicate that the first node has emergency data to transmit. A second method includes receiving, at a first base station associated with a first operator in a deployment of operators, an uplink transmission from a user equipment (UE) indicating that the UE has emergency uplink data to transmit over an unlicensed radio frequency spectrum band and transmitting, by the first base station, an indication to a second base station that the UE has emergency uplink data to transmit over the unlicensed radio frequency spectrum band.

26 Claims, 24 Drawing Sheets

(51) Int. Cl.
*H04L 12/18* (2006.01)
*H04W 74/08* (2009.01)
*H04W 74/00* (2009.01)
*H04W 74/02* (2009.01)
*H04W 76/50* (2018.01)
*H04W 4/90* (2018.01)
*H04W 72/04* (2009.01)

(52) U.S. Cl.
CPC ........... *H04L 12/1895* (2013.01); *H04W 4/90* (2018.02); *H04W 74/002* (2013.01); *H04W 74/02* (2013.01); *H04W 74/08* (2013.01); *H04W 76/50* (2018.02); *H04W 72/04* (2013.01); *H04W 72/0426* (2013.01)

(58) Field of Classification Search
USPC .............................. 455/404.1; 370/329, 331
See application file for complete search history.

(56) References Cited

U.S. PATENT DOCUMENTS

| | | | |
|---|---|---|---|
| 9,332,554 B1* | 5/2016 | Heidari | H04B 7/0456 |
| 2006/0223448 A1* | 10/2006 | Kruys | H04W 16/14 |
| | | | 455/69 |
| 2010/0316013 A1* | 12/2010 | Jin | H04L 5/0073 |
| | | | 370/329 |
| 2013/0188567 A1* | 7/2013 | Wang | H04L 5/0094 |
| | | | 370/329 |
| 2013/0195073 A1* | 8/2013 | Chen | H04L 5/0023 |
| | | | 370/331 |
| 2013/0235773 A1* | 9/2013 | Wang | H04W 52/0206 |
| | | | 370/311 |
| 2014/0204818 A1* | 7/2014 | Trainin | H04W 72/1278 |
| | | | 370/311 |
| 2015/0327262 A1* | 11/2015 | Kwon | H04W 72/1289 |
| | | | 370/329 |
| 2015/0341880 A1* | 11/2015 | Seok | H04W 52/0216 |
| | | | 370/350 |
| 2016/0007353 A1* | 1/2016 | Malladi | H04L 5/0053 |
| | | | 370/329 |

OTHER PUBLICATIONS

ISA/EPO, Partial International Search Report of the International Searching Authority, Int'l App. No. PCT/US2015/015443, Jun. 12, 2015, European Patent Office, Rijswijk, NL, 4 pgs.

* cited by examiner

EMERGENCY DATA TRANSMISSION OVER UNLICENSED RADIO FREQUENCY SPECTRUM BAND

CROSS REFERENCES

The present Application for patent claims priority to U.S. Provisional Patent Application No. 61/975,522 by Zhang et al., entitled "Emergency Data Transmission Over Unlicensed Radio Frequency Spectrum Band," filed Apr. 4, 2014, assigned to the assignee hereof, and expressly incorporated by reference herein.

BACKGROUND

Field of the Disclosure

The present disclosure, for example, relates to wireless communication systems, and more particularly to techniques for transmitting emergency data over an unlicensed radio frequency spectrum band.

Description of the Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, perform a listen before talk (LBT) procedure to gain access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time.

The unpredictable nature of obtaining access to an unlicensed radio frequency spectrum band can make the transmission of emergency data over the unlicensed radio frequency spectrum band difficult.

SUMMARY

The present disclosure, for example, relates to one or more techniques for transmitting emergency data over an unlicensed radio frequency spectrum band. Some of the techniques described herein may enable a node (e.g., a base station or a user equipment (UE)) associated with an operator in a deployment of operators to autonomously adjust a listen before talk (LBT) yielding parameter (e.g., the N parameter and/or the K parameter of an N/K protocol) of the node in response to a determination that the node has emergency data to transmit. An N/K protocol is a protocol under which a node does not attempt to access an unlicensed radio frequency spectrum band after N attempts to access the unlicensed radio frequency spectrum band. Some of the techniques described herein may enable a node (e.g., a base station or a UE) associated with an operator in a deployment of operators to autonomously adjust a clear channel assessment (CCA) opportunity of the node in response to a determination that the node has emergency data to transmit.

In a first set of illustrative examples, a method for wireless communication is described. In one example, the method may include determining that a first node associated with a first operator in a deployment of operators has emergency data to transmit over an unlicensed radio frequency spectrum band. The method may also include transmitting, by the first node, a signal over the unlicensed radio frequency spectrum band. The signal may indicate that the first node has emergency data to transmit.

In some examples of the method, the signal may further include an indication of a maximum time span of a transmission of the emergency data by the first node. In some examples, the method may further include transmitting a second signal indicating that the first node has completed transmitting the emergency data.

In some examples, the method may include transmitting the emergency data over a multimedia broadcast multicast service (MBMS). In some of these examples, the method may further include allocating all available transmission resources in the unlicensed radio frequency spectrum band to the MBMS during the transmission of the emergency data by the first node, or dividing available transmission resources in the unlicensed radio frequency spectrum band between the MBMS and unicast during the transmission of the emergency data by the first node. In the latter case, the emergency data may be transmitted over both the MBMS and the unicast.

In some examples, the method may include adjusting an LBT yielding parameter of the first node in response to the determination that the first node has emergency data to transmit. In some examples, the LBT yielding parameter may include one of a first LBT yielding parameter or a second LBT yielding parameter, in which the first LBT yielding parameter defines a number of consecutive frames triggering the first node in the deployment of operators to yield access to the unlicensed radio frequency spectrum band, and the second LBT yielding parameter defines a number of consecutive frames during which the first node yields access to the unlicensed radio frequency spectrum band following transmission of the number of consecutive frames defined by the first LBT yielding parameter. In some examples of the method, adjusting the LBT yielding parameter may include increasing the first LBT yielding parameter from a default value and/or decreasing the second LBT yielding parameter from a default value. In some examples, adjusting the LBT yielding parameter may include setting the second LBT yielding parameter to zero while the first node has emergency data to transmit.

In some examples, adjusting the LBT yielding parameter may include adjusting the LBT yielding parameter based on a total number of operators in the deployment of operators that have emergency data to transmit over the unlicensed radio frequency spectrum band. In some examples, the method may include determining that a second node associated with a second operator in the deployment of operators has emergency data to transmit over the unlicensed radio frequency spectrum band. In some of these latter examples, adjusting the LBT yielding parameter may include matching the LBT yielding parameter of the first node to a corresponding LBT yielding parameter of the second node. In some examples, determining that the second node has emergency data to transmit over the unlicensed radio frequency spectrum band may include receiving a signal from the second node. The signal received from the second node may include an indication that the second node has emergency data to transmit.

In some examples of the method, the adjusted LBT yielding parameter of the first node may be different from a corresponding LBT yielding parameter used by a node having no emergency data to transmit. In some examples, the method may further include reverting the LBT yielding parameter to an original value following transmission of the emergency data by the first node.

In some examples, the method may include adjusting a CCA opportunity of the first node in response to the determination that the first node has emergency data to transmit. In some examples, adjusting the CCA opportunity of the first node may include adjusting the CCA opportunity based on a total number of operators in the deployment of operators that have emergency data to transmit over the unlicensed radio frequency spectrum band. In some examples, the method may further include determining that at least a second node associated with a second operator in the deployment of operators has emergency data to transmit over the unlicensed radio frequency spectrum band. In some examples, access to an earliest CCA opportunity may cycle between the first node and the second node on a frame-by-frame basis for each frame during which both the first node and the second node have emergency data to transmit. In some examples, determining that the second node has emergency data to transmit over the unlicensed radio frequency spectrum band may include receiving a CET from the second node. The CET may include an indication that the second node has emergency data to transmit.

In some examples of the method, an adjusted CCA opportunity of the first node may collide with and preempt a default CCA opportunity of a second node. In some of these examples, the method may include relinquishing a default CCA opportunity of the first node to the second node.

In some examples, the method may include performing a CCA at an adjusted CCA opportunity of the first node. The method may also include transmitting at least a portion of the emergency data, by the first node, during a frame following the adjusted CCA opportunity if the CCA is successful. In some examples, the method may further include allocating all available transmission resources in the frame following the adjusted CCA opportunity to the transmission of the emergency data until the emergency data has completed transmission. In some examples, the method may further include transmitting the emergency data by the first node over a subset of subcarriers. The subset of subcarriers may be determined based on the first operator of the first node. In some examples, the method may further include performing the CCA concurrently with at least a second node associated with a second operator, where the second node has emergency data to transmit.

In some examples, the method may include performing a CCA concurrently with at least a second node associated with a second operator, where the second node has non-emergency data to transmit and a default CCA opportunity of the second node collides with the adjusted CCA opportunity of the first node. In some examples, the method may further include transmitting the emergency data over a joint MBMS including the first operator and the second operator. In some examples, the method may further include forming the joint MBMS in response to a determination that the first node and the second node have the same emergency data to transmit. In some examples, the method may further include transmitting the emergency data according to a coordinated multipoint (CoMP) operation between the first node and the second node.

In some examples of the method, the first node may include a base station or a UE.

In a second set of illustrative examples, an apparatus for wireless communication is described. In one example, the apparatus may include means for determining that a first node associated with a first operator in a deployment of operators has emergency data to transmit over an unlicensed radio frequency spectrum band. The apparatus may also include means for transmitting, by the first node, a signal over the unlicensed radio frequency spectrum band. The signal may indicate that the first node has emergency data to transmit. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor and memory coupled to the processor. The processor is configured to determine that a first node associated with a first operator in a deployment of operators has emergency data to transmit over an unlicensed radio frequency spectrum band. The processor may be configured to cause the first node to transmit a signal over the unlicensed radio frequency spectrum band. The signal may indicate that the first node has emergency data to transmit. In some examples, the processor may also be configured to implement one or more aspects of the method for wireless communication described above with respect to the first set of illustrative examples.

In a fourth set of illustrative examples, a computer program product for communication by a wireless communication apparatus in a wireless communication system is described. In one example, the computer program product may include a non-transitory computer-readable medium storing instructions executable by a processor to cause the wireless communication apparatus to determine that a first node associated with a first operator in a deployment of operators has emergency data to transmit over an unlicensed radio frequency spectrum band. The instructions may also be executable by the processor to cause the wireless communication apparatus to cause the first node to transmit a signal over the unlicensed radio frequency spectrum band. The signal may indicate that the first node has emergency data to transmit. In some examples, the instructions may also be executable by the processor to cause the wireless communication apparatus to implement one or more aspects of the method for wireless communication described above with respect to the first set of illustrative examples.

In a fifth set of illustrative examples, another method for wireless communication is described. In one example, the method may include receiving, at a first base station associated with a first operator in a deployment of operators, an uplink transmission from a UE indicating that the UE has emergency uplink data to transmit over an unlicensed radio frequency spectrum band. The method may also include transmitting, by the first base station, an indication to a second base station that the UE has emergency uplink data to transmit over the unlicensed radio frequency spectrum band.

In some examples of the method, the uplink transmission from the UE may include an uplink CET. In some examples of the method, the indication to the second base station may include a downlink CET and/or a transmission at a beginning of an LBT burst.

In a sixth set of illustrative examples, an apparatus for wireless communication is described. In one example, the apparatus may include means for receiving, at a first base station associated with a first operator in a deployment of operators, an uplink transmission from a UE indicating that the UE has emergency uplink data to transmit over an unlicensed radio frequency spectrum band. The apparatus may also include means for transmitting, by the first base station, an indication to a second base station that the UE has emergency uplink data to transmit over the unlicensed radio frequency spectrum band. In some examples, the apparatus may further include means for implementing one or more aspects of the method for wireless communication described above with respect to the fifth set of illustrative examples.

In a seventh set of illustrative examples, another apparatus for wireless communication is described. In one example, the apparatus may include a processor and memory coupled to the processor. The processor may be configured to receive, at a first base station associated with a first operator in a deployment of operators, an uplink transmission from a UE indicating that the UE has emergency uplink data to transmit over an unlicensed radio frequency spectrum band. The processor may also be configured to cause the first base station to transmit an indication to a second base station that the UE has emergency uplink data to transmit over the unlicensed radio frequency spectrum band. In some examples, the processor may be configured to implement one or more aspects of the method for wireless communication described above with respect to the fifth set of illustrative examples.

In an eighth set of illustrative examples, a computer program product for communication by a wireless communication apparatus in a wireless communication system is described. In one example, the computer program product may include a non-transitory computer-readable medium storing instructions executable by a processor to cause the wireless communication apparatus to receive, at a first base station associated with a first operator in a deployment of operators, an uplink transmission from a UE indicating that the UE has emergency uplink data to transmit over an unlicensed radio frequency spectrum band. The instructions may also be executable by the processor to cause the wireless communication apparatus to cause the first base station to transmit an indication to a second base station that the UE has emergency uplink data to transmit over the unlicensed radio frequency spectrum band. In some examples, the instructions may also be executable by the processor to cause the wireless communication apparatus to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
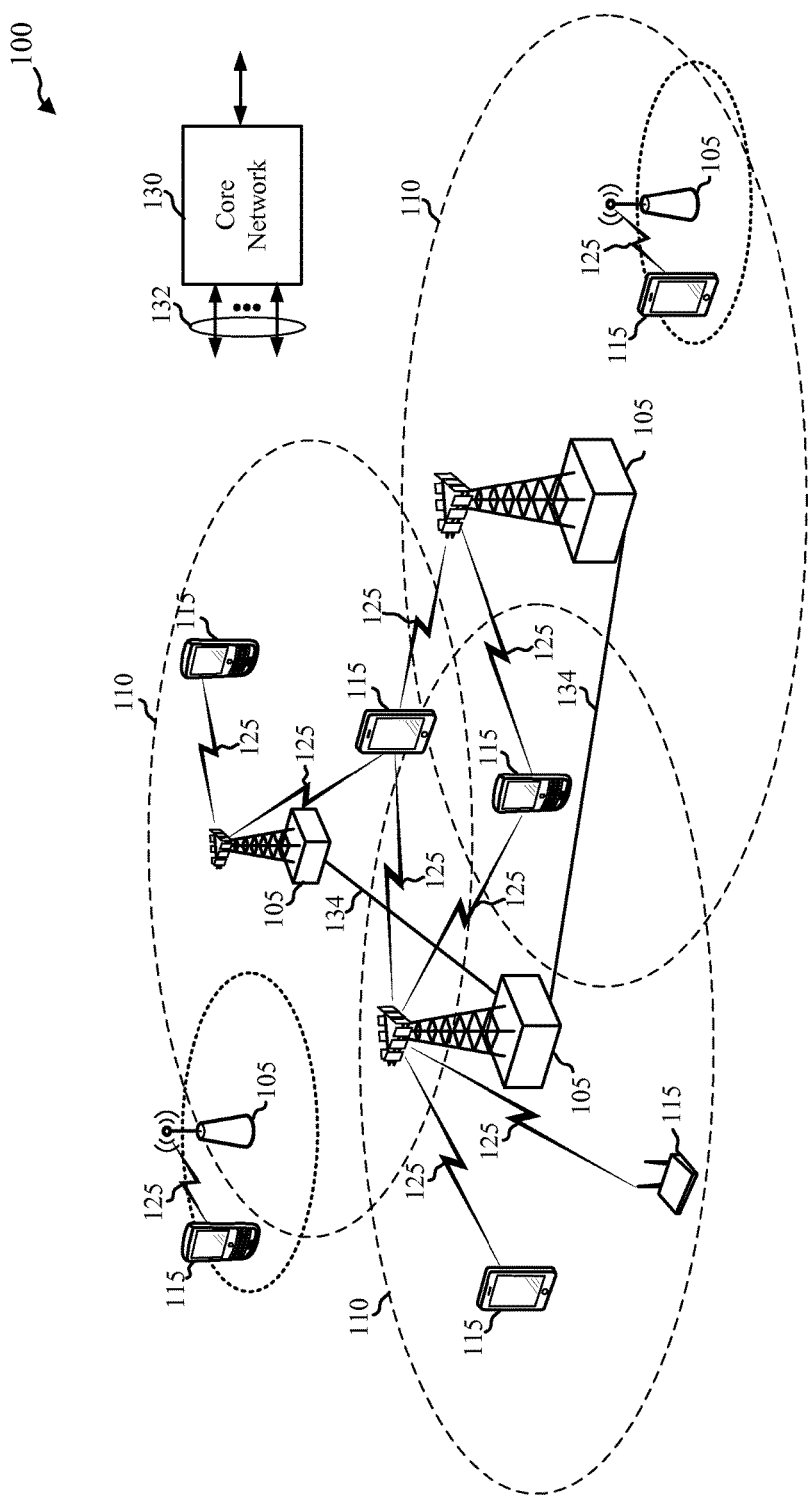
FIG. 1 shows a block diagram of a wireless communication system, in accordance with various aspects of the present disclosure.

Techniques are described in which emergency data is transmitted over an unlicensed radio frequency spectrum band (e.g., a radio frequency spectrum band for which apparatuses may need to contend for access because the radio frequency spectrum band is available, at least in part, for unlicensed use such as Wi-Fi use and/or unlicensed Long Term Evolution (LTE)/LTE-Advanced (LTE-A) use). In some examples, the unlicensed radio frequency spectrum band may be used for cellular communications (e.g., LTE communications and/or LTE-A communications).

With increasing data traffic in cellular networks, the offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. In some cases, all communication between a base station and a user equipment (UE) may occur over an unlicensed radio frequency spectrum band.

Prior to gaining access to, and communicating data over, an unlicensed radio frequency spectrum band, a transmitting apparatus may, in some examples, perform a listen before talk (LBT) procedure to gain access to the unlicensed radio frequency spectrum band. Such an LBT procedure may include performing a clear channel assessment (CCA) to determine whether a channel of the unlicensed radio frequency spectrum band is available. When it is determined that a channel is not available, a CCA may be performed for the channel again at a later time. The unpredictable nature of obtaining access to an unlicensed radio frequency spectrum band can make the transmission of emergency data over the unlicensed radio frequency spectrum band difficult.

In some examples of the described techniques, a node (e.g., a base station or a UE) associated with an operator in a deployment of operators may be allowed to autonomously adjust an LBT yielding parameter (e.g., the N parameter and/or the K parameter of an N/K protocol) of the node in response to a determination that the node has emergency data to transmit. An N/K protocol is a protocol under which a node does not attempt to access an unlicensed radio frequency spectrum band after N attempts to access the unlicensed radio frequency spectrum band. An LBT yielding parameter may be adjusted by, for example, increasing a value of the N parameter or decreasing a value of the K parameter of an N/K protocol, thereby increasing the duration over which a node may potentially retain access to an unlicensed radio frequency spectrum band for the purpose of transmitting emergency data.

In other examples of the described techniques, a node (e.g., a base station or a UE) associated with an operator in a deployment of operators may be allowed to autonomously adjust a CCA opportunity of the node in response to a determination that the node has emergency data to transmit. In this manner, the node may perform a CCA earlier in time, thereby increasing its chances to gain access to an unlicensed radio frequency spectrum band.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more evolved NodeBs (eNBs)), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an eNB, a Home NodeB, a Home eNodeB, a wireless local area network (WLAN) access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the spectrum band is licensed to particular users for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use). In other examples, the wireless communication system 100 may support wireless communication using one or more access technologies different from LTE/LTE-A. In LTE/LTE-A communication systems, the term evolved NodeB or eNB may be used, for example, to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN (e.g., Wi-Fi) access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a particular mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and/or a standalone mode in which LTE/LTE-A downlink and uplink communications between a base station 105 and a UE 115 may take place in an unlicensed radio frequency spectrum band. Base stations 105 as well as UEs 115 may in some examples support one or more of these or similar modes of operation. OFDMA waveforms may be used in the communication links 125 for LTE/LTE-A downlink communications in a licensed radio frequency spectrum band and/or an unlicensed radio frequency spectrum band, while OFDMA, SC-FDMA and/or resource block interleaved FDMA waveforms may be used in the communication links 125 for LTE/LTE-A uplink communications in a licensed radio frequency spectrum band and/or an unlicensed radio frequency spectrum band.

At times, one or more of the base stations 105 and/or UEs 115 of the wireless communication system 100 may have emergency data to transmit. The emergency data may include, for example, information such as amber alerts, weather alerts, tsunami alerts, etc. Under some scenarios, emergency data may be transmitted over a licensed radio frequency spectrum band using LTE/LTE-A communications. For example, emergency data including basic text may be transmitted over a licensed radio frequency spectrum band in system information block (SIB) 10, 11, and/or 12, while rich content emergency data may be transmitted over an LTE/LTE-A evolved multimedia broadcast multicast service (eMBMS). When rich content emergency data is transmitted over an eMBMS, an indication that a UE 115 should read the rich content emergency data may be transmitted via SIB 10, 11, and/or 12.

Under other scenarios, it may be desirable or necessary to transmit emergency data over an unlicensed radio frequency spectrum band. However, because an apparatus (e.g., a base station 105 or UE 115) may need to contend for access to the unlicensed radio frequency spectrum band, there may be times when the unlicensed radio frequency spectrum band is not free, and a base station 105 or UE 115 may be unable to transmit emergency data. At other times, a base station 105 or UE 115 may only be able to transmit emergency data after an unpredictable delay (e.g., a delay of unknown duration), which delay may not be suitable for the transmission of time-sensitive emergency data.

Figure 2:
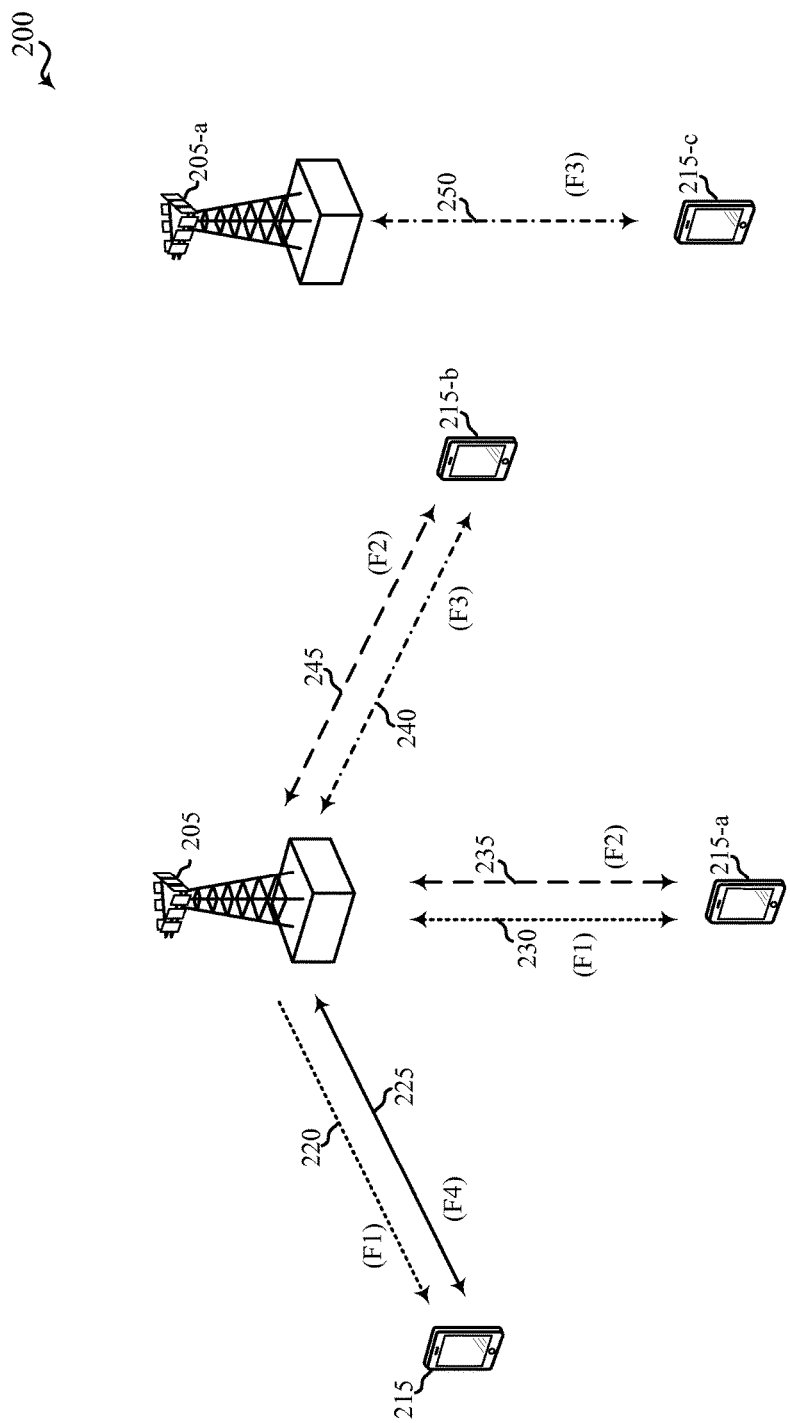
FIG. 2 shows a wireless communication system in which Long Term Evolution (LTE)/LTE-Advanced (LTE-A) is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). In some examples, the downlink channel 220 may be used to transmit emergency data from the first base station 205 to the UE 215. A supplemental downlink scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). When there is a need to transmit emergency data between the first base station 205 and the second UE 215-a or third UE 215-b, the emergency data may be transmitted over the licensed radio frequency spectrum band and/or the unlicensed radio frequency spectrum band. The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, and/or resource block interleaved FDMA waveforms from the fourth UE 215-c using the bidirectional link 250. The bidirectional link 250 may be associated with the frequency F3 in the unlicensed radio frequency spectrum band. When there is a need to transmit emergency data between the second base station 205-a and the fourth UE 215-c, the emergency data may need to be transmitted over the unlicensed radio frequency spectrum band because transmission of the emergency data over a licensed radio frequency spectrum band may not be an option. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-a described with reference to FIGS. 1 and/or 2, and/or one of the UEs 115, 215, 215-a, 215-b, and/or 215-c described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting apparatus whether a channel of an unlicensed radio frequency spectrum band is available or in use during the gating interval (also referred to as an LBT frame or a CCA frame). When a CCA indicates that the channel is available (e.g., "clear" for use) during a corresponding LBT frame, the transmitting apparatus may reserve and/or use the channel of the unlicensed radio frequency spectrum band during part or all of the LBT frame. When the CCA procedure indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure (e.g., a periodic LTE/LTE-A radio frame structure). Examples of such synchronization are shown in FIG. 3.

Figure 3:
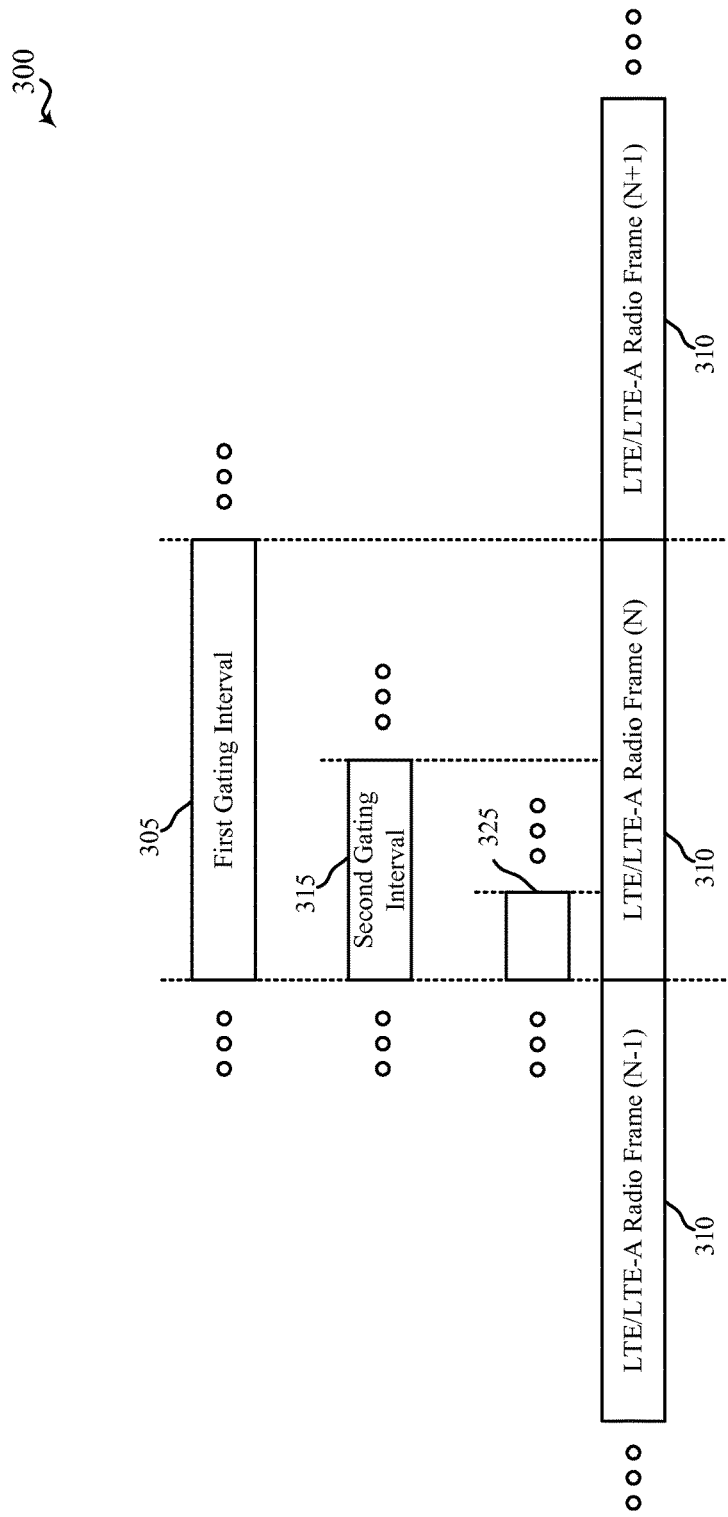
FIG. 3 shows examples of a gating interval (or listen-before-talk (LBT) frame) in an unlicensed radio frequency spectrum band, in accordance with various aspects of the present disclosure.

FIG. 3 shows examples 300 of a gating interval (or LBT frame) in an unlicensed radio frequency spectrum band, in accordance with various aspects of the present disclosure. A first gating interval 305, a second gating interval 315, and/or a third gating interval 325 may be used as a periodic gating interval by an eNB or UE that supports transmissions over the unlicensed radio frequency spectrum band. Examples of such an eNB may include the base station 105, 205, and/or 205-a described with reference to FIGS. 1 and/or 2, and examples of such a UE may include the UE 115, 215, 215-a, 215-b, and/or 215-c described with reference to FIGS. 1 and/or 2. The first gating interval 305, the second gating interval 315, and/or the third gating interval 325 may in some examples be used with the wireless communication system 100 and/or 200 described with reference to FIGS. 1 and/or 2.

By way of example, the duration of the first gating interval 305 is shown to be equal to (or approximately equal to) a duration of an LTE/LTE-A radio frame 310 of a periodic frame structure associated with a cellular downlink. In some examples, "approximately equal" means the duration of the first gating interval 305 is within a cyclic prefix (CP) duration of the duration of the periodic frame structure.

At least one boundary of the first gating interval 305 may be synchronized with at least one boundary of the periodic frame structure that includes the LTE/LTE-A radio frames N−1 to N+1. In some cases, the first gating interval 305 may have boundaries that are aligned with the frame boundaries of the periodic frame structure. In other cases, the first gating interval 305 may have boundaries that are synchronized with, but offset from, the frame boundaries of the periodic frame structure. For example, the boundaries of the first gating interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic frame structure associated with the cellular downlink. In some examples, an "approximate submultiple of" means the duration of the second gating interval 315 and/or the third gating interval 325 is within a CP duration of the duration of a sub-multiple of (e.g., half or one-fifth) the periodic frame structure. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of the unlicensed radio frequency spectrum band.

Figure 4A:
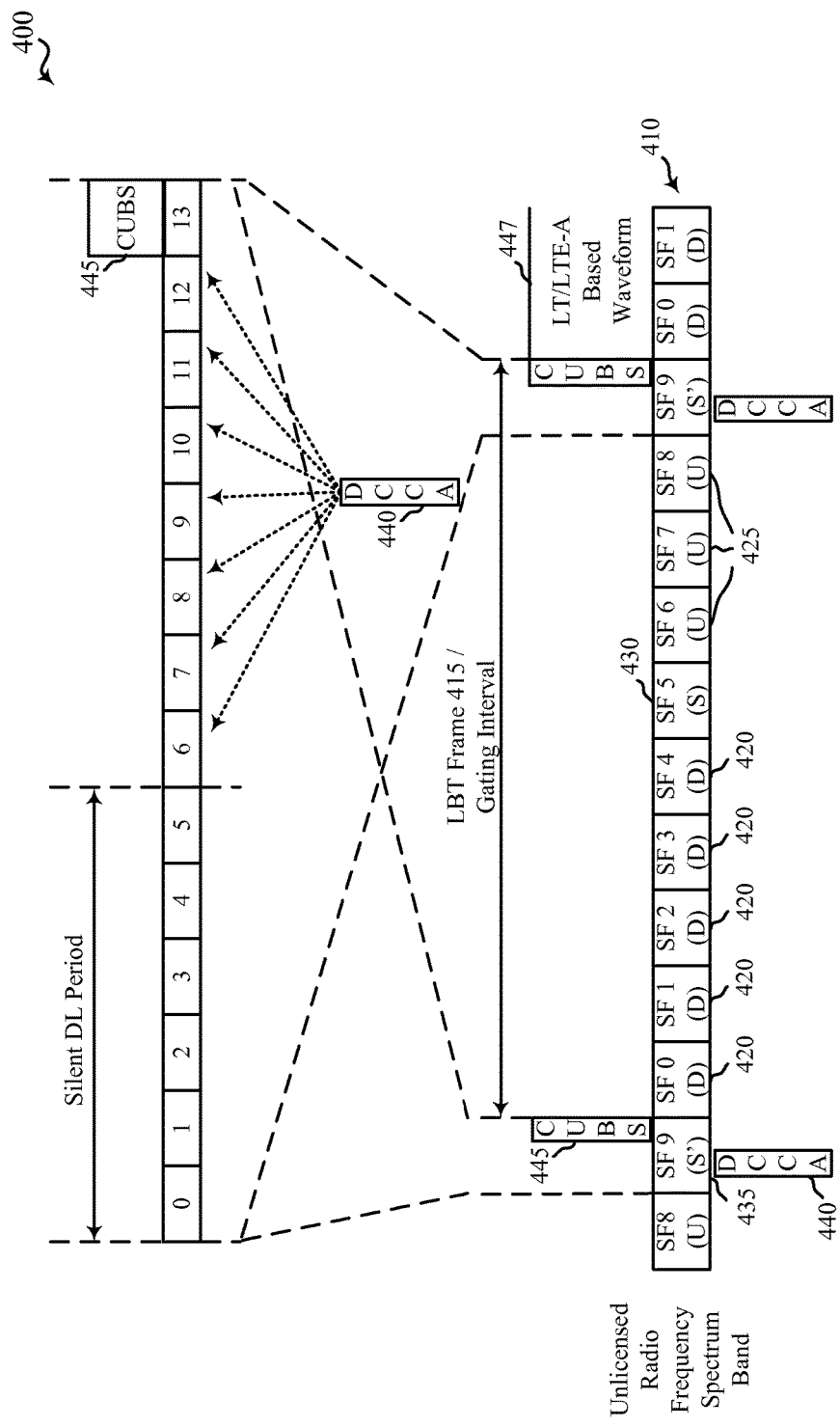
FIG. 4A shows an example of wireless communication over an unlicensed radio frequency spectrum band, in accordance with various aspects of the present disclosure.

FIG. 4A shows an example 400 of wireless communication 410 over an unlicensed radio frequency spectrum band, in accordance with various aspects of the present disclosure. An LBT frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 435 may provide a transition between uplink subframes 425 and downlink subframes 420.

During the S' subframe 435, a downlink CCA (DCCA) 440 may be performed by one or more base stations, such as one or more of the base stations 105, 205, and/or 205-a described with reference to FIGS. 1 and/or 2, to reserve, for a period of time, the channel over which the wireless communication 410 occurs. Following a successful DCCA 440 by a base station, the base station may transmit a channel usage beacon signal (CUBS) 445 to provide an indication to other base stations and/or apparatuses (e.g., UEs, Wi-Fi access points, etc.) that the base station has reserved the channel. In some examples, a CUBS 445 may be transmitted using a plurality of interleaved resource blocks. Transmitting a CUBS 445 in this manner may enable the CUBS 445 to occupy at least a certain percentage of the available frequency bandwidth in the unlicensed radio frequency spectrum band and satisfy one or more regulatory requirements (e.g., a requirement that the CUBS 445 occupy at least 80% of the available frequency bandwidth). The CUBS 445 may in some examples take a form similar to that of an LTE/LTE-A cell-specific reference signal (CRS) and/or channel state information reference signal (CSI-RS). Following the transmission of the CUBS 445, an LTE/LTE-A based waveform 447 may be transmitted, from a base station to a UE, over the unlicensed radio frequency spectrum band.

The S' subframe 435 may include 14 OFDM symbols, numbered 0 through 13 in FIG. 4A. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for the DCCA 440. In the example 400, the S' subframe 435 includes seven DCCA opportunities, included in symbols 6 through 12. Use of the DCCA opportunities by different network operators may be coordinated to provide more efficient system operation (e.g., synchronous system operation). In some examples, in order to determine which of the seven possible DCCA opportunities to use to perform a DCCA 440, a base station 105 may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a gating interval or frame for which the DCCA 440 is performed.

Figure 4B:
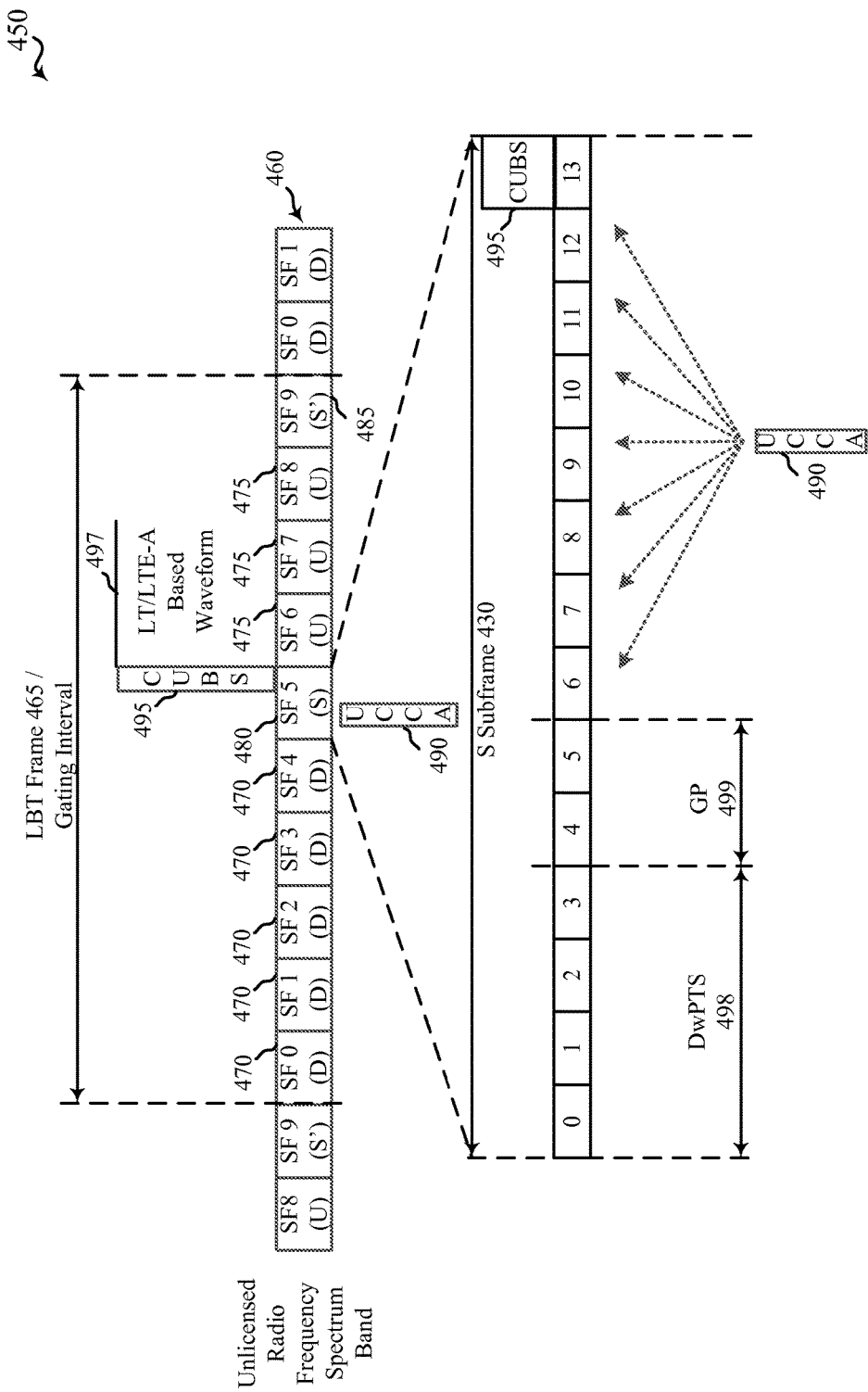
FIG. 4B shows an example of a wireless communication over an unlicensed radio frequency spectrum band, in accordance with various aspects of the present disclosure.

FIG. 4B shows an example 400 of a wireless communication 460 over an unlicensed radio frequency spectrum band, in accordance with various aspects of the present disclosure. An LBT frame 465, which may correspond to a gating interval such as the first gating interval 305 described with reference to FIG. 3 and/or the LBT frame 415 described with reference to FIG. 4A, may have a duration of ten milliseconds and include a number of downlink subframes 470, a number of uplink subframes 475, and two types of special subframes (e.g., an S subframe 480 and an S' subframe 485. The S subframe 480 may provide a transition between downlink subframes 470 and uplink subframes 475, while the S' subframe 485 may provide a transition between uplink subframes 475 and downlink subframes 470. During the S subframe 480, an uplink CCA (UCCA) 490 may be performed by one or more UEs, such as one or more of the UEs 115, 215, 215-a, 215-b, and/or 215-c described above with reference to FIGS. 1 and/or 2, to reserve, for a period of time, the channel over which the wireless communication 460 occurs. Following a successful UCCA 490 by a UE, the UE may transmit a CUBS 495 to provide an indication to other UEs and/or apparatuses (e.g., base stations, Wi-Fi access points, etc.) that the UE has reserved the channel. In some examples, a CUBS 495 may be transmitted using a plurality of interleaved resource blocks. Transmitting a CUBS 495 in this manner may enable the CUBS 495 to occupy at least a certain percentage of the available frequency bandwidth in the unlicensed radio frequency spectrum band and satisfy one or more regulatory requirements (e.g., a requirement that the CUBS 495 occupy at least 80% of the available frequency bandwidth). The CUBS 495 may in some examples take a form similar to that of an LTE/LTE-A CRS and/or CSI-RS. Following the transmission of the CUBS 495, an LTE/LTE-A based waveform 497 may be transmitted, from a UE to a base station, over the unlicensed radio frequency spectrum band.

The S subframe 480 may include 14 OFDM symbols, numbered 0 through 13 in FIG. 4B. A first portion of the S subframe 480, symbols 0 through 3 in this example, may be used as a downlink pilot time slot (DwPTS) 498, and a second portion of the S subframe 480 may be used as a guard period (GP) 499. A third portion of the S subframe 480 may be used for UCCA 490. In the example 400, the S subframe 480 includes seven UCCA opportunities, included in symbols 6 through 12. Use of the UCCA opportunities by different UEs may be coordinated to provide more efficient system operation (e.g., synchronous system operation). In some examples, in order to determine which of the seven possible UCCA opportunities to use to perform a UCCA 490, a UE may evaluate a mapping-function of the form:

$$F_U(\text{GroupID}, t) \in \{1,2,3,4,5,6,7\}$$

where GroupID is a "deployment group-id" assigned to the UE, and t is the LBT frame number corresponding to a frame for which a UCCA 490 is performed.

The mapping function for a DCCA 440 and/or a UCCA 490 may be constructed based on different criteria, depending on whether the mapping function will have an orthogonalization or a non-orthogonalization property. In examples with orthogonal LBT access, the mapping function may have an orthogonalization property according to:

$$F_{D/U}(x,t) \neq F_{D/U}(y,t)$$

$$\text{GroupID } x,y \in \{1,2,3,4,5,6,7\}$$

for all time t, whenever x≠y represent different group-ids. In this case, base stations and/or UEs with different group-ids may perform CCAs (e.g., DCCAs 440 and/or UCCAs 490) during non-overlapping CCA opportunities. In the absence of interference, the base station or UE with the group-id which maps to an earlier CCA opportunity may secure the channel for a period of time. According to various deployments, the mapping-function is fair, in the sense that across different time indices t, the mapping $\{F_{D/U}(x,t), t=1, 2, 3, \ldots\}$ varies such that different group-ids have an equal chance of mapping to an earlier CCA opportunity (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, leading to enhanced system throughput. Base stations and/or UEs of different deployments may be assigned different group-ids, so that with orthogonal CCA opportunity mapping, access to the channel is mutually exclusive.

In examples with non-orthogonal, or overlapping, CCA opportunity access, the mapping function may allow more than seven group ids. In some situations, for example, it may be useful to support more than seven deployment group-ids, in which case it is not possible to maintain the orthogonality property of CCA opportunity mapping functions. In such cases, it may be desirable to reduce the frequency of collision between any two group-ids. In some examples, non-orthogonal CCA opportunity mapping sequences may also be used to provide fair channel access among deployments without tight coordination on LBT opportunities. One example of a non-orthogonal CCA opportunity mapping sequence is given by:

$$F_{D/U}(x,t) = R_{1,7}(x,t)$$

$$\text{GroupID } x = \in \{1,2, \ldots 2^{16}\}$$

where $R_{1,7}(x,t)$ is a pseudo-random number generator between 1 and 7 chosen independently for GroupID x. In this case, there could be potential collisions between base stations and/or UEs of different GroupIDs in the same LBT frame t.

Thus, CCA opportunities may be selected according to the noted mapping functions and used for a DCCA 440 and/or a UCCA 490. Upon successfully contending for access to an unlicensed radio frequency spectrum band by performing a successful DCCA 440 or UCCA 490, a transmitting apparatus (e.g., a base station such as the base station 105, 205, or 205-a described with reference to FIG. 1 or 2, or a UE such as the UE 115, 215, 215-a, 215-b, or 215-c described with reference to FIG. 1 or 2) may use the unlicensed radio frequency spectrum band to transmit, for example, emergency data. However, the failure of a transmitting apparatus to successfully contend for access to the unlicensed radio frequency spectrum may result in unacceptable lag times before emergency data is transmitted.

In the case of synchronous operators, the sharing of an unlicensed radio frequency spectrum band by different synchronous operators may be facilitated by providing fair access to the number of CCA opportunities described with reference to FIGS. 4A and/or 4B, where FIG. 4A shows a number of CCA opportunities in which a DCCA 440 may be performed and FIG. 4B shows a number of CCA opportunities in which a UCCA 490 may be performed. However, in the case of asynchronous operators, in which transmissions of a first base station of a first operator are asynchronous to transmissions of a second base station of a second operator, the sharing of an unlicensed radio frequency spectrum band may be facilitated by use of an N/K protocol, in which a base station that successfully performs CCA for N consecutive LBT frames does not participate in an LBT procedure over the next K LBT frames. In this manner, for example, the second base station of the second operator may be provided with an opportunity to gain access to a channel of the unlicensed radio frequency spectrum band despite there being no procedure to synchronously change the temporal order in which the CCAs of the first operator and the second operator are performed (i.e., the CCA timing of the first operator and the second operator) from one LBT frame to a next LBT frame. Values of N may be, for example, 2, 3, 4, or 5 LBT frames, and values of K may be, for example, 0 or 1 LBT frame. The duration of an LBT frame may be, for example, ten, five, or two milliseconds, as represented, respectively, by the first gating interval 305, the second gating interval 315, and the third gating interval 325

(see, e.g., FIG. 3). A ten millisecond first gating interval 305 or LBT frame corresponds to the duration of the LTE/LTE-A radio frame 310.

Figure 5:
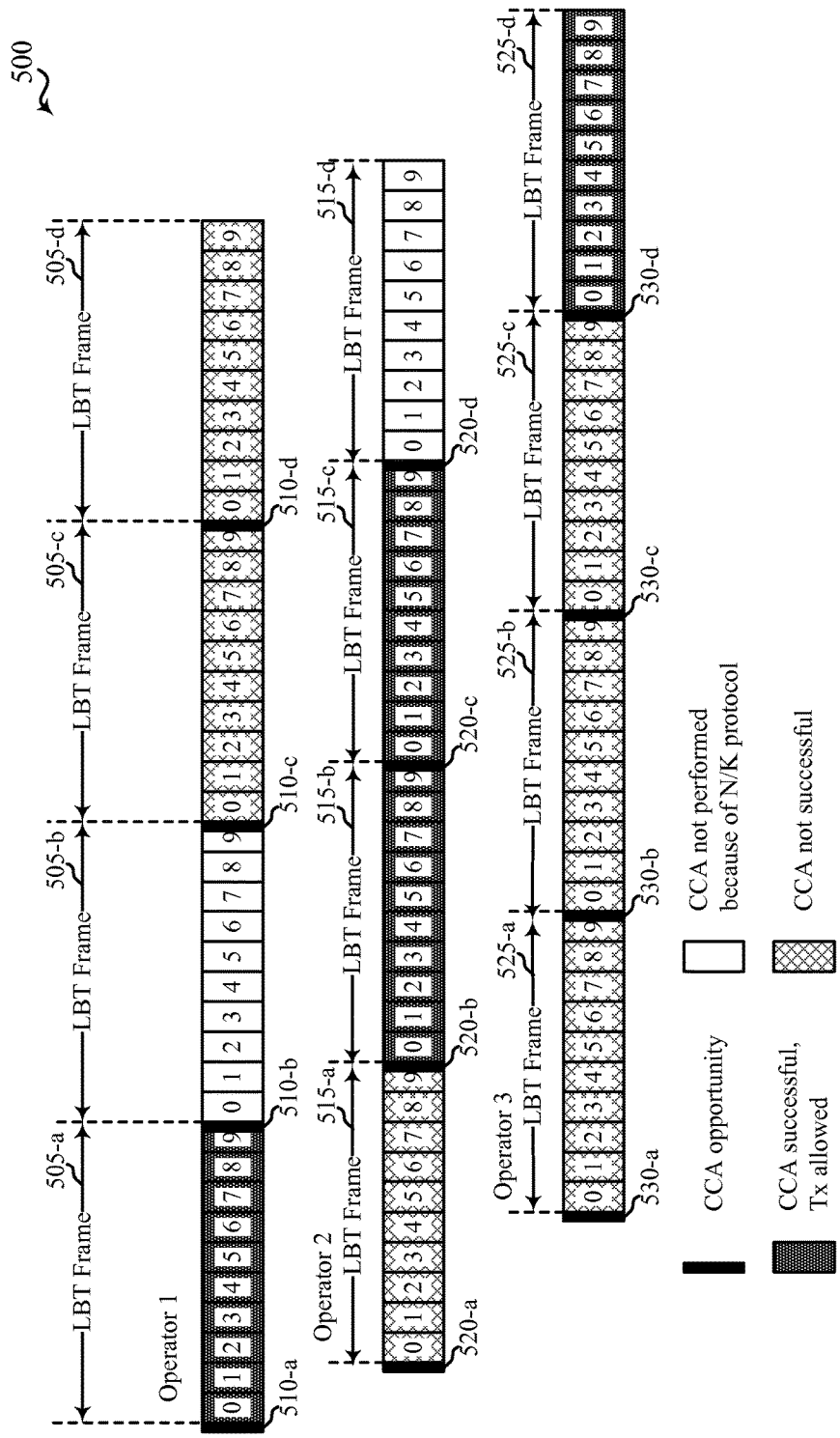
FIG. 5 shows an example of how an N/K protocol may be applied to the transmitting apparatuses (e.g., base stations and/or user equipments (UEs)) of different asynchronous operators, in accordance with various aspects of the present disclosure.

FIG. 5 shows an example 500 of how an N/K protocol may be applied to the transmitting apparatuses (e.g., base stations and/or UEs) of different asynchronous operators, in accordance with various aspects of the present disclosure. More particularly, FIG. 5 shows example transmissions over an unlicensed radio frequency spectrum band by transmitting apparatuses of three different asynchronous operators (e.g., Operator 1, Operator 2, and Operator 3). As shown, a transmitting apparatus (or apparatuses) of Operator 1 may gain access to the unlicensed radio frequency spectrum band during a first LBT frame 505-a after successfully performing a first CCA 510-a to contend for access to the unlicensed radio frequency spectrum band. Assuming an N/K protocol is in effect, and that the transmitting apparatus of Operator 1 satisfies its threshold of N LBT frames with its use of the first LBT frame 505-a, the transmitting apparatus of Operator 1 may forego performing a second CCA 510-b and not transmit over the unlicensed radio frequency spectrum band during a second LBT frame 505-b. Assuming that K=1 in the N/K protocol applied by the transmitting apparatus of Operator 1, the transmitting apparatus of Operator 1 may, at a next CCA opportunity, be authorized by the N/K protocol to perform a third CCA 510-c to contend for access to a third LBT frame 505-c. However, the third CCA 510-c may not be successful because a transmitting apparatus of Operator 2 is using (or has reserved) the unlicensed radio frequency spectrum band during the third LBT frame 505-c. At a further CCA opportunity, the transmitting apparatus of Operator 1 may be authorized by the N/K protocol to perform a fourth CCA 510-d to contend for access to the unlicensed radio frequency spectrum band during a fourth LBT frame 505-d. However, the fourth CCA 510-d may not be successful because a transmitting apparatus of Operator 2 is using (or has reserved) the unlicensed radio frequency spectrum band during the third LBT frame 505-d.

A transmitting apparatus (or apparatuses) of Operator 2 may perform a fifth CCA 520-a to contend for access to the unlicensed radio frequency spectrum band during a fifth LBT frame 515-a. However, because a transmitting apparatus of Operator 1 is already using (or has reserved) the unlicensed radio frequency spectrum band, the fifth CCA 520-a may not be successful and the transmitting apparatus of Operator 2 may not transmit over the unlicensed radio frequency spectrum band during the fifth LBT frame 515-a. At a next CCA opportunity, the transmitting apparatus of Operator 2 may perform a sixth CCA 520-b to contend for access to a sixth LBT frame 515-b. Because the unlicensed radio frequency spectrum band is not in use, the transmitting apparatus of Operator 2 may win contention to access the unlicensed radio frequency spectrum band during the sixth LBT frame 515-b and access the unlicensed radio frequency spectrum band during the sixth LBT frame 515-b. The transmitting apparatus of Operator 2 may similarly perform a seventh CCA 520-c to contend for access to a seventh LBT frame 515-c, and because no other operator is using or contending for the unlicensed radio frequency spectrum band, the transmitting apparatus of Operator 2 may win contention to access the unlicensed radio frequency spectrum band during the seventh LBT frame 515-c and access the unlicensed radio frequency spectrum band during the seventh LBT frame 515-c. However, assuming that N=2 and K=1 in the N/K protocol, the transmitting apparatus of Operator 2 may forego performing an eighth CCA 520-d and not transmit over the unlicensed radio frequency spectrum band during an eighth LBT frame 515-d.

A transmitting apparatus (or apparatuses) of Operator 3 may perform a ninth CCA 530-a to contend for access to the unlicensed radio frequency spectrum band during a ninth LBT frame 525-a. However, because a transmitting apparatus of Operator 1 is already using the unlicensed radio frequency spectrum band, the ninth CCA 530-a may not be successful, and the transmitting apparatus of Operator 3 may not win contention to access the unlicensed radio frequency spectrum band during the ninth LBT frame 525-a. The transmitting apparatus of Operator 3 may similarly perform a tenth CCA 530-b and an eleventh CCA 530-c to contend for access, respectively, to a tenth LBT frame 525-b and an eleventh LBT frame 525-c. However, because a transmitting apparatus of Operator 2 is already using the unlicensed radio frequency spectrum band, the tenth CCA 530-b and the eleventh CCA 530-c may not be successful, and the transmitting apparatus of Operator 3 may not win contention to access the unlicensed radio frequency spectrum band during the tenth LBT frame 525-b or the eleventh LBT frame 525-c. At a next CCA opportunity, the transmitting apparatus of Operator 3 may perform a twelfth CCA 530-d to contend for access to a twelfth LBT frame 525-d. Because the unlicensed radio frequency spectrum band is not in use, the twelfth CCA 530-d may be successful and the transmitting apparatus of Operator 3 may transmit over the unlicensed radio frequency spectrum band during the twelfth LBT frame 525-d.

Although the CCA opportunities described with reference to FIGS. 4A and/or 4B may provide different synchronous operators fair access to an unlicensed radio frequency spectrum band, and the N/K protocol described with reference to FIG. 5 may provide different asynchronous operators fair access to an unlicensed radio frequency spectrum band, the techniques described with reference to FIGS. 4A, 4B, and/or 5 may not provide timely enough access for the transmission of emergency data.

Figure 6:
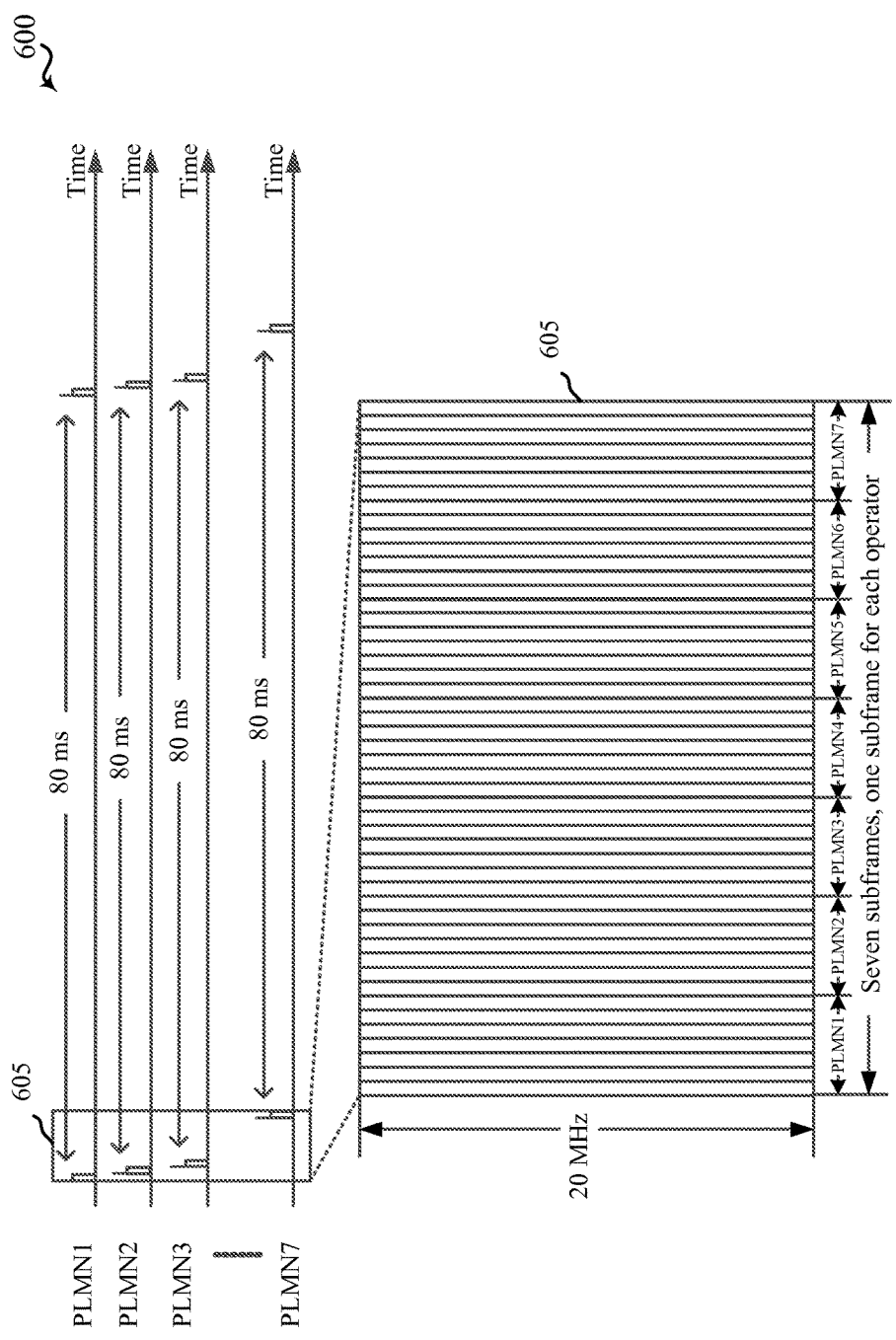
FIG. 6 shows an example of resource allocations for clear channel assessment (CCA)-Exempt Transmissions (CETs) of synchronous operators in an unlicensed radio frequency spectrum band, in accordance with various aspects of the present disclosure.

FIG. 6 shows an example 600 of resource allocations for CCA-Exempt Transmissions (CETs) of synchronous operators in an unlicensed radio frequency spectrum band, in accordance with various aspects of the present disclosure. A CET may be made without a need to perform a CCA (e.g., a DCCA or a UCCA) to first gain access to the unlicensed radio frequency spectrum band. Instead, an operator is exempted from performing a CCA for the purpose of transmitting a CET.

As shown, an allocation of resources 605 for CETs may be made, for example, once every eighty milliseconds (80 ms) or once every CET period, where the CET period may have a configurable periodicity. Each of a number of operators in the unlicensed spectrum (e.g., different PLMNs) may be provided a separate subframe (shown) or subframes (not shown) for transmitting CETs. By way of example, FIG. 6 shows adjacent CET subframes for seven different operators (e.g., operators PLMN1, PLMN2, . . . , PLMN7). Such a CET transmission framework may be applicable to a downlink and/or uplink between a base station and a UE.

Figure 7:
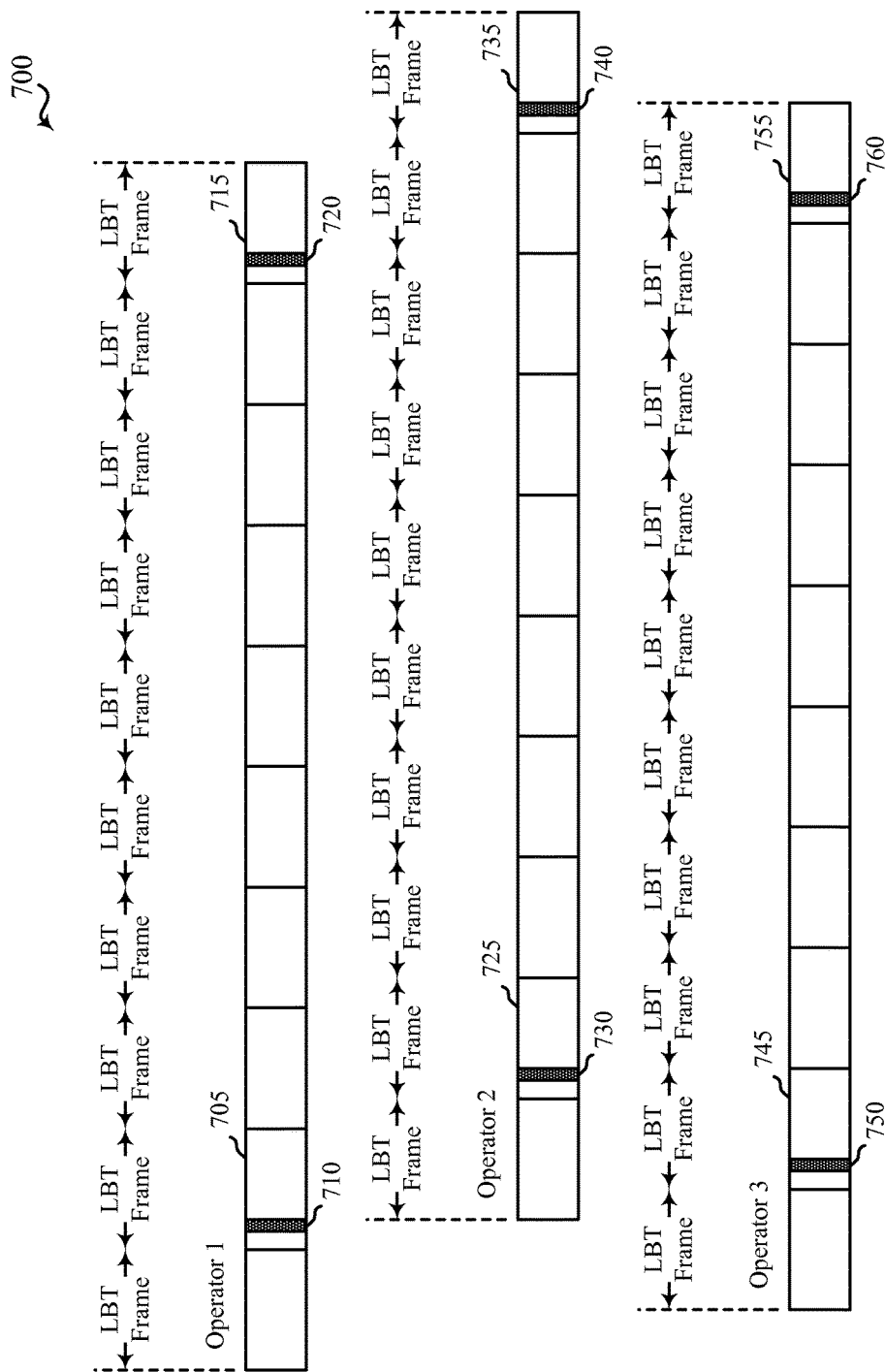
FIG. 7 shows an example of resource allocations for CETs of asynchronous operators (e.g., Operator 1, Operator 2, and/or Operator 3) in an unlicensed radio frequency spectrum band, in accordance with various aspects of the present disclosure

FIG. 7 shows an example 700 of resource allocations for CETs of asynchronous operators (e.g., Operator 1, Operator 2, and/or Operator 3) in an unlicensed radio frequency spectrum band, in accordance with various aspects of the present disclosure. As shown, an allocation of resources for CETs may be made, for example, once every eighty milliseconds (80 ms). Therefore, when the length of an LBT frame is ten milliseconds, resources for CETs may be allocated in every eighth LBT frame (e.g., resources for a first CET 710 and a second CET 720 may be respectively allocated in a first LBT frame 705 and a second LBT frame 715 for Operator 1; resources for a third CET 730 and a fourth CET 740 may be respectively allocated in a third LBT frame 725 and a fourth LBT frame 735 for Operator 2; and resources for a fifth CET 750 and a sixth CET 760 may be respectively allocated in a fifth LBT frame 745 and a sixth LBT frame 755 for Operator 3). In alternate examples, the durations of the LBT frames may be shorter or longer, or CET resources may be allocated more or less often (e.g., once every fifty milliseconds, once every 160 milliseconds, or once every 320 milliseconds).

When transmitting a CET, an operator (e.g., Operator 1, Operator 2, and/or Operator 3) does not need to perform a CCA to first gain access to the unlicensed radio frequency spectrum band. Instead, each of the operators (e.g., Operator 1, Operator 2, and Operator 3) is exempted from performing a CCA for the purpose of transmitting the first CET 710, the second CET 720, the third CET 730, the fourth CET 740, the fifth CET 750, and the sixth CET 760.

Because the operators (e.g., Operator 1, Operator 2, and Operator 3) operate asynchronously, the timings of the first CET 710, the second CET 720, the third CET 730, the fourth CET 740, the fifth CET 750, and the sixth CET 760 of different operators are not confined to a particular CET period understood by all operators (e.g., Operator 1, Operator 2, and Operator 3), and may be separated by timing gaps. Such a structure may be applicable to downlink subframes and/or uplink subframes.

In some examples, each CET described with reference to FIGS. 6 and/or 7 may include discovery signals (e.g., synchronization signals and/or reference signals), system information, and/or configuration information. In some examples, the configuration information may be transmitted as part of an enhanced physical broadcast channel (ePBCH) and/or a physical downlink shared channel (PDSCH). In the case of a base station operated in a supplemental downlink mode using an unlicensed radio frequency spectrum band, a CET may in some cases include discovery signals plus a global cell identifier (i.e., a global cell ID). In the case of a base station operated in a standalone mode using an unlicensed radio frequency spectrum band, a CET may in some cases include a full set of system information and possibly paging channel information.

In some examples, a CET described with reference to FIGS. 6 and/or 7 may include emergency data (e.g., basic text emergency data). In other examples, a CET described with reference to FIGS. 6 and/or 7 may include an indication that a transmitting apparatus has emergency data to transmit. Some or all of the emergency data may then be transmitted during one or more LBT frames of the unlicensed radio frequency spectrum band.

Techniques described herein, in some examples, may enable a node (e.g., a base station or a UE) associated with an operator in a deployment of operators to autonomously adjust an LBT yielding parameter (e.g., the N parameter and/or the K parameter of an N/K protocol) of the node in response to a determination that the node has emergency data to transmit. For example, consider a first node associated with a first operator in a deployment of operators. When the first node does not have emergency data to transmit, the first node may employ an N/K protocol with N=N0 and K=K0 (e.g., an N/K protocol with default values). In response to a determination that the first node has emergency data to transmit, the first node may adjust the value of N to N=N1 and/or adjust the value of K to K=K1. In some examples, N1 may be greater than N0 and/or K1 may be less than K0 (and in some examples, K1 may be zero), thereby enabling the first node to potentially retain access to the unlicensed radio frequency spectrum band for a longer period of time than when N=N0 and K=K0 (e.g., until a transmission of emergency data has been completed).

In some examples, the value of N1 and/or K1 used by the first node may be a function of a total number of operators (e.g., a total number of operators including the first operator and any neighbor operators) that have nodes with emergency data to transmit, which nodes need to transmit emergency data simultaneously with the first node's transmission of emergency data. When no other operator has a node with emergency data to transmit simultaneously with the first node's transmission of emergency data, the first node may set K to K=0, such that the first node may contend for access to every frame of the unlicensed radio frequency spectrum band, until such time that the first node has completed its emergency data transmission. When all other operators (or a threshold number of operators) have a node with emergency data to transmit simultaneously with the first node's transmission of emergency data, the first node may not adjust the value of N or K (e.g., the first node may leave the value of N at N=N0 and leave the value of K at K=K0), or the first node may adjust the values of N and K to match the values of N and K used by other operators having emergency data to transmit. In some examples, the first node may determine that another node has emergency data to transmit over the unlicensed radio frequency spectrum band by receiving, from the other node, a signal including an indication that the second node has emergency data to transmit.

In some examples, a node that does not have emergency data to transmit may yield the unlicensed radio frequency spectrum band (or a channel thereof) to the first node upon detecting that the first node has emergency data to transmit, so that the first node may transmit its emergency data. When yielding the unlicensed radio frequency spectrum band, a node may yield the unlicensed radio frequency spectrum band in the LBT frame following its detection that the first node has emergency data to transmit. In some examples, a node that does not have emergency data to transmit may continue to apply an N/K protocol with default values (e.g., N=N0 and K=K0).

When a node has emergency data to transmit over an unlicensed radio frequency spectrum band, the node may transmit a signal over the unlicensed radio frequency spectrum band. The signal may be transmitted with an indication that the node has emergency data to transmit. In some examples, the signal may also include an indication of a maximum time span of a transmission of the emergency data. The indication of the maximum time span of the transmission of the emergency data may enable other nodes to yield the unlicensed radio frequency spectrum band (or a channel thereof) for only the frames and/or subframes needed by the first node to transmit the emergency data. In some examples, the signal indicating that a node has emergency data to transmit is transmitted using the CET transmission over the unlicensed radio frequency spectrum band.

In some examples, emergency data may be transmitted over an MBMS. Emergency data may in some cases be transmitted following transmission of a signal indicating that a node has emergency data to transmit. In some examples, all available transmission resources in the unlicensed radio frequency spectrum band may be allocated to the MBMS during the transmission of the emergency data. In other examples, available transmission resources in the unlicensed radio frequency spectrum band may be divided between the MBMS (e.g., an evolved MBMS (eMBMS)) and unicast during transmission of the emergency data, and the emergency data may be transmitted over both the MBMS and the unicast. In examples where emergency data is transmitted over an MBMS, a multicast traffic channel (MTCH) scheduling period (MSP) may be aligned to a CET period of a node transmitting emergency data. In some examples, a second CET may be transmitted to indicate that a node has completed transmitting emergency data.

When emergency data is transmitted over a multicast-broadcast single-frequency network (MBSFN) for an operator (e.g., a PLMN), autonomous adjustment of one or more LBT yielding parameters by one or more nodes may artificially bias the operator's unicast. To mitigate this effect, all available transmission resources in the unlicensed radio frequency spectrum band may be allocated to the MBSFN.

When a node has no more emergency data to transmit, it may revert back an original value (or values) of one or more LBT yielding parameters. When reverting back to an N=N0 value of an N parameter following the application of an N=N1 value of the N parameter, a node may obtain the benefit of the N1 value or the N0 value (and not the N1 value plus the N0 value).

Figure 8:
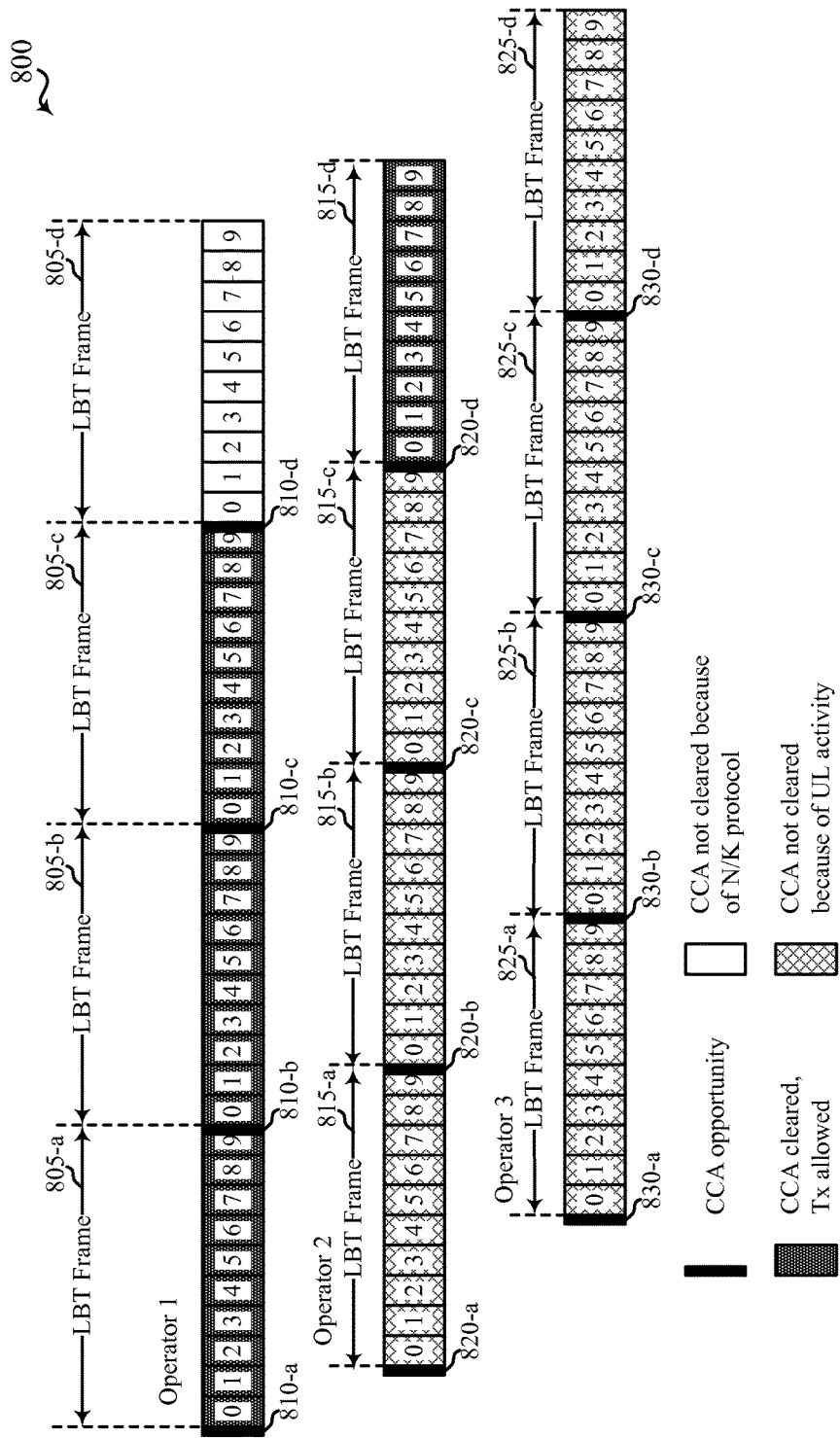
FIG. 8 shows an example of how the three different asynchronous operators shown in FIG. 7 (e.g., Operator 1, Operator 2, and Operator 3) might be affected when a first of the operators (e.g., Operator 1) adjusts an LBT yielding parameter, in accordance with various aspects of the present disclosure.

FIG. 8 shows an example 800 of how the three different asynchronous operators shown in FIG. 7 (e.g., Operator 1, Operator 2, and Operator 3) might be affected when a first of the operators (e.g., Operator 1) adjusts an LBT yielding parameter, in accordance with various aspects of the present disclosure. More particularly, the example 800 shows how the three different asynchronous operators are affected when Operator 1 adjusts the N parameter of its N/K protocol from N0=2 to N1=4, while Operator 2 and Operator 3 maintain an N parameter of N0=2. By way of example, all of the operators maintain a K parameter of K0=1.

As shown, a transmitting apparatus (or apparatuses) of Operator 1 may gain access to an unlicensed radio frequency spectrum band during a first LBT frame 805-*a*, a second LBT frame 805-*b*, and a third LBT frame 805-*c* after successfully performing a respective first CCA 810-*a*, second CCA 810-*b*, and third CCA 810-*c* to contend for access to the unlicensed radio frequency spectrum band. Assuming that the transmitting apparatus of Operator 1 satisfies its threshold of N1=4 LBT frames with its use of the third LBT frame 805-*c*, the transmitting apparatus of Operator 1 may forego performing a fourth CCA 810-*d* and not transmit over the unlicensed radio frequency spectrum band during a fourth LBT frame 805-*d*.

A transmitting apparatus (or apparatuses) of Operator 2 may perform a fifth CCA 820-*a*, a sixth CCA 820-*b*, and a seventh CCA 820-*c* to contend for access to the unlicensed radio frequency spectrum band during a respective fifth LBT frame 815-*a*, sixth LBT frame 815-*b*, and seventh LBT frame 815-*c*. However, because a transmitting apparatus of Operator 1 is already using (or has reserved) the unlicensed radio frequency spectrum band, the fifth CCA 820-*a*, sixth CCA 820-*b*, and seventh CCA 820-*c* may not be successful and the transmitting apparatus of Operator 2 may not transmit over the unlicensed radio frequency spectrum band during the fifth LBT frame 815-*a*, the sixth LBT frame 815-*b*, and the seventh LBT frame 815-*c*. At a next CCA opportunity, the transmitting apparatus of Operator 2 may perform an eighth CCA 820-*d* to contend for access to an eighth LBT frame 815-*d*. Because the unlicensed radio frequency spectrum band is not in use, the transmitting apparatus of Operator 2 may win contention to access the unlicensed radio frequency spectrum band during the eighth LBT frame 815-*d* and access the unlicensed radio frequency spectrum band during the eighth LBT frame 815-*d*.

A transmitting apparatus (or apparatuses) of Operator 3 may perform a ninth CCA 830-*a*, a tenth CCA 830-*b*, an eleventh CCA 830-*c*, and a twelfth CCA 830-*d* to contend for access to the unlicensed radio frequency spectrum band during a respective ninth LBT frame 825-*a*, tenth LBT frame 825-*b*, eleventh LBT frame 825-*c*, and twelfth LBT frame 825-*d*. However, because a transmitting apparatus of Operator 1 or Operator 2 is already using the unlicensed radio frequency spectrum band, the ninth CCA 830-*a*, tenth CCA 830-*b*, eleventh CCA 830-*c*, and twelfth CCA 830-*d* may not be successful, and the transmitting apparatus of Operator 3 may not win contention to access the unlicensed radio frequency spectrum band during the ninth LBT frame 825-*a*, the tenth LBT frame 825-*b*, the eleventh LBT frame 825-*c*, and the twelfth LBT frame 825-*d*.

Techniques described herein, in some examples, may enable a node (e.g., a base station or a UE) associated with an operator in a deployment of operators to autonomously adjust a CCA opportunity of the node in response to a determination that the node has emergency data to transmit. For example, consider a first node associated with a first operator in a deployment of operators. When the first node does not have emergency data to transmit, the first node may employ a default CCA opportunity, which default CCA opportunity may be determined by a default mapping-function (e.g., function f_0). In response to a determination that the first node has emergency data to transmit, the first node may adjust its CCA opportunity to an adjusted CCA opportunity. In some examples, the adjusted CCA opportunity may occur earlier in time than the default CCA opportunity, and/or the adjusted CCA opportunity may be determined by a mapping-function f_1 that tends to select an earlier CCA opportunity than the mapping-function f_0 (e.g., the mapping-function f_1 may select an earlier CCA opportunity in more LBT frames than the mapping-function f_0), thereby prioritizing the first node's access to the unlicensed radio frequency spectrum band over another node's access to the unlicensed radio frequency spectrum band. In some examples, the priority for accessing the unlicensed radio frequency spectrum band may be claimed until a transmission of emergency data by the first node has been completed.

In some examples, the adjusted CCA opportunity of the first node may be a function of a total number of operators (e.g., a total number of operators including the first operator and any neighbor operators) that have nodes with emergency data to transmit, which nodes need to transmit emergency data simultaneously with the first node's transmission of emergency data. When no other operator has a node with emergency data to transmit simultaneously with the first node's transmission of emergency data, the first node may set its adjusted CCA opportunity to an earliest CCA opportunity, such that the first node is given priority for winning contention to the unlicensed radio frequency spectrum band during every LBT frame, until such time that the first node has completed its emergency data transmission. When all other operators (or a threshold number of operators) have a node with emergency data to transmit simultaneously with the first node's transmission of emergency data, the first node may maintain its default CCA opportunity. In some examples, the first node may determine that another node has emergency data to transmit over the unlicensed radio frequency spectrum band by receiving, from the other node, a signal including an indication that the second node has emergency data to transmit.

In some examples, a node that does not have emergency data to transmit may yield the unlicensed radio frequency spectrum band (or a channel thereof) to the first node upon detecting that the first node has emergency data to transmit, so that the first node may transmit its emergency data. When yielding the unlicensed radio frequency spectrum band, a node may yield the unlicensed radio frequency spectrum band in the LBT frame following its detection that the first node has emergency data to transmit.

In some examples, an adjusted CCA opportunity of the first node may collide with a default CCA opportunity of a second node. In these examples, the adjusted CCA opportunity of the first node may preempt the default CCA opportunity of the second node (assuming, that is, that the second node does not have emergency data to transmit). When preemption occurs, and in some examples, the second node may yield to the first node and not perform a CCA for an LBT frame in which the preemption occurs. In other examples, the first node may relinquish the default CCA opportunity of the first node to the second node.

When multiples nodes have emergency data to transmit during an LBT frame, a mapping-function executed by each of the nodes may cycle access to one or more CCA opportunities having priority over at least one other CCA opportunity. For example, the mapping-function executed by each of the nodes may cycle access to an earliest CCA opportunity.

In one example, a first node associated with a first operator (e.g., PLMN_A) and a second node associated with a second operator (e.g., PLMN_B) may have emergency data to transmit at the same time, and the following priorities may be applied when selecting CCA opportunities for the first node and the second node:

f_1(PLMN_A)=0 for even LBT frames and f_1(PLMN_A)=f_0(PLMN_B) for odd LBT frames;

f_1(PLMN_B)=0 for odd LBT frames and f_1(PLMN_B)=f_0(PLMN_B) for even LBT frames;

If f_1(PLMN_A)=f_0(PLMN_B) in an even LBT frame, the second node yields to the first node (i.e., no CCA is performed by the second node), or the second node uses the CCA opportunity associated with f_0(PLMN_A);

If f_0(PLMN_A)=f_1(PLMN_B) in an odd LBT frame, the first node yields to the second node (i.e., no CCA is performed by the first node) or the first node uses the CCA opportunity associated with f_0(PLMN_B).

When a node has emergency data to transmit over an unlicensed radio frequency spectrum band, the node may transmit a signal over the unlicensed radio frequency spectrum band. The signal may be transmitted with an indication that the node has emergency data to transmit. In some examples, the signal may also include an indication of a maximum time span of a transmission of the emergency data. The indication of the maximum time span of the transmission of the emergency data may enable other nodes to yield the unlicensed radio frequency spectrum band (or a channel thereof) for only the frames and/or subframes needed by the first node to transmit the emergency data.

In some examples, emergency data may be transmitted over an MBMS. Emergency data may in some cases be transmitted following transmission of a signal indicating that a node has emergency data to transmit. In some examples, all available transmission resources in the unlicensed radio frequency spectrum band may be allocated to the MBMS during the transmission of the emergency data. In other examples, available transmission resources in the unlicensed radio frequency spectrum band may be divided between the MBMS (e.g., an eMBMS) and unicast during transmission of the emergency data, and the emergency data may be transmitted over both the MBMS and the unicast. In examples where emergency data is transmitted over an MBMS, a MSP may be aligned to a CET period of a node transmitting emergency data. In some examples, a second signal may be transmitted to indicate that a node has completed transmitting emergency data.

When emergency data is transmitted over an MBSFN for an operator (e.g., a PLMN), autonomous adjustment of a CCA opportunity by one or more nodes may artificially bias the operator's unicast. To mitigate this effect, all available transmission resources in the unlicensed radio frequency spectrum band may be allocated to the MBSFN.

When a node has no more emergency data to transmit, it may revert back to use of a default CCA opportunity. In some examples, a node may advertise its completion of an emergency data transmission and reversion back to use of a default CCA opportunity, for a next LBT frame, at the beginning of a current LBT frame.

Figure 9:
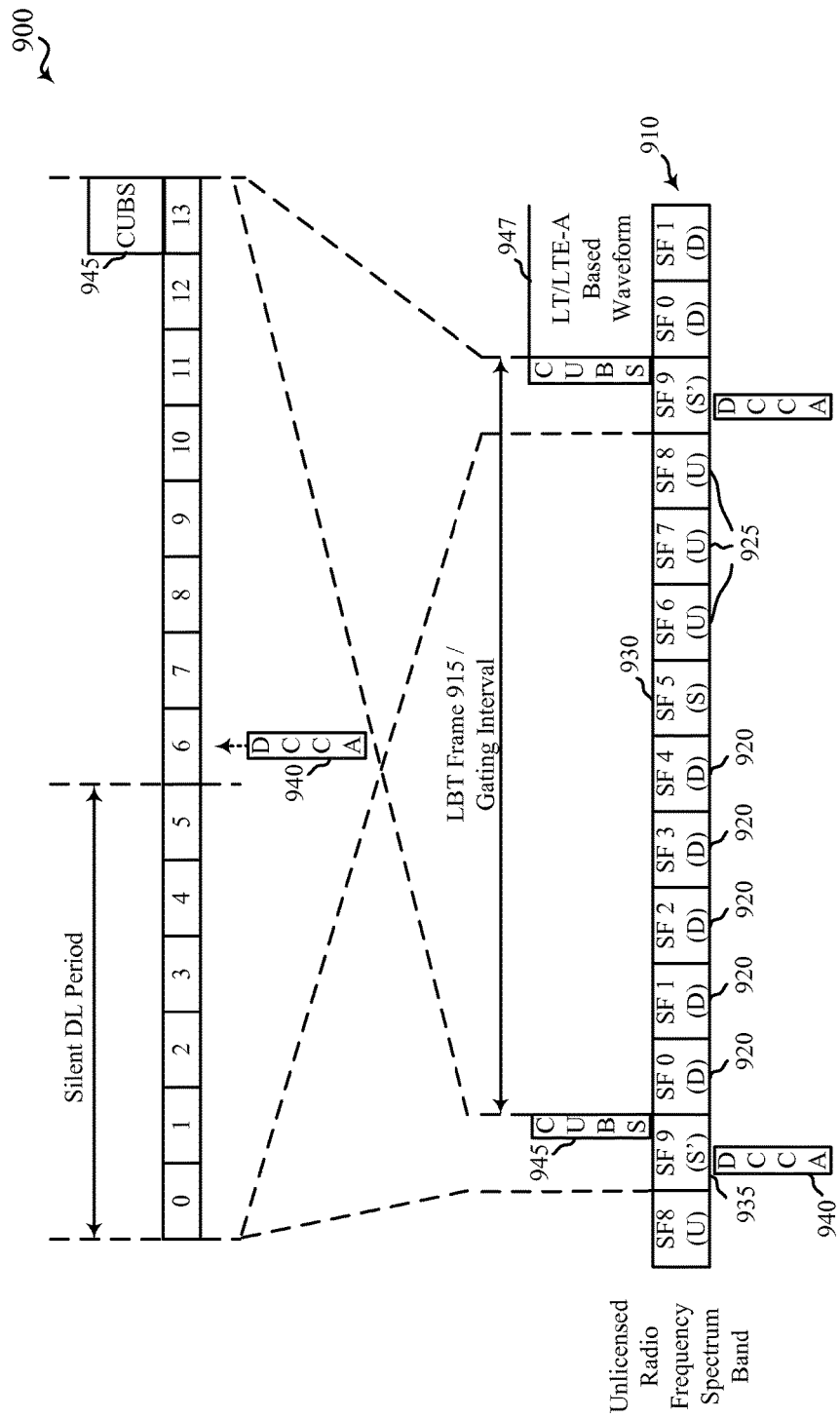
FIG. 9 shows an example of wireless communication over an unlicensed radio frequency spectrum band, in accordance with various aspects of the present disclosure.

FIG. 9 shows an example 900 of wireless communication 910 over an unlicensed radio frequency spectrum band, in accordance with various aspects of the present disclosure. An LBT frame 915, which may correspond to a gating interval such as the first gating interval 305 described with reference to FIG. 3, may have a duration of ten milliseconds and include a number of downlink subframes 920, a number of uplink subframes 925, and two types of special subframes, an S subframe 930 and an S' subframe 935. The S subframe 930 may provide a transition between downlink subframes 920 and uplink subframes 925, while the S' subframe 935 may provide a transition between uplink subframes 925 and downlink subframes 920.

During the S' subframe 935, a DCCA 940 may be performed by one or more base stations, such as one or more of the base stations 105, 205, and/or 205-a described with reference to FIGS. 1 and/or 2, to reserve, for a period of time, the channel over which the wireless communication 910 occurs. Following a successful DCCA 940 by a base station, the base station may transmit a CUBS 945 to provide an indication to other base stations and/or apparatuses (e.g., UEs, Wi-Fi access points, etc.) that the base station has reserved the channel. In some examples, a CUBS 945 may be transmitted using a plurality of interleaved resource blocks. Transmitting a CUBS 945 in this manner may enable the CUBS 945 to occupy at least a certain percentage of the available frequency bandwidth in the unlicensed radio frequency spectrum band and satisfy one or more regulatory requirements (e.g., a requirement that the CUBS 945 occupy at least 80% of the available frequency bandwidth). The CUBS 945 may in some examples take a form similar to that of an LTE/LTE-A CRS and/or CSI-RS. Following the transmission of the CUBS 945, an LTE/LTE-A based waveform 947 may be transmitted, from a base station to a UE, over the unlicensed radio frequency spectrum band.

The S' subframe 935 may include 14 OFDM symbols, numbered 0 through 13 in FIG. 9. A first portion of the S' subframe 935, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 935 may be used for the DCCA 940. In the example 900, the S' subframe 935 includes seven DCCA opportunities, included in symbols 6 through 12. Use of the DCCA opportunities by different network operators may be coordinated to provide more efficient system operation (e.g., synchronous system operation). In some examples, in order to determine which of the seven possible DCCA opportunities to use to perform a DCCA 940, a base station 105 that does not have emergency data to transmit may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a gating interval or frame for which the DCCA 940 is performed. However, when a base station 105 has emergency data to transmit, an alternate mapping-function may be used to choose which of the seven possible DCCA opportunities to use to perform a DCCA 940. When a base station 105 is associated with a first operator and the base stations 105 of no other operator have emergency data to transmit, the base station 105 may in some examples choose the earliest DCCA opportunity to use to perform a DCCA 940, as shown in FIG. 9. When a base station 105 is associated with a first operator, and when at least one base station of at least one other operator has emergency data to transmit, the base station 105 may in some examples execute a mapping-function that cycles the use of the earliest DCCA opportunity among the operators associated with nodes having emergency data to transmit. When a base station 105 having emergency data to transmit successfully contends for access to the unlicensed radio frequency spectrum band using DCCA 940, the base station 105 may transmit at least a portion of the emergency data as part of the LTE/LTE-A based waveform 947.

In some examples, frequency-division multiplexing (FDM) may be used between operators for the transmission of emergency data. In these examples, multiple operators may be allowed to transmit data during the same LBT frame, and in some instances, one of the operators may be allowed to transmit non-emergency data during the LBT frame. The operator that is allowed to transmit non-emergency data may be an operator that successfully performs a CCA at a default CCA opportunity for the LBT frame. The operator that successfully performs the CCA at the default CCA opportunity for the LBT frame may be required to hold a channel of the unlicensed radio frequency spectrum band for the entirety of the LBT frame, to ensure that all of the operators transmitting emergency data during the LBT frame have an opportunity to transmit emergency data. The operator that successfully performs the CCA at a default CCA opportunity for the LBT frame may or may not transmit emergency data during the LBT frame.

When using FDM techniques to transmit emergency data, each operator may be assigned a predefined frequency resource (e.g., a predefined subset of subcarriers) for the transmission of emergency data. In some examples, each operator having emergency data to transmit during an LBT frame may perform a CCA during an adjusted CCA opportunity for the LBT frame (e.g., during an earliest CCA opportunity among all operators contending for the LBT frame), and each operator having non-emergency data to transmit during the LBT frame may perform a CCA during a default CCA opportunity.

In some examples, an operator that successfully performs CCA at a default CCA opportunity for an LBT frame may determine what resources are allocated for emergency data transmissions by other operators. In some examples, the resources allocated to other operators for emergency data transmissions may be determined based at least in part on indications in signals received from the other operators, which indications may indicate what resources are required for the emergency data transmissions of the other operators.

When FDM techniques are used to transmit emergency data, the FDM techniques may alleviate unicast bias compared to use of time-domain multiplexing (TDM) techniques.

Figure 10:
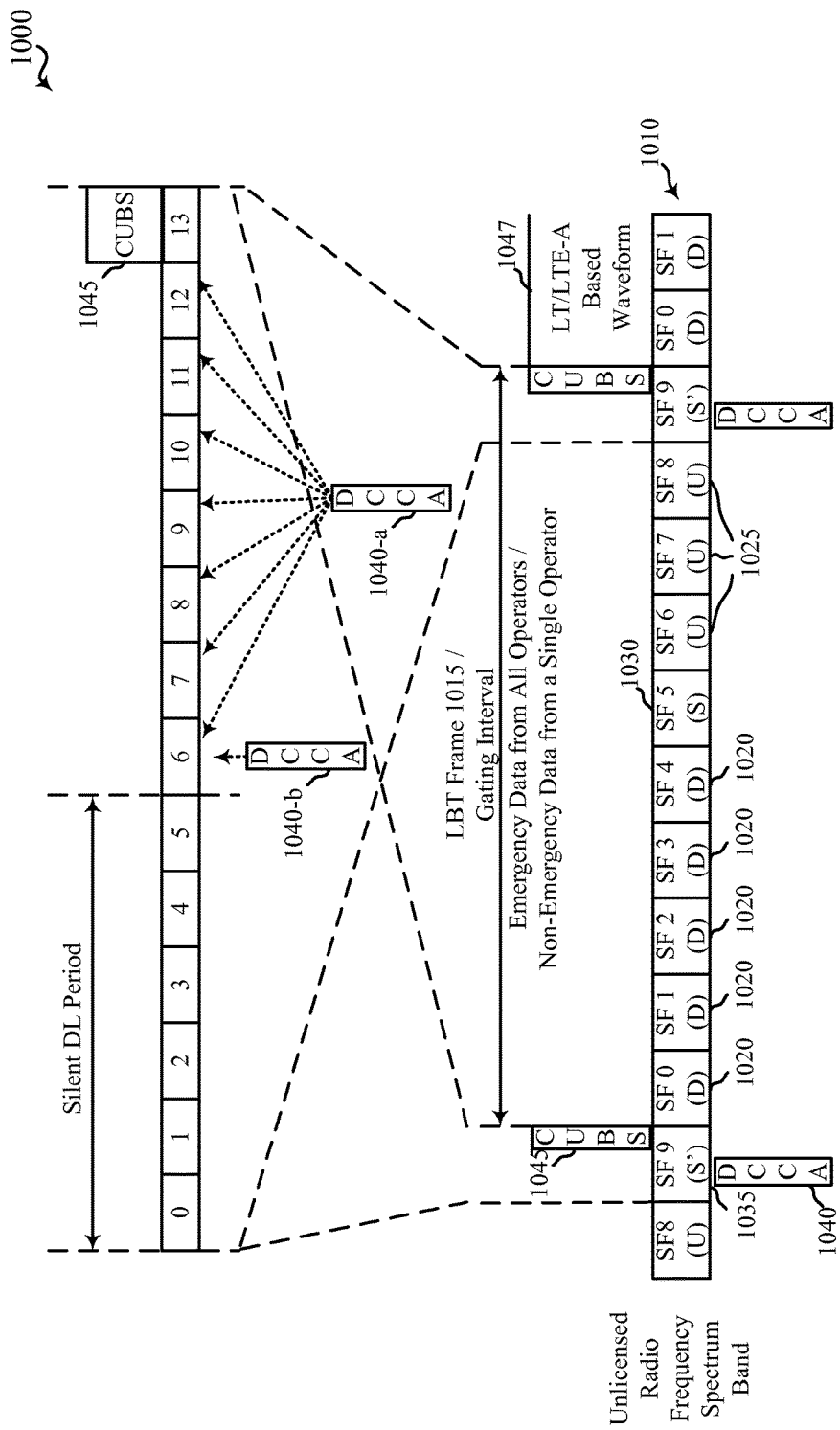
FIG. 10 shows an example of wireless communication over an unlicensed radio frequency spectrum band, in accordance with various aspects of the present disclosure.

FIG. 10 shows an example 1000 of wireless communication 1010 over an unlicensed radio frequency spectrum band, in accordance with various aspects of the present disclosure. An LBT frame 1015, which may correspond to a gating interval such as the first gating interval 305 described with reference to FIG. 3, may have a duration of ten milliseconds and include a number of downlink subframes 1020, a number of uplink subframes 1025, and two types of special subframes, an S subframe 1030 and an S' subframe 1035. The S subframe 1030 may provide a transition between downlink subframes 1020 and uplink subframes 1025, while the S' subframe 1035 may provide a transition between uplink subframes 1025 and downlink subframes 1020.

During the S' subframe 1035, a DCCA 1040 may be performed by one or more base stations, such as one or more of the base stations 105, 205, and/or 205-*a* described with reference to FIGS. 1 and/or 2, to reserve, for a period of time, the channel over which the wireless communication 1010 occurs. Following a successful DCCA 1040 by a base station, the base station may transmit a CUBS 1045 to provide an indication to other base stations and/or apparatuses (e.g., UEs, Wi-Fi access points, etc.) that the base station has reserved the channel. In some examples, a CUBS 1045 may be transmitted using a plurality of interleaved resource blocks. Transmitting a CUBS 1045 in this manner may enable the CUBS 1045 to occupy at least a certain percentage of the available frequency bandwidth in the unlicensed radio frequency spectrum band and satisfy one or more regulatory requirements (e.g., a requirement that the CUBS 1045 occupy at least 80% of the available frequency bandwidth). The CUBS 1045 may in some examples take a form similar to that of an LTE/LTE-A CRS and/or CSI-RS. Following the transmission of the CUBS 1045, an LTE/LTE-A based waveform 1047 may be transmitted, from a base station to a UE, over the unlicensed radio frequency spectrum band.

The S' subframe 1035 may include 14 OFDM symbols, numbered 0 through 13 in FIG. 10. A first portion of the S' subframe 1035, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 1035 may be used for the DCCA 1040. In the example 1000, the S' subframe 1035 includes seven DCCA opportunities, included in symbols 6 through 12. Use of the DCCA opportunities by different network operators may be coordinated to provide more efficient system operation (e.g., synchronous system operation). In some examples, in order to determine which of the seven possible DCCA opportunities to use to perform a DCCA 1040-*a*, a base station 105 that does not have emergency data to transmit may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a gating interval or frame for which the DCCA 1040-*a* is performed. However, when a base station 105 has emergency data to transmit, an alternate mapping-function may be used to choose which of the seven possible DCCA opportunities to use to perform a DCCA 1040-*b*. In some examples, the mapping-function may cause each of the base stations 105 having emergency data to transmit to perform a DCCA 1040-*b* concurrently, at an earliest DCCA opportunity among all operators contending for the LBT frame. When a base station 105 having non-emergency data to transmit successfully contends for access to the unlicensed radio frequency spectrum band using DCCA 1040-*a*, the base station 105 may determine what resources are allocated for emergency data transmissions by other operators. In some examples, the resources allocated to other operators for emergency data transmissions may be determined based at least in part on indications in signals received from the other operators, which indications may indicate what resources are required for the emergency data transmissions of the other operators. The resources may be allocated in different subsets of subcarriers, such that each operator having emergency data to transmit may transmit its emergency data at the same time using a different subset of subcarriers. At least a portion of the emergency data to be transmitted by each operator may be transmitted as part of the LTE/LTE-A based waveform 1047.

In some cases, more than one operator may have the same emergency data to transmit. In these cases, a joint MBSFN transmission across PLMNs can enhance MBSFN gain (e.g., there may be a larger MBSN benefit compared to simply yielding a channel to a single operator having emergency data to transmit). In these examples, a network may configure all operators regarding an emergency data transmission agreement between operators, and regarding an emergency data scheduling agreement between operators. The emergency data scheduling agreement may define subframes, a modulation and coding scheme (MCS), an MBSFN area identifier (ID), etc. All operators subject to the emergency data transmission agreement may perform a CCA concurrently for an LBT frame, at an earliest CCA opportunity among the operators, by overriding their default CCA opportunities. When one of the operators successfully performs a CCA for an LBT frame according to the default CCA opportunity, the operator may transmit emergency and/or non-emergency data during the LBT frame and may reserve the unlicensed radio frequency spectrum for the entirety of the LBT frame. Other operators subject to the emergency data transmission agreement, which operators perform a CCA at an adjusted CCA opportunity, may transmit emergency data via an eMBMS and refrain from non-emergency data transmission. Operators not subject to the emergency data transmission agreement may apply TDM or FDM emergency data transmission techniques as previously described. In some examples, the joint MBSFN may be extended to a joint coordinated multipoint (CoMP) operation, in which, instead of some operators yielding to other operators, all operators may participate in CoMP transmission for better coverage.

Figure 11:
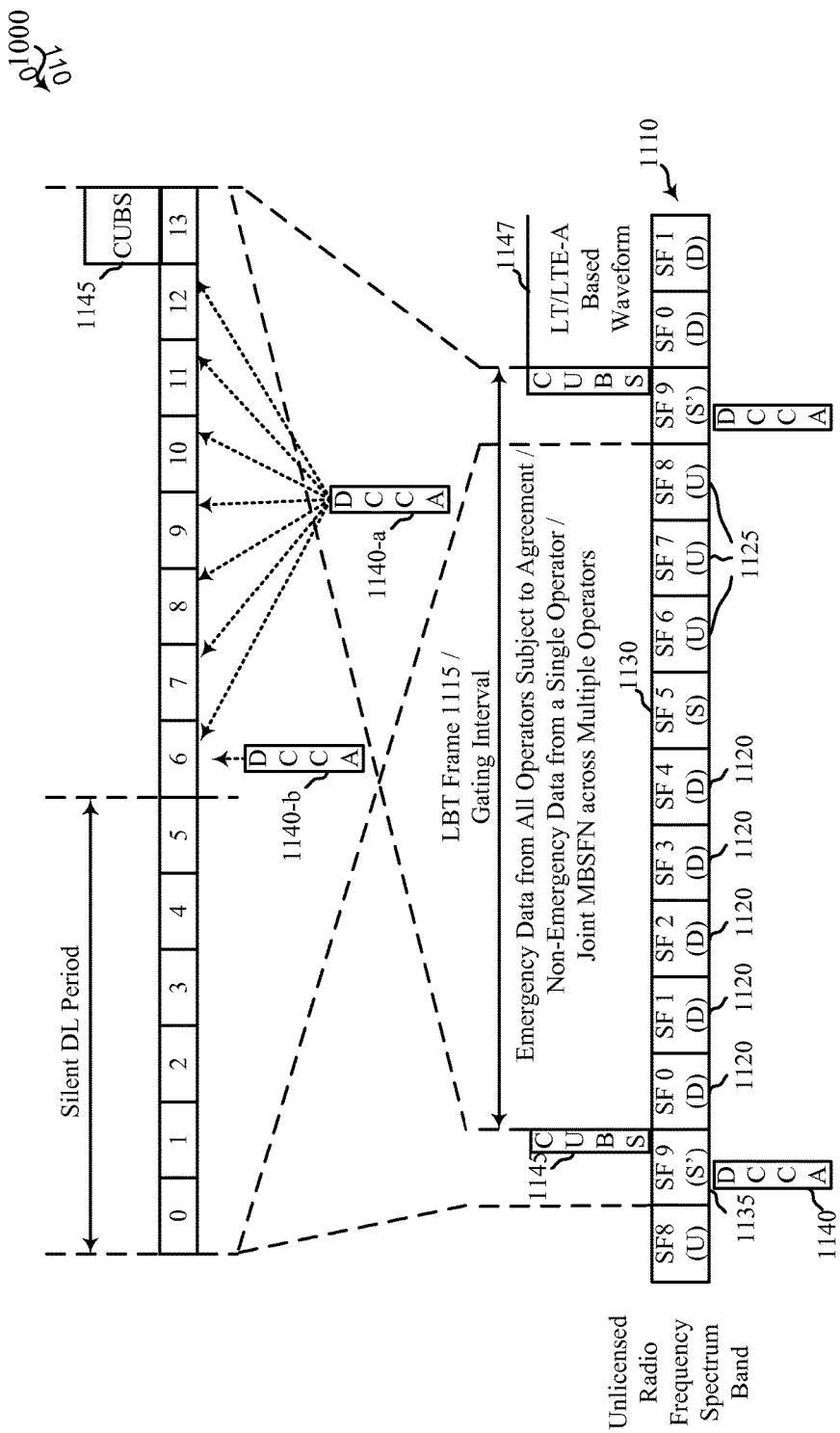
FIG. 11 shows an example of wireless communication over an unlicensed radio frequency spectrum band, in accordance with various aspects of the present disclosure.

FIG. 11 shows an example 1100 of wireless communication 1110 over an unlicensed radio frequency spectrum band, in accordance with various aspects of the present disclosure. An LBT frame 1115, which may correspond to a gating interval such as the first gating interval 305 described with reference to FIG. 3, may have a duration of ten milliseconds and include a number of downlink subframes 1120, a number of uplink subframes 1125, and two types of special subframes, an S subframe 1130 and an S' subframe 1135. The S subframe 1130 may provide a transition between downlink subframes 1120 and uplink subframes 1125, while the S' subframe 1135 may provide a transition between uplink subframes 1125 and downlink subframes 1120.

During the S' subframe 1135, a DCCA 1140 may be performed by one or more base stations, such as one or more of the base stations 105, 205, and/or 205-*a* described with reference to FIGS. 1 and/or 2, to reserve, for a period of time, the channel over which the wireless communication 1110 occurs. Following a successful DCCA 1140 by a base station, the base station may transmit a CUBS 1145 to provide an indication to other base stations and/or apparatuses (e.g., UEs, Wi-Fi access points, etc.) that the base station has reserved the channel. In some examples, a CUBS 1145 may be transmitted using a plurality of interleaved resource blocks. Transmitting a CUBS 1145 in this manner may enable the CUBS 1145 to occupy at least a certain percentage of the available frequency bandwidth in the unlicensed radio frequency spectrum band and satisfy one or more regulatory requirements (e.g., a requirement that the CUBS 1145 occupy at least 80% of the available frequency bandwidth). The CUBS 1145 may in some examples take a form similar to that of an LTE/LTE-A CRS and/or CSI-RS. Following the transmission of the CUBS 1145, an LTE/LTE-A based waveform 1147 may be transmitted, from a base station to a UE, over the unlicensed radio frequency spectrum band.

The S' subframe 1135 may include 14 OFDM symbols, numbered 0 through 13 in FIG. 11. A first portion of the S' subframe 1135, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 1135 may be used for the DCCA 1140. In the example 1100, the S' subframe 1135 includes seven DCCA opportunities, included in symbols 6 through 12. Use of the DCCA opportunities by different network operators may be coordinated to provide more efficient system operation (e.g., synchronous system operation). In some examples, in order to determine which of the seven possible DCCA opportunities to use to perform a DCCA 1140-*a*, a base station 105 that does not have emergency data to transmit may evaluate a mapping-function of the form:

$$F_D(\text{GroupID}, t) \in \{1, 2, 3, 4, 5, 6, 7\}$$

where GroupID is a "deployment group-id" assigned to the base station 105, and t is the LBT frame number corresponding to a gating interval or frame for which the DCCA 1140-*a* is performed. However, when a base station 105 has emergency data to transmit, an alternate mapping-function may be used to choose which of the seven possible DCCA opportunities to use to perform a DCCA 1140-*b*. In some examples, the mapping-function may cause each of the base stations 105 having emergency data to transmit to perform a DCCA 1140-*b* concurrently, at an earliest DCCA opportunity. In some examples, emergency data from all operators subject to an emergency data transmission agreement may be transmitted during the LBT frame 1115 upon any one of the operators gaining access to the LBT frame 1115, and non-emergency data may be transmitted during the LBT frame 1115 for a single one of the operators (i.e., the operator that performs a successful DCCA 1140-*a* or 1140-*b*). In some examples, the operators subject to the emergency data transmission agreement may form a joint MBSFN. At least a portion of the emergency data to be transmitted by each operator may be transmitted as part of the LTE/LTE-A based waveform 1147.

Figure 12:
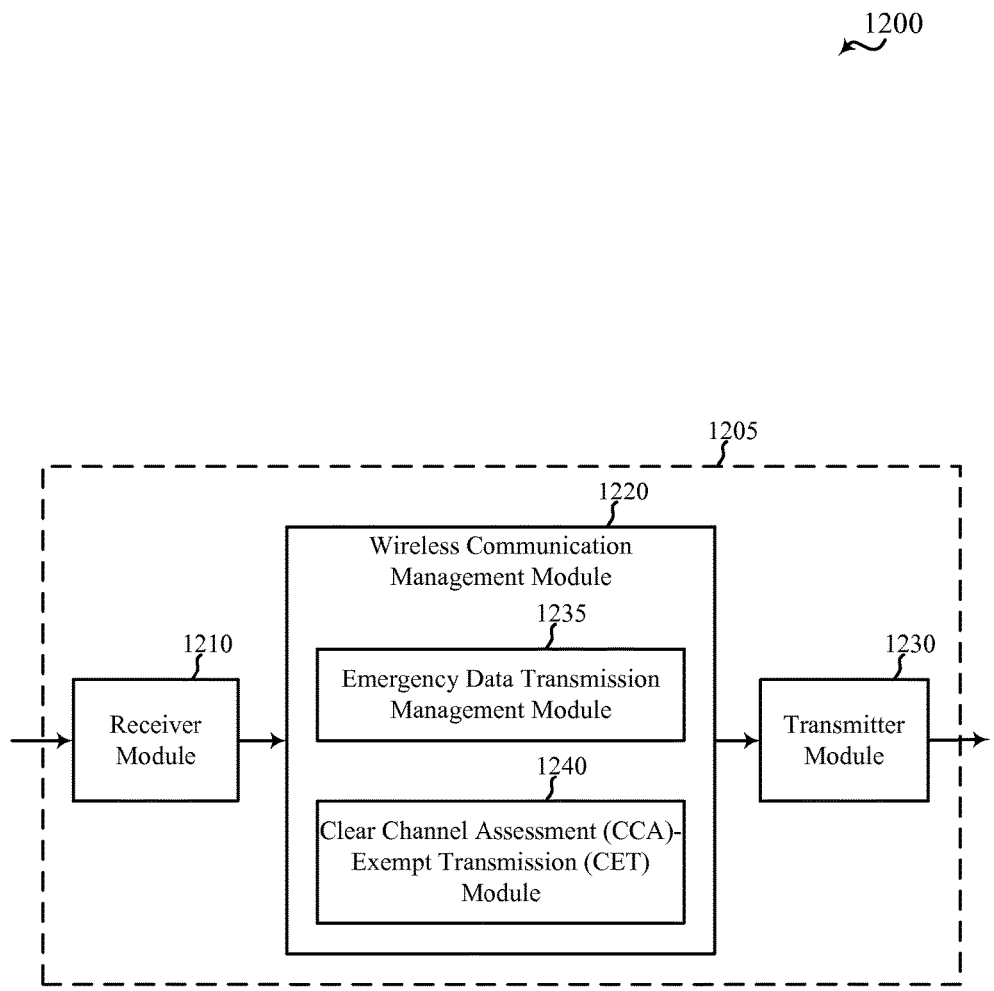
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. In some examples, the apparatus 1205 may be an example of aspects of one or more of the base stations 105, 205, and/or 205-*a* described with reference to FIGS. 1 and/or 2, and/or an example of aspects of one or more of the UEs 115, 215, 215-*a*, 215-*b*, and/or 215-*c* described with reference to FIGS. 1 and/or 2. The apparatus 1205 may in some examples include an LTE/LTE-A compatible base station or UE. The apparatus 1205 may also be a processor. The apparatus 1205 may include a receiver module 1210, a wireless communication management module 1220, and/or a transmitter module 1230. Each of these components may be in communication with each other.

The components of the apparatus 1205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1210 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1, 2, 3, 4, 5, 6, 7, and/or 8. The receiver module 1210 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1230 may include at least one RF transmitter, such as at least one RF transmitter operable to transmit over the licensed radio frequency spectrum band and/or the unlicensed radio frequency spectrum band. The transmitter module 1230 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1220 may be used to manage one or more aspects of wireless communication for the apparatus 1205. In some examples, the wireless communication management module 1220 may include an emergency data transmission management module 1235 and/or a CET module 1240. Each of these components may be in communication with each other.

In some examples, the emergency data transmission management module 1235 may be used to determine whether a first node associated with a first operator in a deployment of operators has emergency data to transmit over an unlicensed radio frequency spectrum band. The emergency data transmission management module 1235 may also be used to provide an indication that the first node has emergency data to transmit over the unlicensed radio frequency spectrum band for inclusion in a signal transmitted by the transmitter module 1230. In some examples, the emergency data transmission management module 1235 module may also be used to provide an indication of a maximum time span of a transmission of the emergency data by the first node. In some examples, the first node may be the apparatus 1205 or an apparatus including the apparatus 1205.

In some examples, the CET module 1240 may be used to transmit a CET over the unlicensed radio frequency spectrum band. The CET may, in some examples, indicate that the first node has emergency data to transmit.

Figure 13:
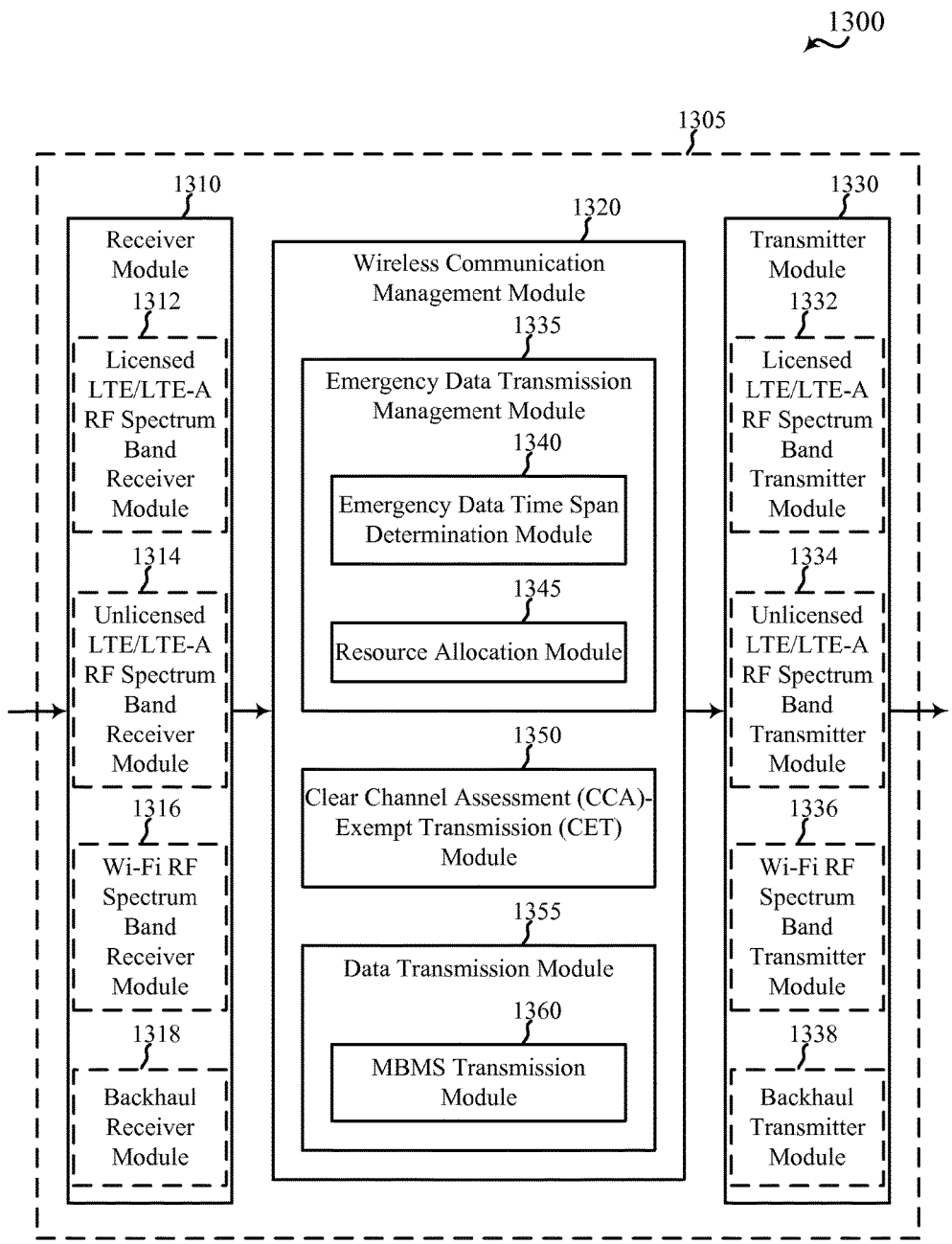
FIG. 13 shows a block diagram of an apparatus for use in wireless communication, in accordance with various aspects of the present disclosure.

FIG. 13 shows a block diagram 1300 of an apparatus 1305 for use in wireless communication, in accordance with various aspects of the present disclosure. In some examples, the apparatus 1305 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of the apparatus 1205 described with reference to FIG. 12. The apparatus 1305 may in some examples include an LTE/LTE-A compatible base station or UE. The apparatus 1305 may also be a processor. The apparatus 1305 may include a receiver module 1310, a wireless communication management module 1320, and/or a transmitter module 1330. Each of these components may be in communication with each other.

The components of the apparatus 1305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1310 may be an example of one or more aspects of the receiver module 1210 described with reference to FIG. 12. In some examples, the receiver module 1310 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1, 2, 3, 4, 5, 6, 7, and/or 8. The receiver module 1310 may in some cases include separate receivers for the licensed radio frequency spectrum band and the unlicensed radio frequency spectrum band. The separate receivers may, in some examples, take the form of a licensed LTE/LTE-A RF spectrum band receiver module 1312 for communicating over the licensed radio frequency spectrum band, and an unlicensed LTE/LTE-A RF spectrum band receiver module 1314 for communicating over the unlicensed radio frequency spectrum band. In some examples, the receiver module 1310 may also include a Wi-Fi RF spectrum band receiver module 1316. In examples in which the apparatus 1305 includes a base station, the receiver module 1310 may include a backhaul receiver module 1318. The receiver module 1310, including the licensed LTE/LTE-A RF spectrum band receiver module 1312, the unlicensed LTE/LTE-A RF spectrum band receiver module 1314, the Wi-Fi RF spectrum band receiver module 1316, and/or the backhaul receiver module 1318 may be used to receive various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the transmitter module 1330 may be an example of one or more aspects of the transmitter module 1230 described with reference to FIG. 12. In some examples, the transmitter module 1330 may include at least one RF transmitter, such as at least one RF transmitter operable to transmit over the licensed radio frequency spectrum band and/or the unlicensed radio frequency spectrum band. The transmitter module 1330 may in some cases include separate transmitters for the licensed radio frequency spectrum band and the unlicensed radio frequency spectrum band. The separate transmitters may, in some examples, take the form of a licensed LTE/LTE-A RF spectrum band transmitter module 1332 for communicating over the licensed radio frequency spectrum band, and an unlicensed LTE/LTE-A RF spectrum band transmitter module 1334 for communicating over the unlicensed radio frequency spectrum band. In some examples, the transmitter module 1330 may also include a Wi-Fi RF spectrum band transmitter module 1336. In examples in which the apparatus 1305 includes a base station, the transmitter module 1330 may include a backhaul transmitter module 1338. The transmitter module 1330, including the licensed LTE/LTE-A RF spectrum band transmitter module 1332, the unlicensed LTE/LTE-A RF spectrum band transmitter module 1334, the Wi-Fi RF spectrum band transmitter module 1336, and/or the backhaul transmitter module 1338 may be used to transmit various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the wireless communication management module 1320 may be an example of one or more aspects of the wireless communication management module 1220 described with reference to FIG. 12. The wireless communication management module 1320 may include an emergency data transmission management module 1335, a CET module 1350, and/or a data transmission module 1355. Each of these components may be in communication with each other.

In some examples, the emergency data transmission management module 1335 may be an example of the emergency data transmission management module 1235 described with reference to FIG. 12. In some examples, the emergency data transmission management module 1335 may be used to determine whether a first node associated with a first operator in a deployment of operators has emergency data to transmit over an unlicensed radio frequency spectrum band. In some examples, the first node may be the apparatus 1305 or an apparatus including the apparatus 1305.

In some examples, the emergency data transmission management module 1335 may include an emergency data time span determination module 1340 and/or a resource allocation module 1345. In some examples, the emergency data time span determination module 1340 may be used to determine a maximum time span of a transmission of the emergency data by the first node, and to provide an indication of the maximum time span of the transmission of the emergency data for inclusion in a signal transmitted by the transmitter module 1330. In some examples, the resource allocation module 1345 may be used to allocate transmission resources in the unlicensed radio frequency spectrum band during the transmission of the emergency data by the first node. In some examples, the resource allocation module 1345 may allocate all available transmission resources in the unlicensed radio frequency spectrum band to an MBMS during the transmission of the emergency data by the first node. In another examples, the resource allocation module 1345 may divide available transmission resources in the unlicensed radio frequency spectrum band between the MBMS and unicast during the transmission of the emergency data by the first node. In the latter example, the emergency data may be transmitted over both the MBMS and the unicast.

In some examples, the CET module 1350 may be an example of the CET module 1240 described with reference to FIG. 12. In some examples, the CET module 1350 may be used to transmit a CET over the unlicensed radio frequency spectrum band. In some examples, the signal indicating that the first node has emergency data to transmit may be transmitted using the CET transmission. In these examples, the signal may also include an indication of a maximum time span of a transmission of the emergency data by the first node, which indication may be provided by the emergency data time span determination module 1340.

In some examples, the emergency data transmission management module 1320 may also be used to provide an indication that the first node has completed transmitting the emergency data for inclusion in a second signal, which may be transmitted by the transmitter module 1330.

In some examples the data transmission module 1355 may be used to transmit the emergency data over the MBMS and/or unicast, in accordance with the allocation of transmission resources made by the resource allocation module 1345. In some examples, the emergency data may only be transmitted over the MBMS and/or unicast in a frame or frames of the unlicensed radio frequency spectrum band for which a successful CCA is performed. In some examples, the data transmission module 1355 may include an MBMS transmission module 1360. The MBMS transmission module 1360 may be used to transmit the emergency data over the MBMS.

Figure 14:
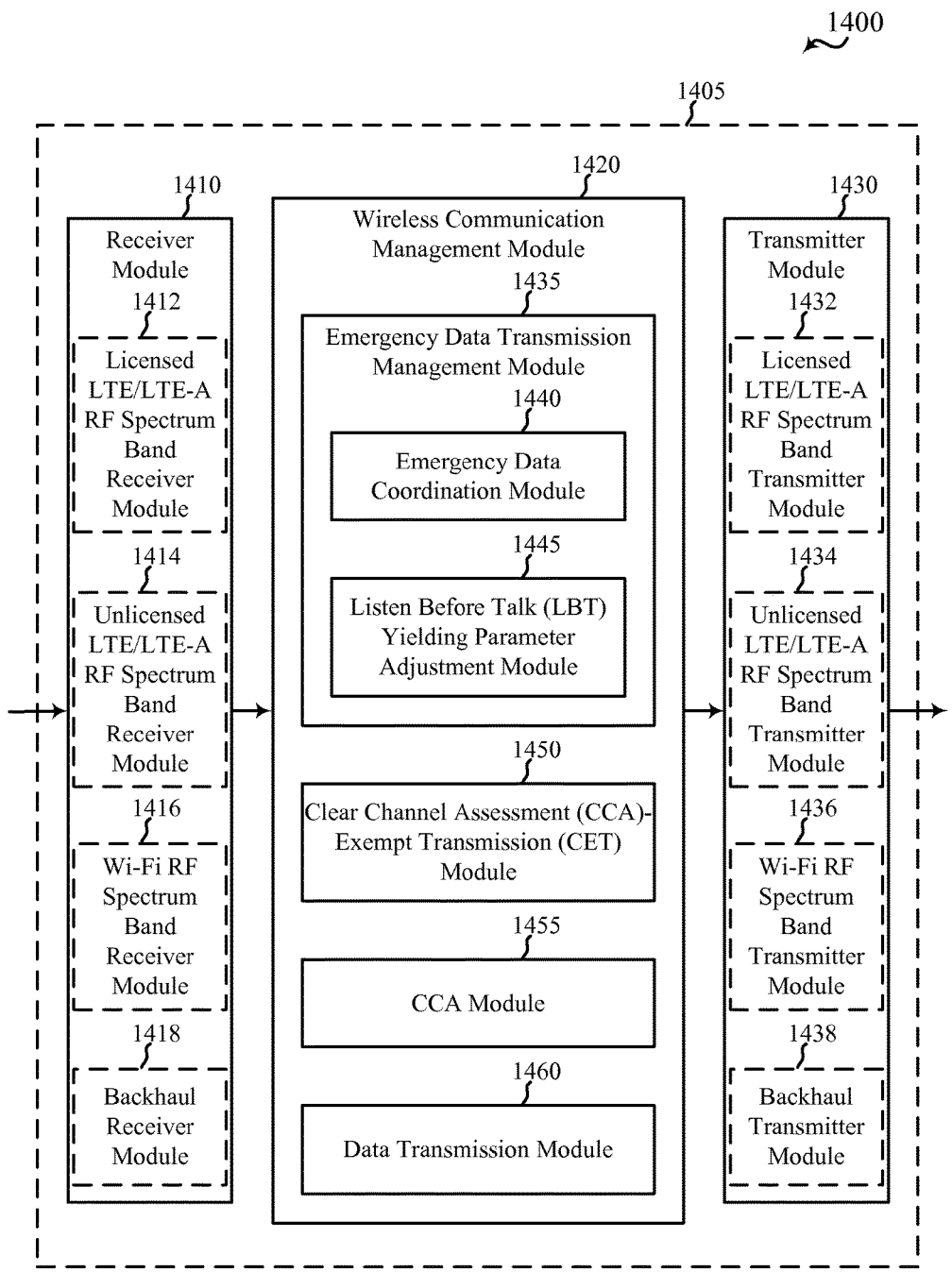
FIG. 14 shows a block diagram of an apparatus for use in wireless communication, in accordance with various aspects of the present disclosure.

FIG. 14 shows a block diagram 1400 of an apparatus 1405 for use in wireless communication, in accordance with various aspects of the present disclosure. In some examples, the apparatus 1405 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of one or more of the apparatuses 1205 and/or 1305 described with reference to FIGS. 12 and/or 13. The apparatus 1405 may in some examples include an LTE/LTE-A compatible base station or UE. The apparatus 1405 may also be a processor. The apparatus 1405 may include a receiver module 1410, a wireless communication management module 1420, and/or a transmitter module 1430. Each of these components may be in communication with each other.

The components of the apparatus 1405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1410 may be an example of one or more aspects of the receiver module 1210 and/or 1310 described with reference to FIGS. 12 and/or 13. In some examples, the receiver module 1410 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1, 2, 3, 4, 5, 6, 7, and/or 8. The receiver module 1410 may in some cases include separate receivers for the licensed radio frequency spectrum band and the unlicensed radio frequency spectrum band. The separate receivers may, in some examples, take the form of a licensed LTE/LTE-A RF spectrum band receiver module 1412 for communicating over the licensed radio frequency spectrum band, and an unlicensed LTE/LTE-A RF spectrum band receiver module 1414 for communicating over the unlicensed radio frequency spectrum band. In some examples, the receiver module 1410 may also include a Wi-Fi RF spectrum band receiver module 1416. In examples in which the apparatus 1405 includes a base station, the receiver module 1410 may include a backhaul receiver module 1418. The receiver module 1410, including the licensed LTE/LTE-A RF spectrum band receiver module 1412, the unlicensed LTE/LTE-A RF spectrum band receiver module 1414, the Wi-Fi RF spectrum band receiver module 1416, and/or the backhaul receiver module 1418 may be used to receive various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the transmitter module 1430 may be an example of one or more aspects of the transmitter module 1230 and/or 1330 described with reference to FIGS. 12 and/or 13. In some examples, the transmitter module 1430 may include at least one RF transmitter, such as at least one RF transmitter operable to transmit over the licensed radio frequency spectrum band and/or the unlicensed radio frequency spectrum band. The transmitter module 1430 may in some cases include separate transmitters for the licensed radio frequency spectrum band and the unlicensed radio frequency spectrum band. The separate transmitters may, in some examples, take the form of a licensed LTE/LTE-A RF spectrum band transmitter module 1432 for communicating over the licensed radio frequency spectrum band, and an unlicensed LTE/LTE-A RF spectrum band transmitter module 1434 for communicating over the unlicensed radio frequency spectrum band. In some examples, the transmitter module 1430 may also include a Wi-Fi RF spectrum band transmitter module 1436. In examples in which the apparatus 1405 includes a base station, the transmitter module 1430 may include a backhaul transmitter module 1438. The transmitter module 1430, including the licensed LTE/LTE-A RF spectrum band transmitter module 1432, the unlicensed LTE/LTE-A RF spectrum band transmitter module 1434, the Wi-Fi RF spectrum band transmitter module 1436, and/or the backhaul transmitter module 1438 may be used to transmit various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the wireless communication management module 1420 may be an example of one or more aspects of the wireless communication management module 1220 and/or 1320 described with reference to FIGS. 12 and/or 13. The wireless communication management module 1420 may include an emergency data transmission management module 1435, a CET module 1450, a CCA module 1455, and/or a data transmission module 1460. Each of these components may be in communication with each other.

In some examples, the emergency data transmission management module 1435 may be an example of the emergency data transmission management module 1235 and/or 1335 described with reference to FIGS. 12 and/or 13. In some examples, the emergency data transmission management module 1435 may be used to determine whether a first node associated with a first operator in a deployment of operators has emergency data to transmit over an unlicensed radio frequency spectrum band. In some examples, the first node may be the apparatus 1405 or an apparatus including the apparatus 1405.

In some examples, the emergency data transmission management module 1435 may include an emergency data coordination module 1440 and/or an LBT yielding parameter adjustment module 1445. In some examples, the emergency data coordination module 1440 may be used to determine whether at least one other node associated with one other operator in the deployment of operators has emergency data to transmit over the unlicensed radio frequency spectrum band. In some examples, determining that a node associated with another operator in the deployment of operators has emergency data to transmit over the unlicensed radio frequency spectrum band may include receiving a signal from a node associated with another operator. The signal received from the node associated with another operator may include an indication that the node associated with another operator has emergency data to transmit.

In some examples, the LBT yielding parameter adjustment module 1445 may be used to adjust an LBT yielding parameter of the first node. When the emergency data coordination module 1440 determines that there is no node of another operator in the deployment of operators that has emergency data to transmit over the unlicensed radio frequency spectrum band, the LBT yielding parameter adjustment module 1445 may be used to adjust an LBT yielding parameter of the first node in response to a determination by the emergency data transmission management module 1435 that the first node has emergency data to transmit. When the emergency data coordination module 1440 determines that a node associated with another operator in the deployment of operators (e.g., a second node associated with a second operator) has emergency data to transmit over the unlicensed radio frequency spectrum band, the LBT yielding parameter adjustment module 1445 may determine whether to adjust an LBT yielding parameter of the first node (and when indicated, adjust the LBT yielding parameter) in response to a determination that the first node has emergency data to transmit, and based on a total number of operators in the deployment of operators that have emergency data to transmit over the unlicensed radio frequency spectrum band.

In some examples, the LBT yielding parameter adjusted by the LBT yielding parameter adjustment module 1445 may include one of a first LBT yielding parameter or a second LBT yielding parameter. The first LBT yielding parameter (e.g., the N parameter of an N/K protocol) may define a number of consecutive frames triggering the first node in the deployment of operators to yield access to the unlicensed radio frequency spectrum band, and the second LBT yielding parameter (e.g., the K parameter of an N/K protocol) may define a number of consecutive frames during which the first node yields access to the unlicensed radio frequency spectrum band following transmission of the number of consecutive frames defined by the first LBT yielding parameter. In some examples, adjusting the LBT yielding parameter may include increasing the first LBT yielding parameter from a default value. In some examples, adjusting the LBT yielding parameter may include decreasing the second LBT yielding parameter from a default value. In some examples, decreasing the second LBT yielding parameter from a default value may include setting the second LBT yielding parameter to zero while the first node has emergency data to transmit. In some examples, adjusting the LBT yielding parameter may include adjusting both the first LBT yielding parameter and the second LBT yielding parameter.

In some examples, an adjusted LBT yielding parameter of the first node may be different from a corresponding LBT yielding parameter used by a node having no emergency data to transmit.

In some examples, the LBT yielding parameter adjustment module 1445 may determine that a second node associated with a second operator in the deployment of operators has emergency data to transmit over the unlicensed radio frequency spectrum band. In these examples, adjusting the LBT yielding parameter may include matching the LBT yielding parameter of the first node to a corresponding LBT yielding parameter of the second node.

In some examples, the LBT yielding parameter adjustment module 1445 may be used to revert an LBT yielding parameter to an original value (e.g., a default value) following a transmission of emergency data by the first node.

In some examples, the CET module 1450 may be an example of the CET module 1240 and/or 1350 described with reference to FIGS. 12 and/or 13. In some examples, the CET module 1450 may be used to transmit a CET over the unlicensed radio frequency spectrum band. In some examples, the signal indicating that the first node has emergency data to transmit may be transmitted using the CET transmission. In these examples, the signal may also include an indication of a maximum time span of a transmission of the emergency data by the first node.

In some examples the CCA module 1455 may be used to perform a CCA at a CCA opportunity of the first node. The CCA may be performed to contend for access to a frame of at least one channel of an unlicensed radio frequency spectrum band. In some examples, the emergency data may only be transmitted in a frame or frames of the unlicensed radio frequency spectrum band for which a successful CCA is performed. When a CCA is not successful, or when emergency data needs to be transmitted over multiple frames, a CCA may be performed for one or more subsequent frames.

In some examples, the data transmission module 1460 may be used to transmit the emergency data over the unlicensed radio frequency spectrum band. In some examples, the emergency data may only be transmitted in a frame or frames of the unlicensed radio frequency spectrum band for which at least one CCA performed by the CCA module 1455 is successful. In some examples, only a portion of the emergency data may be transmitted in a frame. In other examples, all of the emergency data may be transmitted in a frame. In some examples, the emergency data may be transmitted over an MBMS and/or unicast.

Figure 15:
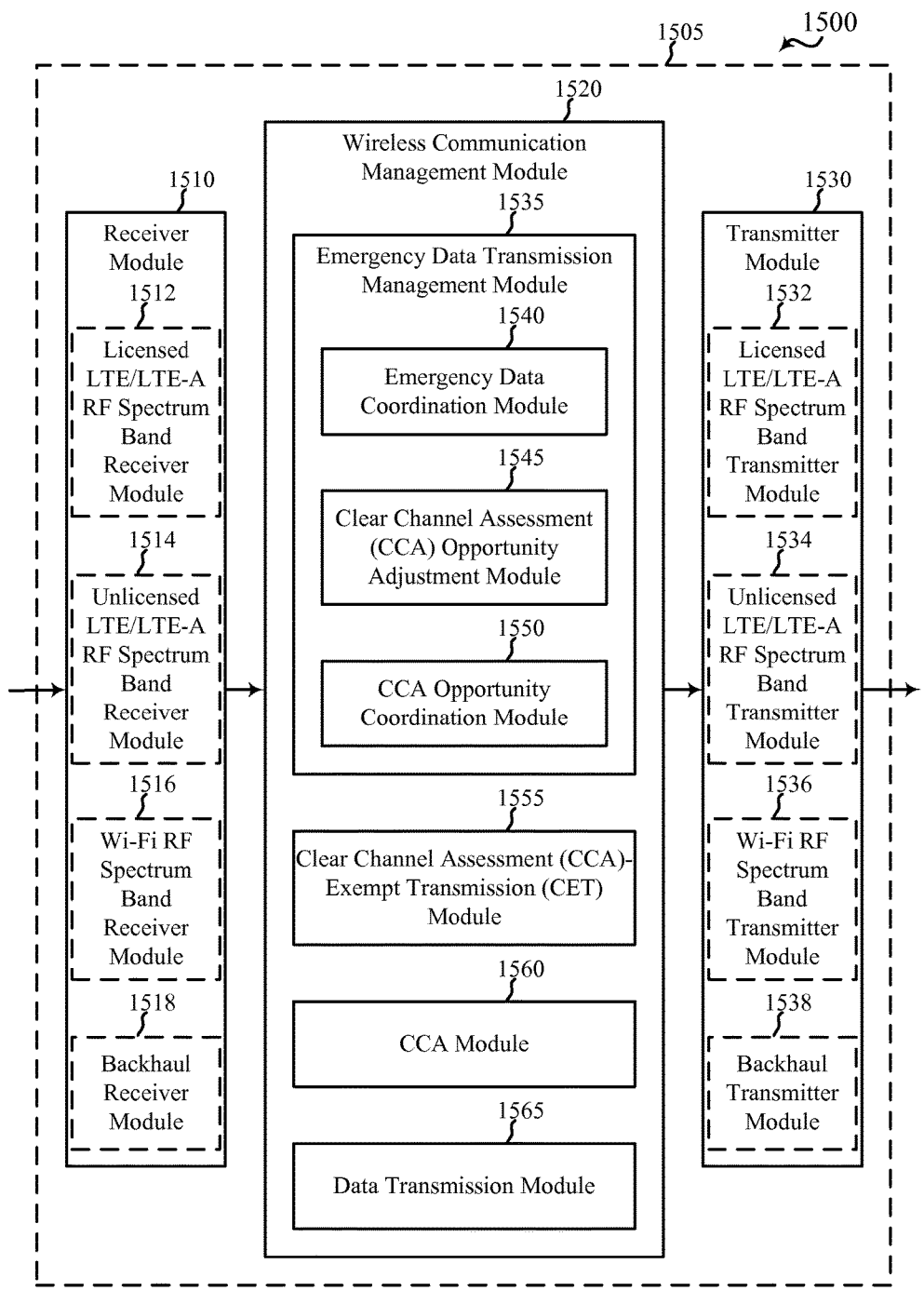
FIG. 15 shows a block diagram of an apparatus for use in wireless communication, in accordance with various aspects of the present disclosure.

FIG. 15 shows a block diagram 1500 of an apparatus 1505 for use in wireless communication, in accordance with various aspects of the present disclosure. In some examples, the apparatus 1505 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of one or more of the apparatuses 1205 and/or 1305 described with reference to FIGS. 12 and/or 13. The apparatus 1505 may in some examples include an LTE/LTE-A compatible base station or UE. The apparatus 1505 may also be a processor. The apparatus 1505 may include a receiver module 1510, a wireless communication management module 1520, and/or a transmitter module 1530. Each of these components may be in communication with each other.

The components of the apparatus 1505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1510 may be an example of one or more aspects of the receiver module 1210 and/or 1310 described with reference to FIGS. 12 and/or 13. In some examples, the receiver module 1510 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1, 2, 3, 4, 5, 6, 7, and/or 8. The receiver module 1510 may in some cases include separate receivers for the licensed radio frequency spectrum band and the unlicensed radio frequency spectrum band. The separate receivers may, in some examples, take the form of a licensed LTE/LTE-A RF spectrum band receiver module 1512 for communicating over the licensed radio frequency spectrum band, and an unlicensed LTE/LTE-A RF spectrum band receiver module 1514 for communicating over the unlicensed radio frequency spectrum band. In some examples, the receiver module 1510 may also include a Wi-Fi RF spectrum band receiver module 1516. In examples in which the apparatus 1505 includes a base station, the receiver module 1510 may include a backhaul receiver module 1518. The receiver module 1510, including the licensed LTE/LTE-A RF spectrum band receiver module 1512, the unlicensed LTE/LTE-A RF spectrum band receiver module 1514, the Wi-Fi RF spectrum band receiver module 1516, and/or the backhaul receiver module 1518 may be used to receive various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the transmitter module 1530 may be an example of one or more aspects of the transmitter module 1230 and/or 1330 described with reference to FIGS. 12 and/or 13. In some examples, the transmitter module 1530 may include at least one RF transmitter, such as at least one RF transmitter operable to transmit over the licensed radio frequency spectrum band and/or the unlicensed radio frequency spectrum band. The transmitter module 1530 may in some cases include separate transmitters for the licensed radio frequency spectrum band and the unlicensed radio frequency spectrum band. The separate transmitters may, in some examples, take the form of a licensed LTE/LTE-A RF spectrum band transmitter module 1532 for communicating over the licensed radio frequency spectrum band, and an unlicensed LTE/LTE-A RF spectrum band transmitter module 1534 for communicating over the unlicensed radio frequency spectrum band. In some examples, the transmitter module 1530 may also include a Wi-Fi RF spectrum band transmitter module 1536. In examples in which the apparatus 1505 includes a base station, the transmitter module 1530 may include a backhaul transmitter module 1538. The transmitter module 1530, including the licensed LTE/LTE-A RF spectrum band transmitter module 1532, the unlicensed LTE/LTE-A RF spectrum band transmitter module 1534, the Wi-Fi RF spectrum band transmitter module 1536, and/or the backhaul transmitter module 1538 may be used to transmit various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the wireless communication management module 1520 may be an example of one or more aspects of the wireless communication management module 1220 and/or 1320 described with reference to FIGS. 12 and/or 13. The wireless communication management module 1520 may include an emergency data transmission management module 1535, a CET module 1555, a CCA module 1560, and/or a data transmission module 1565. Each of these components may be in communication with each other.

In some examples, the emergency data transmission management module 1535 may be an example of the emergency data transmission management module 1235 and/or 1335 described with reference to FIGS. 12 and/or 13. In some examples, the emergency data transmission management module 1535 may be used to determine whether a first node associated with a first operator in a deployment of operators has emergency data to transmit over an unlicensed radio frequency spectrum band. In some examples, the first node may be the apparatus 1505 or an apparatus including the apparatus 1505.

In some examples, the emergency data transmission management module 1535 may include an emergency data coordination module 1540, a CCA opportunity adjustment module 1545, and/or a CCA opportunity coordination module 1550. In some examples, the emergency data coordination module 1540 may be used to determine whether at least one other node associated with one other operator in the deployment of operators has emergency data to transmit over the unlicensed radio frequency spectrum band. In some examples, determining that a node associated with another operator in the deployment of operators has emergency data to transmit over the unlicensed radio frequency spectrum band may include receiving a signal from a node associated with another operator. The signal received from the node associated with another operator may include an indication that the node associated with another operator has emergency data to transmit.

In some examples, the CCA opportunity adjustment module 1545 may be used to adjust a CCA opportunity of the first node. When the emergency data coordination module 1540 determines that there is no node of another operator in the deployment of operators that has emergency data to transmit over the unlicensed radio frequency spectrum band, the CCA opportunity adjustment module 1545 may be used to adjust a CCA opportunity of the first node in response to a determination by the emergency data transmission management module 1535 that the first node has emergency data to transmit. When the emergency data coordination module 1540 determines that a node associated with another operator in the deployment of operators (e.g., a second node associated with a second operator) has emergency data to transmit over the unlicensed radio frequency spectrum band, the CCA opportunity adjustment module 1545 may determine whether to adjust a CCA opportunity of the first node (and when indicated, adjust the CCA opportunity) in response to a determination that the first node has emergency data to transmit, and based on a total number of operators in the deployment of operators that have emergency data to transmit over the unlicensed radio frequency spectrum band.

In some examples, the emergency data coordination module 1540 may determine that a second node associated with a second operator in the deployment of operators has emergency data to transmit over the unlicensed radio frequency spectrum band. In these examples, the CCA opportunity adjustment module 1545 may cycle access to an earliest CCA opportunity between the first node and the second node on a frame-by-frame basis, for each frame during which both the first node and the second node have emergency data to transmit. When the emergency data coordination module 1540 determines that other nodes of other operators in the deployment of operators also have emergency data to transmit over the unlicensed radio frequency spectrum band, the CCA opportunity adjustment module 1545 may also cycle access to the earliest CCA opportunity between these other nodes of other operators.

In some examples, an adjusted CCA opportunity of the first node may collide with and preempt a default CCA opportunity of a second node. In these examples, and assuming that the second node does not have emergency data to transmit over the unlicensed radio frequency spectrum band, the CCA opportunity coordination module 1550 may relinquish a default CCA opportunity of the first node to the second node.

In some examples, the CET module 1555 may be an example of the CET module 1240 and/or 1350 described with reference to FIGS. 12 and/or 13. In some examples, the CET module 1555 may be used to transmit a CET over the unlicensed radio frequency spectrum band. In some examples, the signal indicating that the first node has emergency data to transmit may be transmitted using the CET transmission. In these examples, the signal may also include an indication of a maximum time span of a transmission of the emergency data by the first node.

In some examples the CCA module 1560 may be used to perform a CCA at either an adjusted CCA opportunity or a default CCA opportunity of the first node, depending on the adjustment, if any, made by the CCA opportunity adjustment module 1545. The CCA may be performed to contend for access to a frame of at least one channel of an unlicensed radio frequency spectrum band. In some examples, the emergency data may only be transmitted in a frame or frames of the unlicensed radio frequency spectrum band for which a successful CCA is performed. When a CCA is not successful, or when emergency data needs to be transmitted over multiple frames, a CCA may be performed for one or more subsequent frames.

In some examples, the data transmission module 1565 may be used to transmit the emergency data over the unlicensed radio frequency spectrum band. In some examples, the emergency data may only be transmitted in a frame or frames of the unlicensed radio frequency spectrum band for which at least one CCA performed by the CCA module 1560 is successful (e.g., during a frame following the successful performance of a CCA at an adjusted CCA opportunity or a default CCA opportunity). In some examples, only a portion of the emergency data may be transmitted in a frame. In other examples, all of the emergency data may be transmitted in a frame. In some examples, the emergency data may be transmitted over an MBMS and/or unicast.

In some examples of the apparatus 1505, the emergency data transmission management module 1535 may allocate all available transmission resources in the frame following an adjusted CCA opportunity to the transmission of emergency data, until the emergency data has completed transmission.

In some examples of the apparatus 1505, the data transmission module 1565 may transmit emergency data by the first node over a subset of subcarriers. The subset of subcarriers may be determined based on the first operator of the first node.

In some examples of the apparatus 1505, the CCA module 1560 may perform a CCA concurrently with at least a second node associated with a second operator, where the second node has emergency data to transmit.

In some examples of the apparatus 1505, the CCA module 1560 may perform the CCA concurrently with at least a second node associated with a second operator, where the second node has non-emergency data to transmit, and where a default CCA opportunity of the second node collides with the adjusted CCA opportunity of the first node. In some of these examples, the data transmission module 1565 may transmit emergency data over a joint MBMS including the first operator and the second operator. In some examples, the emergency data transmission management module 1535 may form the joint MBMS in response to a determination that the first node and the second node have the same emergency data to transmit. In some examples, the data transmission module 1565 may transmit the emergency data according to a CoMP operation between the first node and the second node.

Figure 16:
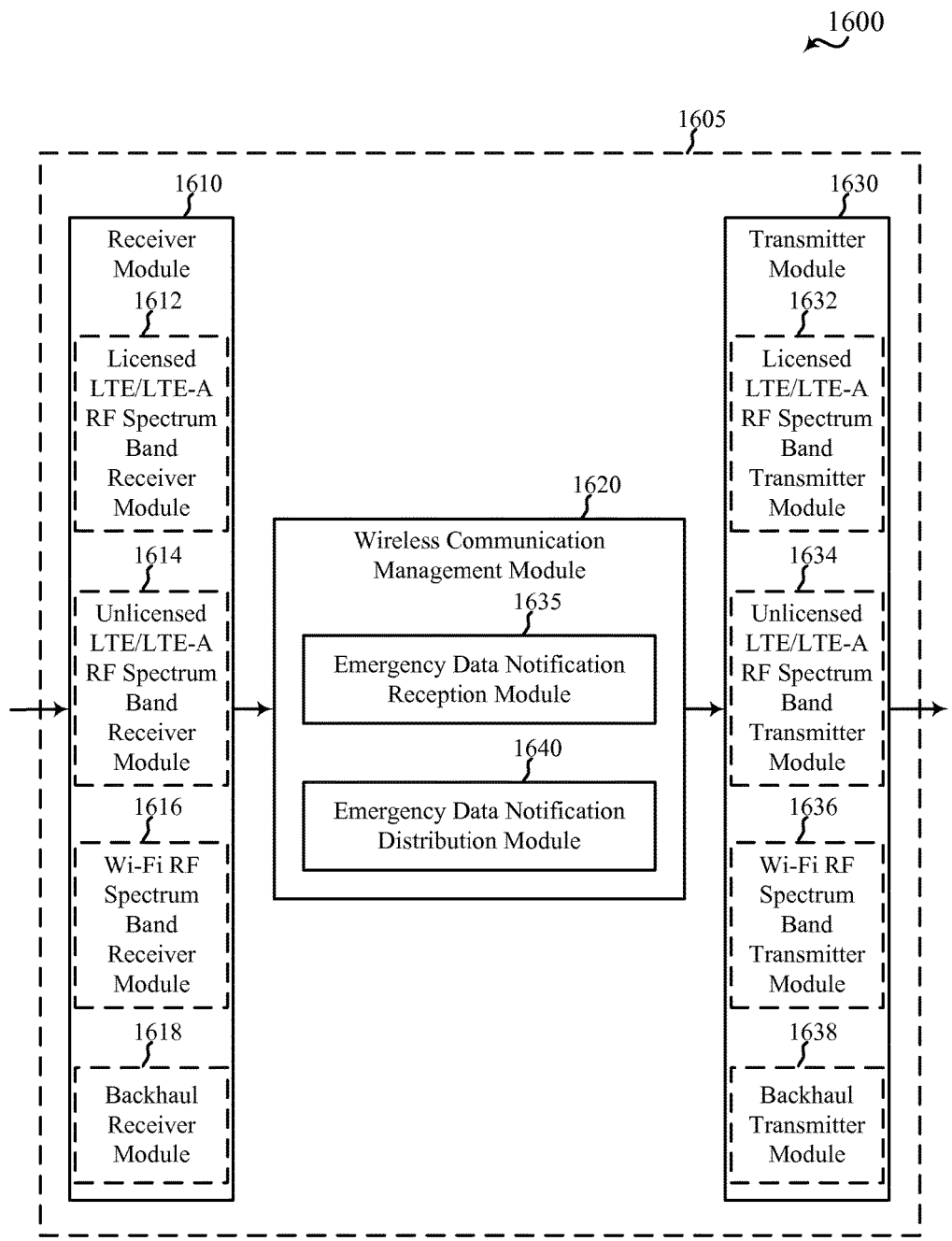
FIG. 16 shows a block diagram of an apparatus for use in wireless communication, in accordance with various aspects of the present disclosure.

FIG. 16 shows a block diagram 1600 of an apparatus 1605 for use in wireless communication, in accordance with various aspects of the present disclosure. In some examples, the apparatus 1605 may be an example of aspects of one or more of the base stations 105, 205, and/or 205-a described with reference to FIGS. 1 and/or 2. The apparatus 1605 may in some examples include an LTE/LTE-A compatible base station. The apparatus 1605 may also be a processor. The apparatus 1605 may include a receiver module 1610, a wireless communication management module 1620, and/or a transmitter module 1630. Each of these components may be in communication with each other.

The components of the apparatus 1605 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1610 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIGS. 1, 2, 3, 4, 5, 6, 7, and/or 8. The receiver module 1610 may in some cases include separate receivers for the licensed radio frequency spectrum band and the unlicensed radio frequency spectrum band. The separate receivers may, in some examples, take the form of a licensed LTE/LTE-A RF spectrum band receiver module 1612 for communicating over the licensed radio frequency spectrum band, and an unlicensed LTE/LTE-A RF spectrum band receiver module 1614 for communicating over the unlicensed radio frequency spectrum band. In some examples, the receiver module 1610 may also include a Wi-Fi RF spectrum band receiver module 1616. In examples in which the apparatus 1605 includes a base station, the receiver module 1610 may include a backhaul receiver module 1618. The receiver module 1610, including the licensed LTE/LTE-A RF spectrum band receiver module 1612, the unlicensed LTE/LTE-A RF spectrum band receiver module 1614, the Wi-Fi RF spectrum band receiver module 1616, and/or the backhaul receiver module 1618 may be used to receive various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the transmitter module 1630 may include at least one RF transmitter, such as at least one RF transmitter operable to transmit over the licensed radio frequency spectrum band and/or the unlicensed radio frequency spectrum band. The transmitter module 1630 may in some cases include separate transmitters for the licensed radio frequency spectrum band and the unlicensed radio frequency spectrum band. The separate transmitters may, in some examples, take the form of a licensed LTE/LTE-A RF spectrum band transmitter module 1632 for communicating over the licensed radio frequency spectrum band, and an unlicensed LTE/LTE-A RF spectrum band transmitter module 1634 for communicating over the unlicensed radio frequency spectrum band. In some examples, the transmitter module 1630 may also include a Wi-Fi RF spectrum band transmitter module 1636. In examples in which the apparatus 1605 includes a base station, the transmitter module 1630 may include a backhaul transmitter module 1638. The transmitter module 1630, including the licensed LTE/LTE-A RF spectrum band transmitter module 1632, the unlicensed LTE/LTE-A RF spectrum band transmitter module 1634, the Wi-Fi RF spectrum band transmitter module 1636, and/or the backhaul transmitter module 1638 may be used to transmit various types of data and/or control signals (i.e., transmissions) over one or more communication links and/or backhaul links of a wireless communication system, such as one or more communication links and/or backhaul links of the wireless communication system 100 and/or 200 described with reference to FIGS. 1 and/or 2. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the wireless communication management module 1620 may include an emergency data notification reception module 1635 and/or an emergency data notification distribution module 1640. Each of these components may be in communication with each other.

In some examples, the emergency data notification reception module 1635 may be used to receive, at a first base station associated with a first operator in a deployment of operators, an uplink transmission from a UE indicating that the UE has emergency uplink data to transmit over an unlicensed radio frequency spectrum band. In some examples, the uplink transmission may be part of an uplink signal, and in some examples, the uplink transmission may be included in a sounding reference signal (SRS), a physical random access channel (PRACH), channel state information (CSI), and/or a scheduling request (SR) included in the signal. In some examples, the apparatus 1605 may include the first base station. In some examples, the first base station may be an LTE/LTE-A-compatible base station.

In some examples, the emergency data notification distribution module 1640 may be used to transmit an indication from the first base station, to a second base station, that a UE has emergency uplink data to transmit over the unlicensed radio frequency spectrum band. In some examples, the second base station may be an LTE/LTE-A-compatible base station. In some examples, the indication transmitted to the second base station may include a downlink signal and/or a transmission at a beginning of an LBT burst.

Depending on the uplink transmission from the UE indicating that the UE has emergency uplink data to transmit, and the indication transmitted from the first base station to the second base station indicating that the UE has emergency data to transmit, UEs associated with the first base station and the second base station may adjust their respective CCA opportunities accordingly. For example, if the first base station sets an uplink emergency indication in its own signal while the second based station does not (e.g., because the second base station and its UEs do not have emergency data to transmit), UEs associated with the first base station may override their default CCA opportunity and set their CCA opportunity to an earliest CCA opportunity if they have emergency data to transmit, while UEs associated with the second base station may yield their default CCA opportunity if it collides with the adjusted CCA opportunity of a UE associated with the first base station. Also, the UEs associated with second base station may relinquish their default CCA opportunity to the UEs associated with the first base station.

Figure 17:
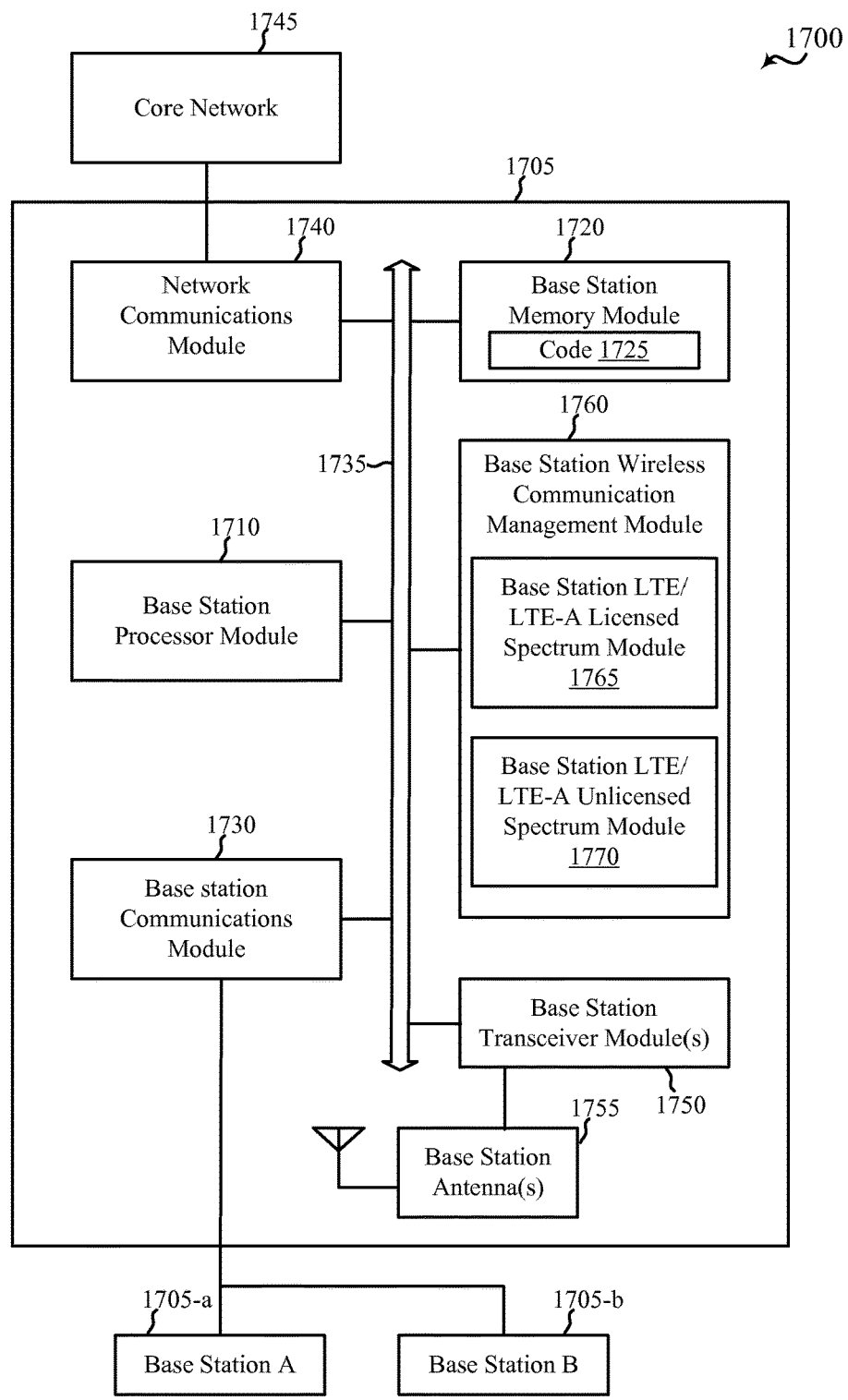
FIG. 17 shows a block diagram of a base station (e.g., a base station forming part or all of an evolved NodeB (eNB)) for use in wireless communication, in accordance with various aspects of the present disclosure.

FIG. 17 shows a block diagram 1700 of a base station 1705 (e.g., a base station forming part or all of an eNB) for use in wireless communication, in accordance with various aspects of the present disclosure. In some examples, the base station 1705 may be an example of aspects of one or more of the base stations 105, 205, and/or 205-*a* described with reference to FIGS. 1 and/or 2, and/or aspects of one or more of the apparatuses 1205, 1305, 1405, 1505, and/or 1605 described with reference to FIGS. 12, 13, 14, 15, and/or 16 when configured as a base station. The base station 1705 may be configured to implement or facilitate at least some of the access point and/or apparatus features and functions described with reference to FIGS. 1, 2, 3, 4, 5, 6, 7, 8, 9, 10, 11, 12, 13, 14, 15, and/or 16.

The base station 1705 may include a base station processor module 1710, a base station memory module 1720, at least one base station transceiver module (represented by base station transceiver module(s) 1750), at least one base station antenna (represented by base station antenna(s) 1755), and/or a base station wireless communication management module 1760. The base station 1705 may also include one or more of a base station communications module 1730 and/or a network communications module 1740. Each of these components may be in communication with each other, directly or indirectly, over one or more buses 1735.

The base station memory module 1720 may include random access memory (RAM) and/or read-only memory (ROM). The base station memory module 1720 may store computer-readable, computer-executable code 1725 containing instructions that are configured to, when executed, cause the base station processor module 1710 to perform various functions described herein related to wireless communication (e.g., functions relating to indicating that emergency data needs to be transmitted, transmitting emergency data, etc.). Alternatively, the code 1725 may not be directly executable by the base station processor module 1710 but be configured to cause the base station 1705 (e.g., when compiled and executed) to perform various of the functions described herein.

The base station processor module 1710 may include an intelligent hardware device, e.g., a central processing unit (CPU), a microcontroller, an ASIC, etc. The base station processor module 1710 may process information received through the base station transceiver module(s) 1750, the base station communications module 1730, and/or the network communications module 1740. The base station processor module 1710 may also process information to be sent to the transceiver module(s) 1750 for transmission through the antenna(s) 1755, to the base station communications module 1730, for transmission to one or more other base stations 1705-*a* and 1705-*b*, and/or to the network communications module 1740 for transmission to a core network 1745, which may be an example of one or more aspects of the core network 130 described with reference to FIG. 1. The base station processor module 1710 may handle, alone or in connection with the base station wireless communication management module 1760, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available, at least in part, for unlicensed use, such as Wi-Fi use and/or unlicensed LTE/LTE-A use).

The base station transceiver module(s) 1750 may include a modem configured to modulate packets and provide the modulated packets to the base station antenna(s) 1755 for transmission, and to demodulate packets received from the base station antenna(s) 1755. The base station transceiver module(s) 1750 may, in some examples, be implemented as one or more base station transmitter modules and one or more separate base station receiver modules. The base station transceiver module(s) 1750 may support communications in the first radio frequency spectrum band and/or the second radio frequency spectrum band. The base station transceiver module(s) 1750 may be configured to communicate bi-directionally, via the antenna(s) 1755, with one or more UEs or apparatuses, such as one or more of the UEs 115, 215, 215-*a*, 215-*b*, and/or 215-*c* described with reference to FIGS. 1 and/or 2, and/or one or more of the apparatuses 1205, 1305, 1405, and/or 1505 described with reference to FIGS. 12, 13, 14, and/or 15. The base station 1705 may, for example, include multiple base station antennas 1755 (e.g., an antenna array). The base station 1705 may communicate with the core network 1745 through the network communications module 1740. The base station 1705 may also communicate with other base stations, such as the base stations 1705-*a* and 1705-*b*, using the base station communications module 1730.

The base station wireless communication management module 1760 may be configured to perform and/or control some or all of the features and/or functions described with reference to FIGS. 1, 2, 3, 4, 5, 6, 7, 8, 9, 10, 11, 12, 13, 14, 15, and/or 16 related to wireless communication (e.g., functions relating to indicating that emergency data needs to be transmitted, transmitting emergency data, etc.) over the first radio frequency spectrum band and/or the second radio frequency spectrum band. For example, the base station wireless communication management module 1760 may be configured to support a supplemental downlink mode, a carrier aggregation mode, and/or a standalone mode using the first radio frequency spectrum band and/or the second radio frequency spectrum band. The base station wireless communication management module 1760 may include a base station LTE/LTE-A licensed spectrum module 1765 configured to handle LTE/LTE-A communications in the first radio frequency spectrum band, and a base station LTE/LTE-A unlicensed spectrum module 1770 configured to handle LTE/LTE-A communications in the second radio frequency spectrum band. The base station wireless communication management module 1760, or portions of it, may include a processor, and/or some or all of the functions of the base station wireless communication management module 1760 may be performed by the base station processor module 1710 and/or in connection with the base station processor module 1710. In some examples, the base station wireless communication management module 1760 may be an example of the wireless communication management module 1220, 1320, 1420, 1520, and/or 1620 described with reference to FIGS. 12, 13, 14, 15, and/or 16.

Figure 18:
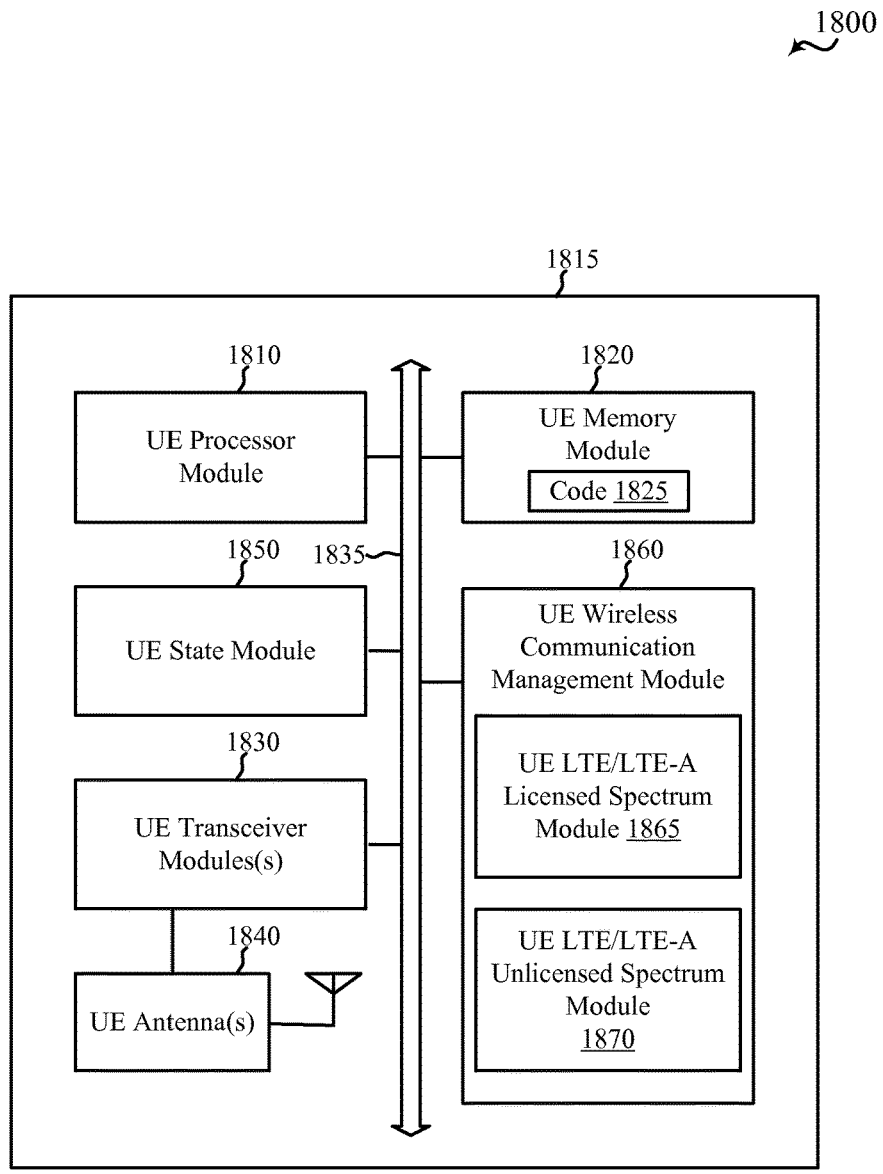
FIG. 18 shows a block diagram of a UE for use in wireless communication, in accordance with various aspects of the present disclosure.

FIG. 18 shows a block diagram 1800 of a UE 1815 for use in wireless communication, in accordance with various aspects of the present disclosure. The UE 1815 may have various configurations and may be or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1815 may, in some examples, have an internal power supply (not shown), such as a small battery, to facilitate mobile operation. In some examples, the UE 1815 may be an example of aspects of one or more of the UEs 115, 215, 215-a, 215-b, and/or 215-c described with reference to FIGS. 1 and/or 2, and/or aspects of one or more of the apparatuses 1205, 1305, 1405, and/or 1505 described with reference to FIGS. 12, 13, 14, and/or 15. The UE 1815 may be configured to implement at least some of the UE and/or apparatus features and functions described with reference to FIGS. 1, 2, 3, 4, 5, 6, 7, 8, 9, 10, 11, 12, 13, 14, and/or 15.

The UE 1815 may include a UE processor module 1810, a UE memory module 1820, at least one UE transceiver module (represented by UE transceiver module(s) 1830), at least one UE antenna (represented by UE antenna(s) 1840), and/or a UE wireless communication management module 1860. Each of these components may be in communication with each other, directly or indirectly, over one or more buses 1835.

The UE memory module 1820 may include RAM and/or ROM. The UE memory module 1820 may store computer-readable, computer-executable code 1825 containing instructions that are configured to, when executed, cause the UE processor module 1810 to perform various functions described herein related to wireless communication (e.g., functions relating to indicating that emergency data needs to be transmitted, transmitting emergency data, etc.). Alternatively, the code 1825 may not be directly executable by the UE processor module 1810 but be configured to cause the UE 1815 (e.g., when compiled and executed) to perform various of the functions described herein.

The UE processor module 1810 may include an intelligent hardware device, e.g., a CPU, a microcontroller, an ASIC, etc. The UE processor module 1810 may process information received through the UE transceiver module(s) 1830 and/or information to be sent to the UE transceiver module(s) 1830 for transmission through the UE antenna(s) 1840. The UE processor module 1810 may handle, alone or in connection with the UE wireless communication management module 1860, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available, at least in part, for unlicensed use, such as Wi-Fi use and/or unlicensed LTE/LTE-A use).

The UE transceiver module(s) 1830 may include a modem configured to modulate packets and provide the modulated packets to the UE antenna(s) 1840 for transmission, and to demodulate packets received from the UE antenna(s) 1840. The UE transceiver module(s) 1830 may, in some examples, be implemented as one or more UE transmitter modules and one or more separate UE receiver modules. The UE transceiver module(s) 1830 may support communications in the first radio frequency spectrum band and/or the second radio frequency spectrum band. The UE transceiver module(s) 1830 may be configured to communicate bi-directionally, via the UE antenna(s) 1840, with one or more of the base stations 105, 205, 205-a, and/or 1705 described with reference to FIGS. 1, 2, and/or 17, and/or one or more of the apparatuses 1205, 1305, 1405, 1505, and/or 1605 described with reference to FIGS. 12, 13, 14, 15, and/or 16. While the UE 1815 may include a single UE antenna, there may be examples in which the UE 1815 may include multiple UE antennas 1840.

The UE state module 1850 may be used, for example, to manage transitions of the UE 1815 between an RRC idle state and an RRC connected state, and may be in communication with other components of the UE 1815, directly or indirectly, over the one or more buses 1835. The UE state module 1850, or portions of it, may include a processor, and/or some or all of the functions of the UE state module 1850 may be performed by the UE processor module 1810 and/or in connection with the UE processor module 1810.

The UE wireless communication management module 1860 may be configured to perform and/or control some or all of the features and/or functions described with reference to FIGS. 1, 2, 3, 4, 5, 6, 7, 8, 9, 10, 11, 12, 13, 14, and/or 15 related to wireless communication (e.g., functions relating to indicating that emergency data needs to be transmitted, transmitting emergency data, etc.) over the first radio frequency spectrum band and/or the second radio frequency spectrum band. In some examples, the UE wireless communication management module 1860 may be configured to support a supplemental downlink mode, a carrier aggregation mode, and/or a standalone mode using the first spectrum and/or the second spectrum. The UE wireless communication management module 1860 may include a UE LTE/LTE-A licensed spectrum module 1865 configured to handle LTE/LTE-A communications in the first radio frequency spectrum band, and a UE LTE/LTE-A unlicensed spectrum module 1870 configured to handle LTE/LTE-A communications in the second radio frequency spectrum band. The UE wireless communication management module 1860, or portions of it, may include a processor, and/or some or all of the functions of the UE wireless communication management module 1860 may be performed by the UE processor module 1810 and/or in connection with the UE processor module 1810. In some examples, the UE wireless communication management module 1860 may be an example of the wireless communication management module 1220, 1320, 1420, and/or 1520 described with reference to FIGS. 12, 13, 14, and/or 15.

Figure 19:
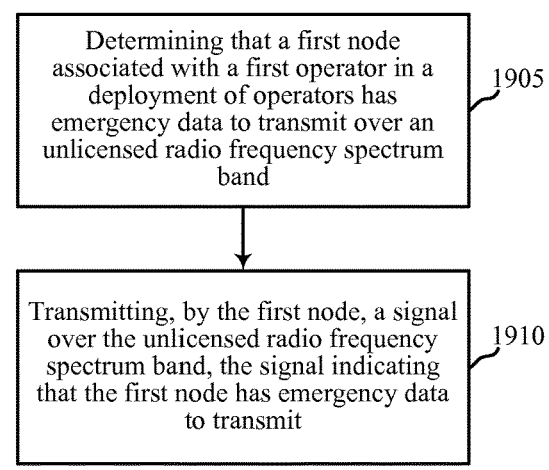
FIG. 19 is a flow chart illustrating an example of a method for wireless communication, in accordance with various aspects of the present disclosure.

FIG. 19 is a flow chart illustrating an example of a method 1900 for wireless communication, in accordance with various aspects of the present disclosure. For clarity, the method 1900 is described below with reference to aspects of one or more of the base stations 105, 205, 205-a, and/or 1705 described with reference to FIGS. 1, 2, and/or 17, aspects of one or more of the UEs 115, 215, 215-a, 215-b, 215-c, and/or 1815 described with reference to FIGS. 1, 2, and/or 18, and/or aspects of one or more of the apparatuses 1205, 1305, 1405, and/or 1505 described with reference to FIGS. 12, 13, 14, and/or 15. In some examples, a base station, UE, and/or apparatus may execute one or more sets of codes to control the functional elements of the base station, UE, and/or apparatus to perform the functions described below.

At block 1905, the method 1900 may include determining that a first node associated with a first operator in a deployment of operators has emergency data to transmit over an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). The first node may in some examples include a base station and may in some examples include a UE. In some examples, the base station or UE may be an LTE/LTE-A-compatible base station or UE. The operation(s) at block 1905 may be performed using the wireless communication management module 1220, 1320, 1420, 1520, 1760, and/or 1860 described with reference to FIGS. 12, 13, 14, 15, 17, and/or 18, and/or the emergency data transmission management module 1235, 1335, 1435, and/or 1535 described with reference to FIGS. 12, 13, 14, and/or 15.

At block 1910, the method 1900 may include transmitting, by the first node, a signal over the unlicensed radio frequency spectrum band. The signal may indicate that the first node has emergency data to transmit. In some examples, the signal may include an indication of a maximum time span of a transmission of the emergency data by the first node. The operation(s) at block 1910 may be performed using the wireless communication management module 1220, 1320, 1420, 1520, 1760, and/or 1860 described with reference to FIGS. 12, 13, 14, 15, 17, and/or 18, and/or the emergency data transmission management module 1235, 1335, 1435, and/or 1535 described with reference to FIGS. 12, 13, 14, and/or 15.

Thus, the method 1900 may provide for wireless communication. It should be noted that the method 1900 is just one implementation and that the operations of the method 1900 may be rearranged or otherwise modified such that other implementations are possible.

Figure 20:
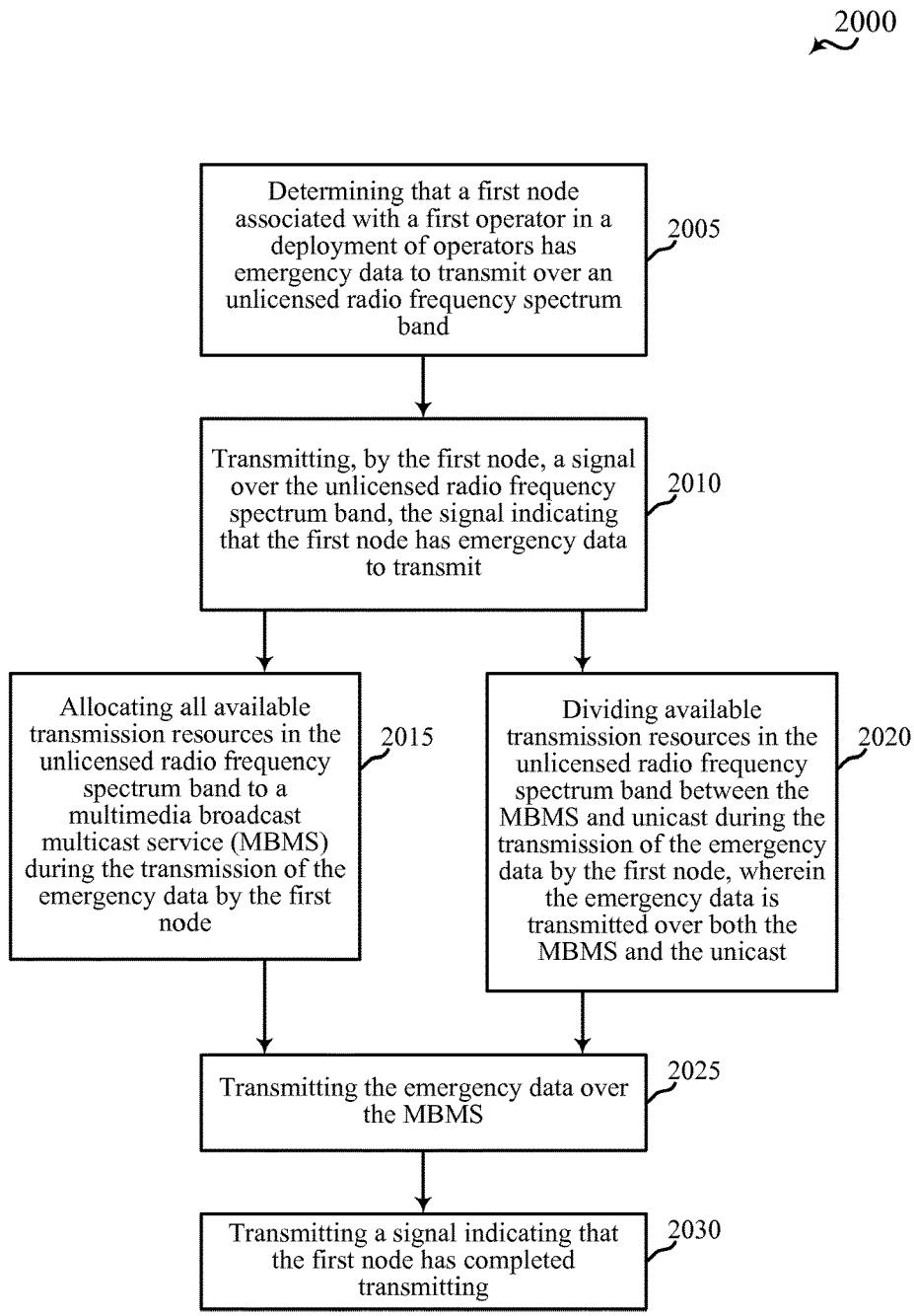
FIG. 20 is a flow chart illustrating an example of a method for wireless communication, in accordance with various aspects of the present disclosure.

FIG. 20 is a flow chart illustrating an example of a method 2000 for wireless communication, in accordance with various aspects of the present disclosure. For clarity, the method 2000 is described below with reference to aspects of one or more of the base stations 105, 205, 205-a, and/or 1705 described with reference to FIGS. 1, 2, and/or 17, aspects of one or more of the UEs 115, 215, 215-a, 215-b, 215-c, and/or 1815 described with reference to FIGS. 1, 2, and/or 18, and/or aspects of one or more of the apparatuses 1205, 1305, 1405, and/or 1505 described with reference to FIGS. 12, 13, 14, and/or 15. In some examples, a base station, UE, and/or apparatus may execute one or more sets of codes to control the functional elements of the base station, UE, and/or apparatus to perform the functions described below.

At block 2005, the method 2000 may include determining that a first node associated with a first operator in a deployment of operators has emergency data to transmit over an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). The first node may in some examples include a base station and may in some examples include a UE. In some examples, the base station or UE may be an LTE/LTE-A-compatible base station or UE. The operation(s) at block 2005 may be performed using the wireless communication management module 1220, 1320, 1420, 1520, 1760, and/or 1860 described with reference to FIGS. 12, 13, 14, 15, 17, and/or 18, and/or the emergency data transmission management module 1235, 1335, 1435, and/or 1535 described with reference to FIGS. 12, 13, 14, and/or 15.

At block 2010, the method 2000 may include transmitting, by the first node, a signal over the unlicensed radio frequency spectrum band. The signal may indicate that the first node has emergency data to transmit. In some examples, the signal may include an indication of a maximum time span of a transmission of the emergency data by the first node. The operation(s) at block 2010 may be performed using the wireless communication management module 1220, 1320, 1420, 1520, 1760, and/or 1860 described with reference to FIGS. 12, 13, 14, 15, 17, and/or 18, and/or the emergency data transmission management module 1235, 1335, 1435, and/or 1535 described with reference to FIGS. 12, 13, 14, and/or 15.

At block 2015, and in one example, the method 2000 may include allocating all available transmission resources in the unlicensed radio frequency spectrum band to an MBMS during the transmission of the emergency data by the first node. At block 2020, and in another example, the method 2000 may include dividing available transmission resources in the unlicensed radio frequency spectrum band between the MBMS and unicast during the transmission of the emergency data by the first node. In the latter example, the emergency data may be transmitted over both the MBMS and the unicast. The operation(s) at block 2015 and/or 2020 may be performed using the wireless communication management module 1220, 1320, 1420, 1520, 1760, and/or 1860 described with reference to FIGS. 12, 13, 14, 15, 17, and/or 18, the emergency data transmission management module 1235, 1335, 1435, and/or 1535 described with reference to FIGS. 12, 13, 14, and/or 15, and/or the resource allocation module 1345 described with reference to FIG. 13.

At block 2025, the method 2000 may include transmitting the emergency data over the MBMS and/or unicast, in accordance with the allocation of transmission resources made in block 2015 or 2020. In some examples, the emergency data may only be transmitted over the MBMS and/or unicast in a frame or frames of the unlicensed radio frequency spectrum band for which a successful CCA is performed. The operation(s) at block 2025 may be performed using the wireless communication management module 1220, 1320, 1420, 1520, 1760, and/or 1860 described with reference to FIGS. 12, 13, 14, 15, 17, and/or 18, the data transmission module 1355, 1460, and/or 1565 described with reference to FIGS. 13, 14, and/or 15, and/or MBMS transmission module 1360 described with reference to FIG. 13.

At block 2030, the method 2000 may include transmitting a second signal indicating that the first node has completed transmitting the emergency data. The operation(s) at block 2030 may be performed using the wireless communication management module 1220, 1320, 1420, 1520, 1760, and/or 1860 described with reference to FIGS. 12, 13, 14, 15, 17, and/or 18, and/or the emergency data transmission management module 1235, 1335, 1435, and/or 1535 described with reference to FIGS. 12, 13, 14, and/or 15.

Thus, the method 2000 may provide for wireless communication. It should be noted that the method 2000 is just one implementation and that the operations of the method 2000 may be rearranged or otherwise modified such that other implementations are possible.

Figure 21:
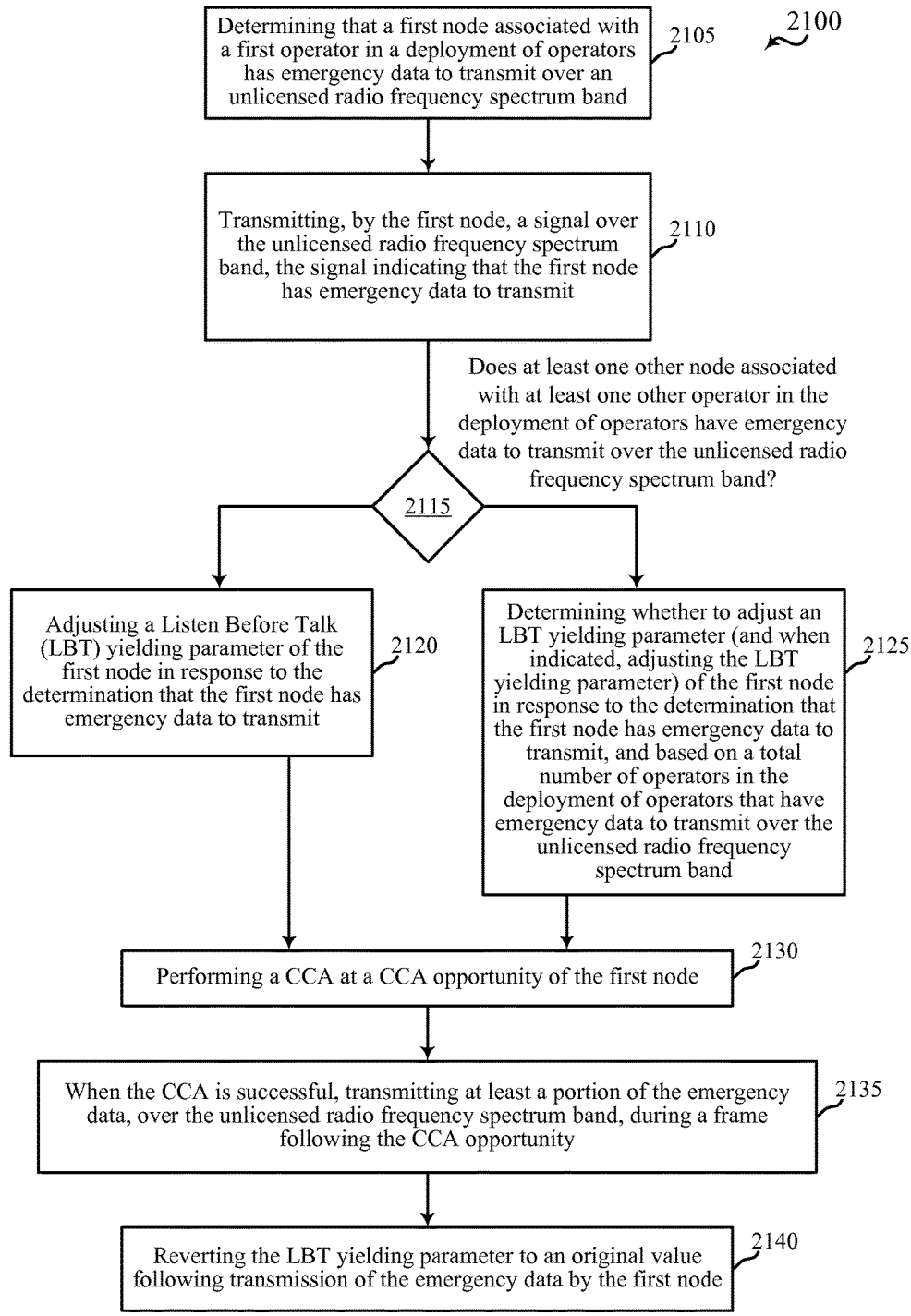
FIG. 21 is a flow chart illustrating an example of a method for wireless communication, in accordance with various aspects of the present disclosure.

FIG. 21 is a flow chart illustrating an example of a method 2100 for wireless communication, in accordance with various aspects of the present disclosure. For clarity, the method 2100 is described below with reference to aspects of one or more of the base stations 105, 205, 205-*a*, and/or 1705 described with reference to FIGS. 1, 2, and/or 17, aspects of one or more of the UEs 115, 215, 215-*a*, 215-*b*, 215-*c*, and/or 1815 described with reference to FIGS. 1, 2, and/or 18, and/or aspects of one or more of the apparatuses 1205, 1305, and/or 1405 described with reference to FIGS. 12, 13, and/or 14. In some examples, a base station, UE, and/or apparatus may execute one or more sets of codes to control the functional elements of the base station, UE, and/or apparatus to perform the functions described below.

At block 2105, the method 2100 may include determining that a first node associated with a first operator in a deployment of operators has emergency data to transmit over an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). The first node may in some examples include a base station and may in some examples include a UE. In some examples, the base station or UE may be an LTE/LTE-A-compatible base station or UE. The operation(s) at block 2105 may be performed using the wireless communication management module 1220, 1320, 1420, 1760, and/or 1860 described with reference to FIGS. 12, 13, 14, 17, and/or 18, and/or the emergency data transmission management module 1235, 1335, and/or 1435 described with reference to FIGS. 12, 13, and/or 14.

At block 2110, the method 2100 may include transmitting, by the first node, a signal over the unlicensed radio frequency spectrum band. The signal may indicate that the first node has emergency data to transmit. In some examples, the signal may include an indication of a maximum time span of a transmission of the emergency data by the first node. The operation(s) at block 2110 may be performed using the wireless communication management module 1220, 1320, 1420, 1760, and/or 1860 described with reference to FIGS. 12, 13, 14, 17, and/or 18, and/or the emergency data transmission management module 1235, 1335, and/or 1435 described with reference to FIGS. 12, 13, and/or 14.

At block 2115, the method 2100 may include determining whether at least one other node associated with one other operator in the deployment of operators has emergency data to transmit over the unlicensed radio frequency spectrum band. When it is determined that there is no node of another operator in the deployment of operators that has emergency data to transmit over the unlicensed radio frequency spectrum band, the method 2100 may proceed to block 2120. When it is determined that a node associated with another operator in the deployment of operators (e.g., a second node associated with a second operator) has emergency data to transmit over the unlicensed radio frequency spectrum band, the method 2100 may proceed to block 2125. In some examples, determining that a node associated with another operator in the deployment of operators has emergency data to transmit over the unlicensed radio frequency spectrum band may include receiving a signal from a node associated with another operator (e.g., receiving a signal from a second node associated with a second operator). The signal received from the node associated with another operator may include an indication that the node associated with another operator has emergency data to transmit. The operation(s) at block 2115 may be performed using the wireless communication management module 1220, 1320, 1420, 1760, and/or 1860 described with reference to FIGS. 12, 13, 14, 17, and/or 18, the emergency data transmission management module 1235, 1335, and/or 1435 described with reference to FIGS. 12, 13, and/or 14, and/or the emergency data coordination module 1440 described with reference to FIG. 14.

At block 2120, the method 2100 may include adjusting an LBT yielding parameter of the first node in response to the determination that the first node has emergency data to transmit. The operation(s) at block 2120 may be performed using the wireless communication management module 1220, 1320, 1420, 1760, and/or 1860 described with reference to FIGS. 12, 13, 14, 17, and/or 18, the emergency data transmission management module 1235, 1335, and/or 1435 described with reference to FIGS. 12, 13, and/or 14, and/or the LBT yielding parameter adjustment module 1445 described with reference to FIG. 14.

In some examples of the method 2100, the LBT yielding parameter adjusted at block 2120 may include one of a first LBT yielding parameter or a second LBT yielding parameter. The first LBT yielding parameter (e.g., the N parameter of an N/K protocol) may define a number of consecutive frames triggering the first node in the deployment of operators to yield access to the unlicensed radio frequency spectrum band, and the second LBT yielding parameter (e.g., the K parameter of an N/K protocol) may define a number of consecutive frames during which the first node yields access to the unlicensed radio frequency spectrum band following transmission of the number of consecutive frames defined by the first LBT yielding parameter. In some examples, adjusting the LBT yielding parameter may include increasing the first LBT yielding parameter from a default value. In some examples, adjusting the LBT yielding parameter may include decreasing the second LBT yielding parameter from a default value. In some examples, decreasing the second LBT yielding parameter from a default value may include setting the second LBT yielding parameter to zero while the first node has emergency data to transmit. In some examples, adjusting the LBT yielding parameter may include adjusting both the first LBT yielding parameter and the second LBT yielding parameter.

In some examples of the method 2100, an adjusted LBT yielding parameter of the first node may be different from a corresponding LBT yielding parameter used by a node having no emergency data to transmit.

At block 2125, the method 2100 may include determining whether to adjust an LBT yielding parameter of the first node in response to the determination that the first node has emergency data to transmit, and based on a total number of operators in the deployment of operators that have emergency data to transmit over the unlicensed radio frequency spectrum band. When it is determined at block 2125 to adjust an LBT yielding parameter of the first node, the LBT yielding parameter of the first node may be adjusted at block 2125. In some examples, adjusting an LBT yielding parameter may include adjusting one of a first LBT yielding parameter or a second LBT yielding parameter, as described, for example, with reference to block 2120. The operation(s) at block 2125 may be performed using the wireless communication management module 1220, 1320, 1420, 1760, and/or 1860 described with reference to FIGS. 12, 13, 14, 17, and/or 18, the emergency data transmission management module 1235, 1335, and/or 1435 described with reference to FIGS. 12, 13, and/or 14, and/or the LBT yielding parameter adjustment module 1445 described with reference to FIG. 14.

In some examples of the method 2100, it may be determined at block 2115 that a second node associated with a second operator in the deployment of operators has emergency data to transmit over the unlicensed radio frequency spectrum band. In these examples, adjusting the LBT yielding parameter at block 2125 may include matching the LBT yielding parameter of the first node to a corresponding LBT yielding parameter of the second node.

At block 2130, the method 2100 may include performing a CCA at a CCA opportunity of the first node. The operation(s) at block 2130 may be performed using the wireless communication management module 1220, 1320, 1420, 1760, and/or 1860 described with reference to FIGS. 12, 13, 14, 17, and/or 18, and/or the CCA module 1455 described with reference to FIG. 14.

At block 2135, and when the CCA performed at block 2130 is successful, the method 2300 may include the first node transmitting at least a portion of the emergency data, over the unlicensed radio frequency spectrum band, during a frame following the CCA opportunity. When the CCA is not successful, or when emergency data needs to be transmitted over multiple frames, a CCA may be performed for one or more subsequent frames, and at least a portion of the emergency data may be transmitted during a frame following a successful CCA. In some examples, the emergency data may be transmitted over an MBMS and/or unicast. In some examples, the emergency data may be transmitted over more than one frame of the unlicensed radio frequency spectrum band. The operation(s) at block 2135 may be performed using the wireless communication management module 1220, 1320, 1420, 1760, and/or 1860 described with reference to FIGS. 12, 13, 14, 17, and/or 18, and/or the data transmission module 1355 and/or 1460 described with reference to FIGS. 13 and/or 14.

At block 2140, the method 2100 may include reverting the LBT yielding parameter to an original value (e.g., a default value) following transmission of the emergency data by the first node. The operation(s) at block 2140 may be performed using the wireless communication management module 1220, 1320, 1420, 1760, and/or 1860 described with reference to FIGS. 12, 13, 14, 17, and/or 18, the emergency data transmission management module 1235, 1335, and/or 1435 described with reference to FIGS. 12, 13, and/or 14, and/or the LBT yielding parameter adjustment module 1445 described with reference to FIG. 14.

Thus, the method 2100 may provide for wireless communication. It should be noted that the method 2100 is just one implementation and that the operations of the method 2100 may be rearranged or otherwise modified such that other implementations are possible.

Figure 22:
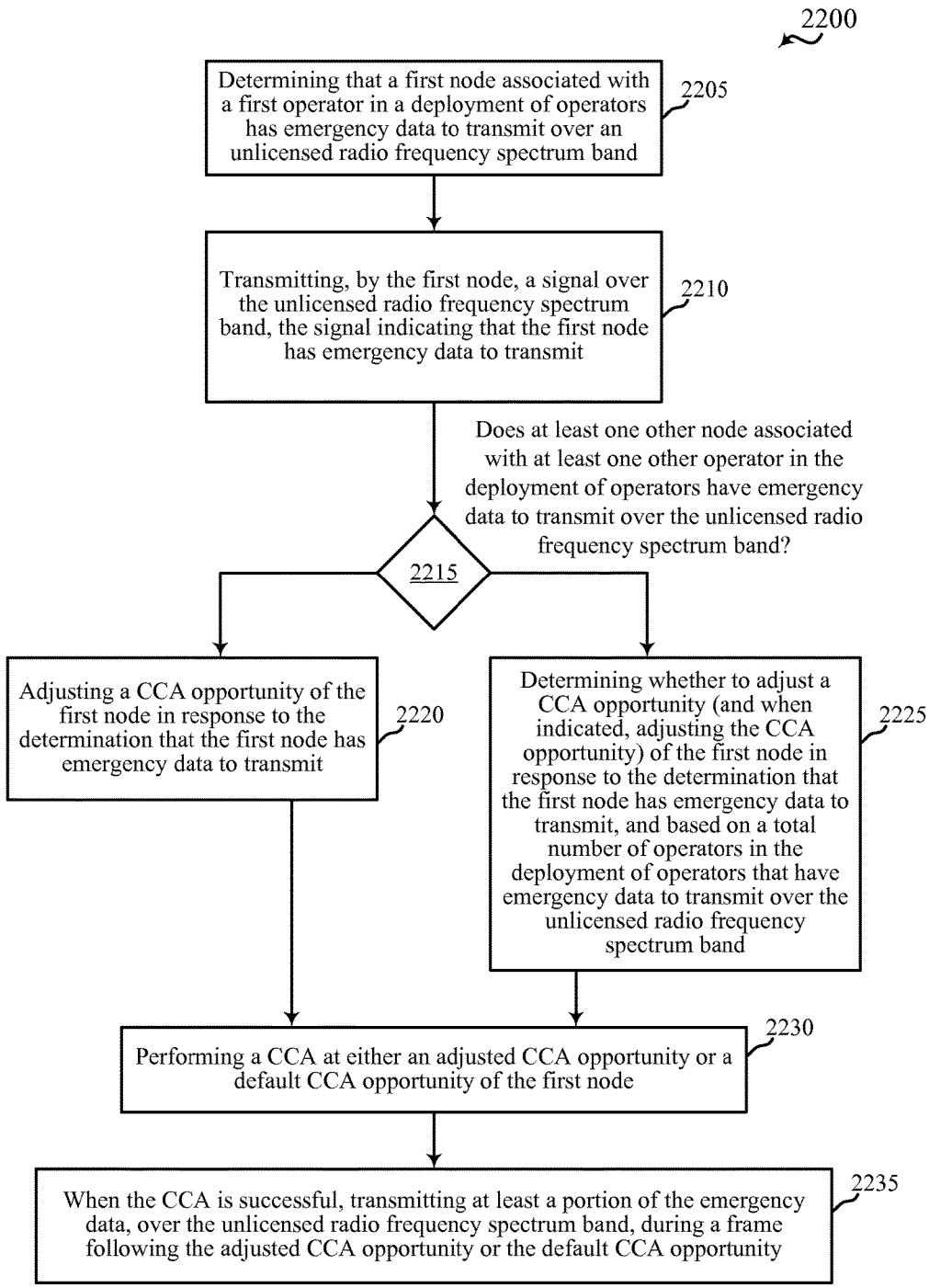
FIG. 22 is a flow chart illustrating an example of a method for wireless communication, in accordance with various aspects of the present disclosure.

FIG. 22 is a flow chart illustrating an example of a method 2200 for wireless communication, in accordance with various aspects of the present disclosure. For clarity, the method 2200 is described below with reference to aspects of one or more of the base stations 105, 205, 205-a, and/or 1705 described with reference to FIGS. 1, 2, and/or 17, aspects of one or more of the UEs 115, 215, 215-a, 215-b, 215-c, and/or 1815 described with reference to FIGS. 1, 2, and/or 18, and/or aspects of one or more of the apparatuses 1205, 1305, and/or 1505 described with reference to FIGS. 12, 13, and/or 15. In some examples, a base station, UE, and/or apparatus may execute one or more sets of codes to control the functional elements of the base station, UE, and/or apparatus to perform the functions described below.

At block 2205, the method 2200 may include determining that a first node associated with a first operator in a deployment of operators has emergency data to transmit over an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). The first node may in some examples include a base station and may in some examples include a UE. In some examples, the base station or UE may be an LTE/LTE-A-compatible base station or UE. The operation(s) at block 2205 may be performed using the wireless communication management module 1220, 1320, 1520, 1760, and/or 1860 described with reference to FIGS. 12, 13, 15, 17, and/or 18, and/or the emergency data transmission management module 1235, 1335, and/or 1535 described with reference to FIGS. 12, 13, and/or 15.

At block 2210, the method 2200 may include transmitting, by the first node, a signal over the unlicensed radio frequency spectrum band. The signal may indicate that the first node has emergency data to transmit. In some examples, the signal may include an indication of a maximum time span of a transmission of the emergency data by the first node. The operation(s) at block 2210 may be performed using the wireless communication management module 1220, 1320, 1520, 1760, and/or 1860 described with reference to FIGS. 12, 13, 15, 17, and/or 18, and/or the emergency data transmission management module 1235, 1335, and/or 1535 described with reference to FIGS. 12, 13, and/or 15.

At block 2215, the method 2200 may include determining whether at least one other node associated with one other operator in the deployment of operators has emergency data to transmit over the unlicensed radio frequency spectrum band. When it is determined that there is no node of another operator in the deployment of operators that has emergency data to transmit over the unlicensed radio frequency spectrum band, the method 2200 may proceed to block 2220. When it is determined that a node associated with another operator in the deployment of operators (e.g., a second node associated with a second operator) has emergency data to transmit over the unlicensed radio frequency spectrum band, the method 2200 may proceed to block 2225. In some examples, determining that a node associated with another operator in the deployment of operators has emergency data to transmit over the unlicensed radio frequency spectrum band may include receiving a signal from a node associated with another operator (e.g., receiving a signal from a second node associated with a second operator). The signal received from the node associated another operator may include an indication that the node associated with another operator has emergency data to transmit. The operation(s) at block 2215 may be performed using the wireless communication management module 1220, 1320, 1520, 1760, and/or 1860 described with reference to FIGS. 12, 13, 15, 17, and/or 18, the emergency data transmission management module 1235, 1335, and/or 1535 described with reference to FIGS. 12, 13, and/or 15, and/or the emergency data coordination module 1540 described with reference to FIG. 15.

At block 2220, the method 2200 may include adjusting a CCA opportunity of the first node in response to the determination that the first node has emergency data to transmit. The operation(s) at block 2220 may be performed using the wireless communication management module 1220, 1320, 1520, 1760, and/or 1860 described with reference to FIGS. 12, 13, 15, 17, and/or 18, the emergency data transmission management module 1235, 1335, and/or 1535 described with reference to FIGS. 12, 13, and/or 15, and/or the CCA opportunity adjustment module 1545 described with reference to FIG. 15.

At block 2225, the method 2200 may include determining whether to adjust a CCA opportunity of the first node in response to the determination that the first node has emergency data to transmit, and based on a total number of operators in the deployment of operators that have emergency data to transmit over the unlicensed radio frequency spectrum band. When it is determined at block 2225 to adjust the CCA opportunity of the first node, the CCA opportunity of the first node may be adjusted at block 2225. The operation(s) at block 2225 may be performed using the wireless communication management module 1220, 1320, 1520, 1760, and/or 1860 described with reference to FIGS. 12, 13, 15, 17, and/or 18, the emergency data transmission management module 1235, 1335, and/or 1535 described with reference to FIGS. 12, 13, and/or 15, and/or the CCA opportunity adjustment module 1545 described with reference to FIG. 15.

In some examples of the method 2200, it may be determined at block 2215 that a second node associated with a second operator in the deployment of operators has emergency data to transmit over the unlicensed radio frequency spectrum band. In these examples, adjusting the CCA opportunity at block 2225 may include cycling access to an earliest CCA opportunity between the first node and the second node on a frame-by-frame basis, for each frame during which both the first node and the second node have emergency data to transmit. When it is determined at block 2215 that other nodes of other operators in the deployment of operators also have emergency data to transmit over the unlicensed radio frequency spectrum band, access to the earliest CCA opportunity may also be cycled between these other nodes of other operators.

In some examples of the method 2200, an adjusted CCA opportunity of the first node may collide with and preempt a default CCA opportunity of a second node. In these examples, and assuming that the second node does not have emergency data to transmit over the unlicensed radio frequency spectrum band, a default CCA opportunity of the first node may be relinquished to the second node.

At block 2230, the method 2200 may include performing a CCA at either an adjusted CCA opportunity or a default CCA opportunity of the first node, depending on the operation(s) performed at block 2220 or 2225. The operation(s) at block 2230 may be performed using the wireless communication management module 1220, 1320, 1520, 1760, and/or 1860 described with reference to FIGS. 12, 13, 15, 17, and/or 18, and/or the CCA module 1560 described with reference to FIG. 15.

At block 2235, and when the CCA performed at block 2230 is successful, the method 2200 may include the first node transmitting at least a portion of the emergency data, over the unlicensed radio frequency spectrum band, during a frame following the adjusted CCA opportunity or the default CCA opportunity. When the CCA is not successful, or when emergency data needs to be transmitted over multiple frames, a CCA may be performed for one or more subsequent frames, and at least a portion of the emergency data may be transmitted during a frame following a successful CCA. In some examples, the emergency data may be transmitted over an MBMS and/or unicast. In some examples, the emergency data may be transmitted over more than one frame of the unlicensed radio frequency spectrum band. The operation(s) at block 2235 may be performed using the wireless communication management module 1220, 1320, 1520, 1760, and/or 1860 described with reference to FIGS. 12, 13, 15, 17, and/or 18, and/or the data transmission module 1355 and/or 1565 described with reference to FIGS. 13 and/or 15.

In some examples, the method 2200 may include allocating all available transmission resources in the frame following the adjusted CCA opportunity to the transmission of the emergency data until the emergency data has completed transmission.

In some examples, the method 2200 may include transmitting the emergency data by the first node over a subset of subcarriers. The subset of subcarriers may be determined based on the first operator of the first node.

In some examples, the method 2200 may include performing the CCA concurrently with at least a second node associated with a second operator, where the second node has emergency data to transmit.

In some examples, the method 2200 may include performing the CCA concurrently with at least a second node associated with a second operator, where the second node has non-emergency data to transmit, and where a default CCA opportunity of the second node collides with the adjusted CCA opportunity of the first node. In some of these examples, the method 2200 may further include transmitting the emergency data over a joint MBMS including the first operator and the second operator. In some examples, the method 2200 may include forming the joint MBMS in response to a determination that the first node and the second node have the same emergency data to transmit. In some examples, the method 2200 may include transmitting the emergency data according to a CoMP operation between the first node and the second node.

Thus, the method 2200 may provide for wireless communication. It should be noted that the method 2200 is just one implementation and that the operations of the method 2200 may be rearranged or otherwise modified such that other implementations are possible.

In some examples, aspects of one or more of the methods 1900, 2000, 2100, and/or 2200 may be combined.

Figure 23:
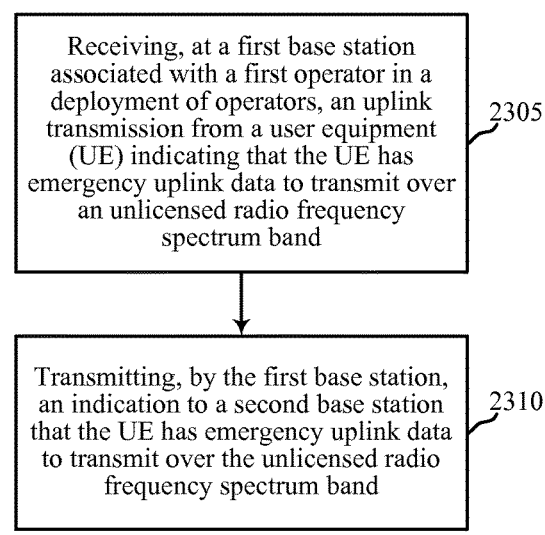
FIG. 23 is a flow chart illustrating an example of a method for wireless communication, in accordance with various aspects of the present disclosure.

FIG. 23 is a flow chart illustrating an example of a method 2300 for wireless communication, in accordance with various aspects of the present disclosure. For clarity, the method 2300 is described below with reference to aspects of one or more of the base stations 105, 205, 205-a, and/or 1705 described with reference to FIGS. 1, 2, and/or 17, aspects of one or more of the UEs 115, 215, 215-a, 215-b, 215-c, and/or 1815 described with reference to FIGS. 1, 2, and/or 18, and/or aspects of one or more of the apparatuses 1205 and/or 1605 described with reference to FIGS. 12 and/or 16. In some examples, a base station and/or apparatus may execute one or more sets of codes to control the functional elements of the base station and/or apparatus to perform the functions described below.

At block 2305, the method 2300 may include receiving, at a first base station associated with a first operator in a deployment of operators, an uplink transmission from a UE indicating that the UE has emergency uplink data to transmit over an unlicensed radio frequency spectrum band. The unlicensed radio frequency spectrum band may be a radio frequency spectrum band for which apparatuses may need to contend for access because the radio frequency spectrum band is available, at least in part, for unlicensed use (e.g., Wi-Fi use and/or unlicensed LTE/LTE-A use). In some examples, the first base station may be an LTE/LTE-A-compatible base station. In some examples, the uplink transmission from the UE may include an uplink signal, and in some examples, the uplink transmission may be part of a sounding reference signal (SRS), a physical random access channel (PRACH), channel state information (CSI), and/or a scheduling request (SR) included in the signal). The operation(s) at block 2305 may be performed using the wireless communication management module 1620 and/or the emergency data notification reception module 1635 described with reference to FIG. 16.

At block 2310, the method 2300 may include transmitting, by the first base station, an indication to a second base station that the UE has emergency uplink data to transmit over the unlicensed radio frequency spectrum band. In some examples, the second base station may be an LTE/LTE-A-compatible base station. In some examples, the indication to the second base station may include a downlink signal and/or a transmission at a beginning of an LBT burst. The operation(s) at block 2310 may be performed using the wireless communication management module 1620 and/or the emergency data notification distribution module 1640 described with reference to FIG. 16.

Depending on the uplink transmission from the UE indicating that the UE has emergency uplink data to transmit, and the indication transmitted from the first base station to the second base station indicating that the UE has emergency data to transmit, UEs associated with the first base station and the second base station may adjust their respective CCA opportunities accordingly. For example, if the first base station sets an uplink emergency indication in its own signal while the second based station does not (e.g., because the second base station and its UEs do not have emergency data to transmit), UEs associated with the first base station may override their default CCA opportunity and set their CCA opportunity to an earliest CCA opportunity if they have emergency data to transmit, while UEs associated with the second base station may yield their default CCA opportunity if it collides with the adjusted CCA opportunity of a UE associated with the first base station. Also, the UEs associated with second base station may relinquish their default CCA opportunity to the UEs associated with the first base station.

Thus, the method 2300 may provide for wireless communication. It should be noted that the method 2300 is just one implementation and that the operations of the method 2300 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), computer disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
determining, by a first node, that the first node associated with a first operator in a deployment of operators has emergency data to transmit over an unlicensed radio frequency spectrum band;
adjusting a listen-before-talk (LBT) yielding parameter of the first node in response to the determination that the first node has emergency data to transmit;
transmitting, by the first node, a signal over the unlicensed radio frequency spectrum band, the signal indicating that the first node has emergency data to transmit; and
transmitting the emergency data via a multicast transmission.

2. The method of claim 1, wherein the signal further comprises an indication of a maximum time span of a transmission of the emergency data by the first node.

3. The method of claim 1, wherein the multicast transmission is associated with a multimedia broadcast multicast service (MBMS).

4. The method of claim 3, further comprising:
allocating available transmission resources in the unlicensed radio frequency spectrum band during the transmission of the emergency data by the first node, wherein the allocation comprises one of:
allocating all available transmission resources in the unlicensed radio frequency spectrum band to the MBMS, or
dividing available transmission resources in the unlicensed radio frequency spectrum band between the MBMS and unicast, wherein the emergency data is transmitted over both the MBMS and the unicast.

5. The method of claim 1, further comprising: transmitting a second signal indicating that the first node has completed transmitting the emergency data.

6. The method of claim 5, wherein the second signal is transmitted using a clear channel assessment (CCA)-exempt transmission (CET).

7. The method of claim 1, wherein:
the LBT yielding parameter comprises one of a first LBT yielding parameter or a second LBT yielding parameter;
the first LBT yielding parameter defines a number of consecutive frames triggering the first node in the deployment of operators to yield access to the unlicensed radio frequency spectrum band; and
the second LBT yielding parameter defines a number of consecutive frames during which the first node yields access to the unlicensed radio frequency spectrum band following transmission of the number of consecutive frames defined by the first LBT yielding parameter.

8. The method of claim 7, wherein adjusting the LBT yielding parameter comprises:
increasing or decreasing the first LBT yielding parameter from a default value.

9. The method of claim 1, wherein adjusting the LBT yielding parameter comprises:
adjusting the LBT yielding parameter based on a total number of operators in the deployment of operators that have emergency data to transmit over the unlicensed radio frequency spectrum band.

10. The method of claim 1, further comprising:
determining that a second node associated with a second operator in the deployment of operators has emergency data to transmit over the unlicensed radio frequency spectrum band;
wherein adjusting the LBT yielding parameter comprises matching the LBT yielding parameter of the first node to a corresponding LBT yielding parameter of the second node.

11. The method of claim 10, wherein determining that the second node has emergency data to transmit over the unlicensed radio frequency spectrum band comprises: receiving a signal from the second node, the signal comprising an indication that the second node has emergency data to transmit.

12. The method of claim 1, further comprising:
adjusting a CCA opportunity of the first node in response to the determination that the first node has emergency data to transmit.

13. The method of claim 12, wherein adjusting the CCA opportunity of the first node comprises:
adjusting the CCA opportunity based on a total number of operators in the deployment of operators that have emergency data to transmit over the unlicensed radio frequency spectrum band.

14. The method of claim 13, further comprising:
determining that at least a second node associated with a second operator in the deployment of operators has emergency data to transmit over the unlicensed radio frequency spectrum band.

15. The method of claim 14, wherein access to an earliest CCA opportunity cycles between the first node and the second node on a frame-by-frame basis for each frame during which both the first node and the second node have emergency data to transmit.

16. The method of claim 1, wherein the first node includes a base station or a user equipment (UE).

17. An apparatus for wireless communication, comprising:
a processor;
memory in electronic communication with the processor; and
instructions stored in the memory, wherein the instructions are executable by the processor to:
cause a first node to determine that the first node associated with a first operator in a deployment of operators has emergency data to transmit over an unlicensed radio frequency spectrum band;
cause the first node to adjust a listen-before-talk (LBT) yielding parameter of the first node in response to the determination that the first node has emergency data to transmit;
cause the first node to transmit a signal over the unlicensed radio frequency spectrum band, the signal indicating that the first node has emergency data to transmit; and
cause the first node to transmit the emergency data via a multicast transmission.

18. The apparatus of claim 17, wherein:
the LBT yielding parameter comprises one of a first LBT yielding parameter or a second LBT yielding parameter;
the first LBT yielding parameter defines a number of consecutive frames triggering the first node in the deployment of operators to yield access to the unlicensed radio frequency spectrum band; and
the second LBT yielding parameter defines a number of consecutive frames during which the first node yields access to the unlicensed radio frequency spectrum band following transmission of the number of consecutive frames defined by the first LBT yielding parameter.

19. The apparatus of claim 17, wherein the instructions executable by the processor to adjust the LBT yielding parameter comprise instructions executable by the processor to:
adjust the LBT yielding parameter based on a total number of operators in the deployment of operators that have emergency data to transmit over the unlicensed radio frequency spectrum band.

20. The apparatus of claim 17, wherein the instructions are executable by the processor to:
adjust a CCA opportunity of the first node in response to the determination that the first node has emergency data to transmit.

21. A non-transitory computer-readable medium storing code for wireless communications, the code comprising instructions executable by a processor to cause a first node associated with a first operator in a deployment of operators to:
determine that the first node has emergency data to transmit over an unlicensed radio frequency spectrum band;
adjust a listen-before-talk (LBT) yielding parameter of the first node in response to the determination that the first node has emergency data to transmit;
transmit using a clear channel assessment (CCA)-exempt transmission (CET), a signal over the unlicensed radio frequency spectrum band, the signal indicating that the first node has emergency data to transmit; and
transmit the emergency data via a multicast transmission.

22. The non-transitory computer-readable medium of claim 21, wherein the signal further comprises an indication of a maximum time span of a transmission of the emergency data by the first node.

23. The non-transitory computer-readable medium of claim 21, wherein the multicast transmission is associated with a multimedia broadcast multicast service (MBMS).

24. The non-transitory computer-readable medium of claim 23, wherein the instructions are further executable by the processor to cause the first node to:
allocate available transmission resources in the unlicensed radio frequency spectrum band during the transmission of the emergency data by the first node, wherein the allocation comprises one of:
allocating all available transmission resources in the unlicensed radio frequency spectrum band to the MBMS, or
dividing available transmission resources in the unlicensed radio frequency spectrum band between the MBMS and unicast, wherein the emergency data is transmitted over both the MBMS and the unicast.

25. The non-transitory computer-readable medium of claim 21, wherein the instructions are further executable by the processor to cause the first node to:
transmit a second signal indicating that the first node has completed transmitting the emergency data.

26. The non-transitory computer-readable medium of claim 25, wherein the second signal is transmitted using a clear channel assessment (CCA)-exempt transmission (CET).

\* \* \* \* \*